United States Patent
Jeon et al.

(10) Patent No.: US 12,262,270 B2
(45) Date of Patent: *Mar. 25, 2025

(54) POWER CONTROL FOR BANDWIDTH PART SWITCHING

(71) Applicant: Ofinno, LLC, Reston, VA (US)

(72) Inventors: Hyoungsuk Jeon, Centreville, VA (US); Esmael Hejazi Dinan, McLean, VA (US); Hua Zhou, Vienna, VA (US); Alireza Babaei, Fairfax, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/610,395

(22) Filed: Mar. 20, 2024

(65) Prior Publication Data

US 2024/0306061 A1 Sep. 12, 2024

Related U.S. Application Data

(63) Continuation of application No. 17/152,348, filed on Jan. 19, 2021, now Pat. No. 11,968,577, which is a
(Continued)

(51) Int. Cl.
*H04W 36/06* (2009.01)
*H04L 5/00* (2006.01)
(Continued)

(52) U.S. Cl.
CPC ........... *H04W 36/06* (2013.01); *H04L 5/0098* (2013.01); *H04W 52/08* (2013.01); *H04W 52/40* (2013.01); *H04W 72/0453* (2013.01)

(58) Field of Classification Search
CPC ..... H04W 36/06; H04W 52/08; H04W 52/40; H04W 72/0453; H04L 5/0098
See application file for complete search history.

(56) References Cited

U.S. PATENT DOCUMENTS

| 8,976,698 B2 | 3/2015 | Chen et al. |
| 2009/0257408 A1 | 10/2009 | Zhang et al. |

(Continued)

FOREIGN PATENT DOCUMENTS

| EP | 2672649 A1 | 12/2013 | |
| EP | 2485519 B1 * | 10/2016 | ............ H04W 16/14 |

(Continued)

OTHER PUBLICATIONS

R1-1807747 3GPP TSG RAN WG1 Meeting #93, Busan, Korea, May 21-25, 2018, Source: Qualcomm Incorporated, Title: Summary of Remaining Details on RACH Procedure.
(Continued)

*Primary Examiner* — Raymond S Dean
(74) *Attorney, Agent, or Firm* — Jake Mangan; Kavon Nasabzadeh; Brett Gardner

(57) ABSTRACT

Systems, apparatuses, and methods are described for wireless communications. A base station may configure a power control process associated with a wireless device. Closed-loop power control (CL-CP) for the wireless device may be reset based on a change of channel conditions. The wireless device may change a transmit power and/or reset the CL-CP based on various conditions.

44 Claims, 24 Drawing Sheets

Related U.S. Application Data continuation of application No. 16/193,931, filed on Nov. 16, 2018, now Pat. No. 10,945,172.

(60) Provisional application No. 62/587,182, filed on Nov. 16, 2017.

(51) Int. Cl.
*H04W 52/08* (2009.01)
*H04W 52/40* (2009.01)
*H04W 72/0453* (2023.01)

(56) References Cited

U.S. PATENT DOCUMENTS

| | | |
|---|---|---|
| 2011/0003555 A1 | 1/2011 | Guo |
| 2011/0032895 A1 | 2/2011 | Englund et al. |
| 2013/0343273 A1 | 12/2013 | Barbieri et al. |
| 2014/0029486 A1 | 1/2014 | Li et al. |
| 2014/0098761 A1 | 4/2014 | Lee et al. |
| 2014/0105164 A1 | 4/2014 | Moulsley et al. |
| 2014/0171144 A1 | 6/2014 | Kim et al. |
| 2014/0286283 A1 | 9/2014 | Kim et al. |
| 2014/0362832 A1 | 12/2014 | Rudolf et al. |
| 2015/0016352 A1 | 1/2015 | Bressanelli et al. |
| 2015/0208386 A1 | 7/2015 | Yang et al. |
| 2015/0327107 A1 | 11/2015 | Kim et al. |
| 2015/0334769 A1 | 11/2015 | Kim et al. |
| 2016/0150440 A1 | 5/2016 | Lee et al. |
| 2017/0070961 A1 | 3/2017 | Bharadwaj et al. |
| 2017/0134880 A1 | 5/2017 | Rico Alvarino et al. |
| 2017/0156152 A1 | 6/2017 | Nazar et al. |
| 2017/0238323 A1 | 8/2017 | Marinier et al. |
| 2017/0245165 A1 | 8/2017 | Onggosanusi et al. |
| 2017/0264401 A1 | 9/2017 | Soong et al. |
| 2017/0332387 A1 | 11/2017 | Zhang et al. |
| 2017/0353223 A1 | 12/2017 | Kim et al. |
| 2018/0006701 A1 | 1/2018 | Ahn et al. |
| 2018/0049047 A1 | 2/2018 | Lin et al. |
| 2018/0049060 A1 | 2/2018 | Fujishiro et al. |
| 2018/0049169 A1 | 2/2018 | Lin et al. |
| 2018/0070403 A1 | 3/2018 | Uemura et al. |
| 2018/0084593 A1* | 3/2018 | Chen ............ H04W 76/11 |
| 2018/0092157 A1* | 3/2018 | Chen ............ H04W 76/27 |
| 2018/0123765 A1 | 5/2018 | Cao et al. |
| 2018/0124648 A1 | 5/2018 | Park et al. |
| 2018/0124687 A1 | 5/2018 | Park et al. |
| 2018/0124815 A1 | 5/2018 | Papasakellariou |
| 2018/0131493 A1 | 5/2018 | Luo et al. |
| 2018/0139734 A1 | 5/2018 | Babaei et al. |
| 2018/0176937 A1 | 6/2018 | Chen et al. |
| 2018/0183551 A1 | 6/2018 | Chou et al. |
| 2018/0288746 A1 | 10/2018 | Zhang et al. |
| 2018/0295651 A1 | 10/2018 | Cao et al. |
| 2018/0343154 A1 | 11/2018 | Park et al. |
| 2018/0376380 A1* | 12/2018 | Leroux ............ H04W 4/70 |
| 2019/0044649 A1 | 2/2019 | Kim et al. |
| 2019/0044811 A1 | 2/2019 | Miao et al. |
| 2019/0052432 A1 | 2/2019 | Islam et al. |
| 2019/0103953 A1* | 4/2019 | Liao ............ H04W 72/23 |
| 2019/0103954 A1 | 4/2019 | Lee et al. |
| 2019/0132092 A1* | 5/2019 | Chen ............ H04L 1/1887 |
| 2019/0132109 A1 | 5/2019 | Zhou et al. |
| 2019/0132824 A1 | 5/2019 | Jeon et al. |
| 2019/0132845 A1 | 5/2019 | Babaei et al. |
| 2019/0149213 A1 | 5/2019 | Zhou et al. |
| 2019/0191381 A1* | 6/2019 | Zhang ............ H04W 52/42 |
| 2019/0199503 A1 | 6/2019 | Son et al. |
| 2019/0254110 A1 | 8/2019 | He et al. |
| 2019/0373667 A1 | 12/2019 | Jeon et al. |
| 2020/0059345 A1 | 2/2020 | Pelletier et al. |
| 2020/0092864 A1 | 3/2020 | Chen |
| 2020/0163085 A1 | 5/2020 | Takeda et al. |
| 2020/0205157 A1 | 6/2020 | Zhu |
| 2020/0259622 A1 | 8/2020 | Cao et al. |
| 2020/0260442 A1 | 8/2020 | Yi |
| 2020/0337069 A1 | 10/2020 | Jiang et al. |
| 2020/0344034 A1 | 10/2020 | Moon et al. |
| 2020/0374866 A1 | 11/2020 | Takeda et al. |

FOREIGN PATENT DOCUMENTS

| | | |
|---|---|---|
| EP | 3282633 A1 | 2/2018 |
| WO | 2011038243 A2 | 3/2011 |
| WO | 2011038243 A3 | 7/2011 |
| WO | 2011085230 A2 | 7/2011 |
| WO | 2017197155 A1 | 11/2017 |
| WO | 2017204595 A1 | 11/2017 |
| WO | 2018021834 A1 | 2/2018 |
| WO | 2018031638 A1 | 2/2018 |
| WO | 2018031924 A1 | 2/2018 |
| WO | 2018044116 A1 | 3/2018 |
| WO | 2018080260 A1 | 5/2018 |
| WO | 2018084544 A1 | 5/2018 |
| WO | 2018084571 A1 | 5/2018 |
| WO | 2018085145 A1 | 5/2018 |
| WO | 2018089117 A1 | 5/2018 |
| WO | 2018145019 A1 | 8/2018 |

OTHER PUBLICATIONS

R2-1800688 3GPP TSG RAN WG2 NR Ad Hoc, Vancouver, Canada, Jan. 22-26, 2018, Source: Ericsson, Title: Need for PDCCH order.
Sep. 9, 2019—European Extended Search Report—EP 19174705.4.
3GPP TR 38.804 V14.1.0 (Mar. 2017), Technical Report, 3rd Generation Partnership Project, Technical Specification Group Radio Access Network, Study on New Radio Access Technology, Radio Interface Protocol Aspects (Release 14).
3GPP TSG RAN WG1 Meeting #90, Prague, Czech Republic, Aug. 21-25, 2017, Title: RAN1 Chairman's Notes.
3GPP TSG RAN WG1 Meeting NR#3, Nagoya, Japan, Sep. 18-21, 2017, Title: RAN1 Chairman's Notes.
3GPP TSG RAN WG2 #99, Berlin, Germany, Aug. 21-25, 2017, Source: Vice-Chairwoman (InterDigital), Title: Report from LTE and NR User Plane Break-Out Session.
3GPP TSG-RAN WG2 NR Ad Hoc, Qingdao, China, Jun. 27-30, 2017, Source: RAN1 Chairman, Object: Chairman Notes.
R1-1706901 3GPP TSG-RAN WG1 #89, Hangzhou, China, May 15-19, 2017, Source: Huawei, HiSilicon, Title: TB mapping for slot aggregation.
R1-1706909 3GPP TSG-RAN WG1 #89, Hangzhou, China, May 15-19, 2017, Source: Huawei, HiSilicon, Title: On uplink data scheduling.
R1-1706914 3GPP TSG-RAN WG1 #89, Hangzhou, China, May 15-19, 2017, Source: Huawei, HiSilicon, Title: Numerology for multiplexing of eMBB and URLLC.
R1-1707166 3GPP TSG-RAN WG1 #89, Hangzhou, China, May 15-19, 2017, Source: ZTE, Title: HARQ for URLLC UL Grant-free transmission.
R1-1707176 3GPP TSG-RAN WG1 #89, Hangzhou, China, May 15-19, 2017, Source: ZTE, Title: Multiplexing data with different transmission durations.
R1-1707195 3GPP TSG-RAN WG1 #89, Hangzhou, China, May 15-19, 2017, Source: FiberHome, Title: Discussion on resource allocation for NR.
R1-1707237 3GPP TSG-RAN WG1 #89, Hangzhou, China, May 15-19, 2017, Source: vivo, Title: Discussion on flexible length scheduling.
R1-1707508 3GPP TSG-RAN WG1 #89, Hangzhou, China, May 15-19, 2017, Source: CATT, Title: NR DL scheduling mechanism.
R1-1707656 3GPP TSG-RAN WG1 #89, Hangzhou, China, May 15-19, 2017, Source: LG Electronics, Title: Consideration on HARQ-ACK feedback method for NR.
R1-1707662 3GPP TSG-RAN WG1 #89, Hangzhou, China, May 15-19, 2017, Source: LG Electronics, Title: Consideration on CB group based HARQ-ACK feedback.
R1-1708017 3GPP TSG-RAN WG1 #89, Hangzhou, China, May 15-19, 2017, Source: Samsung, Title: DL Resource Allocation Aspects.

(56) References Cited

OTHER PUBLICATIONS

R1-1709991 3GPP TSG-RAN WG1 NR Ad Hoc, Qingdao, China, Jun. 27-30, 2017, Source: Huawei, HiSilicon, Title: Resource configuration on UL transmission without grant.
R1-1710015 3GPP TSG-RAN WG1 NR Ad Hoc, Qingdao, China, Jun. 27-30, 2017, Source: ZTE, Title: Considerations on the procedures of UL data transmission without grant.
R1-1710094 3GPP TSG-RAN WG1 NR Ad Hoc, Qingdao, China, Jun. 27-30, 2017, Source: CATT, Title: Grant-free UL transmission procedure.
R1-1710327 3GPP TSG-RAN WG1 NR Ad Hoc, Qingdao, China, Jun. 27-30, 2017, Source: LG Electronics, Title: Discussion on UL transmission without grant.
R1-1710380 3GPP TSG-RAN WG1 NR Ad Hoc, Qingdao, China, Jun. 27-30, 2017, Source: vivio, Title: Discussion on UL grant-free transmission.
R1-1710568 3GPP TSG-RAN WG1 NR Ad Hoc, Qingdao, China, Jun. 27-30, 2017, Source: Intel Corporation, Title: UL grant-free transmissions: Resource configuration.
R1-1710621 3GPP TSG-RAN WG1 NR Ad Hoc, Qingdao, China, Jun. 27-30, 2017, Source: ETRI, Title: Resource allocation and transmission scheme for URLLC grant-free transmission.
R1-1710723 3GPP TSG-RAN WG1 NR Ad Hoc, Qingdao, China, Jun. 27-30, 2017, Source: Samsung, Title: Procedures for Grant-Free UL Transmissions.
R1-1710724 3GPP TSG-RAN WG1 NR Ad Hoc, Qingdao, China, Jun. 27-30, 2017, Source: Samsung, Title: Grant-free and grant-based UL transmissions.
R1-1710887 3GPP TSG-RAN WG1 NR Ad Hoc, Qingdao, China, Jun. 27-30, 2017, Source: Intel Corporation, Title: UL grant-free transmissions: Physical layer procedures.
R1-1710963 3GPP TSG-RAN WG1 NR Ad Hoc, Qingdao, China, Jun. 27-30, 2017, Source: NEC, Title: On network resources and UE transmission configurations for grant-free access.
R1-1710971 3GPP TSG-RAN WG1 NR Ad Hoc, Qingdao, China, Jun. 27-30, 2017, Source: China Telecom, Title: UL grant-free transmission for URLLC.
R1-1711006 3GPP TSG-RAN WG1 NR Ad Hoc, Qingdao, China, Jun. 27-30, 2017, Source: Institute for Information Industry (III), Title: Issues and Control Design for UL Grant-free URLLC.
R1-1711111 3GPP TSG-RAN WG1 NR Ad Hoc, Qingdao, China, Jun. 27-30, 2017, Source: NTT DOCOMO, Inc., Title: Overall solutions for UL grant free transmission.
R1-1711253 3GPP TSG-RAN WG1 NR Ad Hoc, Qingdao, China, Jun. 27-30, 2017, Source: NICT, Title: Resource configuration for UL transmission without grant.
R1-1711504 3GPP TSG-RAN WG1 NR Ad Hoc, Qingdao, China, Jun. 27-30, 2017, Source: Ericsson, Title: On SPS/Grant-Free Transmission.
R1-1712689 3GPP TSG RAN WG1 Meeting #90, Prague, Czech Republic, Aug. 21-25, 2017, Source: Lenovo, Motorola Mobility, Title: HARQ design for uplink grant-free transmission.
R1-1712743 3GPP TSG RAN WG1 Meeting #90, Prague, Czech Republic, Aug. 21-25, 2017, Source: Fujitsu, Title: Discussions on HARQ for grant-free transmission.
R1-1712823 3GPP TSG RAN WG1 Meeting #90, Prague, Czech Republic, Aug. 21-25, 2017, Source: Orange, China Unicom, Nokia, Nokia Shanghai Bell, Ericsson, ZTE, Apple, Title: WF on Scenario 1.
R1-1712863 3GPP TSG RAN WG1 Meeting #90, Prague, Czech Republic, Aug. 21-25, 2017, Source: vivo, Title: Discussion on UL grant-free transmission.
R1-1713189 3GPP TSG RAN WG1 Meeting #90, Prague, Czech Republic, Aug. 21-25, 2017, Source: LG Electronics, Title: Discussion on UL transmission without grant.
R1-1713639 3GPP TSG RAN WG1 Meeting #90, Prague, Czech Republic, Aug. 21-25, 2017, Source: Samsung, Title: Procedures for Grant-Free UL Transmissions.

R1-1714011 3GPP TSG RAN WG1 Meeting #90, Prague, Czech Republic, Aug. 21-25, 2017, Source: Nokia, Nokia Shanghai Bell, Title: UL transmission procedure without grant.
R1-1715419 3GPP TSG RAN WG1 Meeting NR Ad Hoc, Nagoya, Japan, Sep. 18-21, 2017, Source: Huawei, HiSilicon, Title: UL data transmission with and without SR/UL grant.
R1-1715490 3GPP TSG RAN WG1 Meeting NR Ad Hoc, Nagoya, Japan, Sep. 18-21, 2017, Source: Fujitsu, Title: Discussions on HARQ for UL data transmission without grant.
R1-1715548 3GPP TSG RAN WG1 Meeting NR Ad Hoc, Nagoya, Japan, Sep. 18-21, 2017, Source: Nokia, Nokia Shanghai Bell, Title: Remaining issues on UL transmission without grant.
R1-1715562 3GPP TSG RAN WG1 Meeting NR Ad Hoc, Nagoya, Japan, Sep. 18-21, 2017, Source: ZTE, Sanechips, Title: Further discussion on UL transmission without grant.
R1-1715645 3GPP TSG RAN WG1 Meeting NR Ad Hoc, Nagoya, Japan, Sep. 18-21, 2017, Source: vivo, Title: Support of UL data transmission without grant.
R1-1715662 3GPP TSG RAN WG1 Meeting NR Ad Hoc, Nagoya, Japan, Sep. 18-21, 2017, Source: NEC, Title: Remaining issues on UL transmission without grant.
R1-1715769 3GPP TSG RAN WG1 Meeting NR Ad Hoc, Nagoya, Japan, Sep. 18-21, 2017, Source: ETRI, Title: DL HARQ-ACK for GF PUSCH transmission.
R1-1715888 3GPP TSG RAN WG1 Meeting NR Ad Hoc, Nagoya, Japan, Sep. 18-21, 2017, Source: LG Electronics, Title: Discussion on UL data transmission procedure.
R1-1716107 3GPP TSG RAN WG1 Meeting NR Ad Hoc, Nagoya, Japan, Sep. 18-21, 2017, Source: NTT DOCOMO, Inc., Title: UL data transmission without UL grant.
R1-1716483 3GPP TSG RAN WG1 Meeting NR Ad Hoc, Nagoya, Japan, Sep. 18-21, 2017, Source: InterDigital, Inc., Title: On remaining details of UL data transmission without grant.
R1-1716597 3GPP TSG RAN WG1 Meeting NR Ad Hoc, Nagoya, Japan, Sep. 18-21, 2017, Source: Ericsson, Title: On UL Data Transmission Procedure.
R1-1716623 3GPP TSG RAN WG1 Meeting NR Ad Hoc, Nagoya, Japan, Sep. 18-21, 2017, Source: MediaTek Inc., Title: On UL data transmission without grant design and configuration.
R1-171xxxx 3GPP TSG-RAN WG1 NR Ad Hoc, Qingdao, China, Jun. 27-30, 2017, Source: LG Electronics, Title: [draft] Summary of [89-22] Email discussion about UL data transmission without UL grant.
R1-17xxxxx 3GPP TSG RAN WG1 Meeting #90, Prague, Czech Republic, Aug. 21-25, 2017, Source: NTT DOCOMO, Inc., Title: Offline discussions on some topics for AI 6.1.3.1.
R2-1703453 3GPP TSG-RAN WG2 #97bis, Spokane, USA, Apr. 3-7, 2017, Source: Samsung, Title: HARQ for Numerology Multiplexing.
R2-1704479 3GPP TSG-RAN WG1 #98, Hangzhou, China, May 15-19, 2017, Source: Samsung, Title: The number of TBs per UL HARQ process.
R2-1704505 3GPP TSG-RAN WG1 #98, Hangzhou, China, May 15-19, 2017, Source: Samsung, Title: HARQ for numerology multiplexing.
R2-1704684 3GPP TSG-RAN WG1 #98, Hangzhou, China, May 15-19, 2017, Source: Ericsson, Title: Enhanced HARQ feedback mode in SPS.
R2-1706417 3GPP TSG-RAN WG2 NR Ad Hoc, Qingdao, China, Jun. 27-29, 2017, Source: CATT, Title: Grant-free transmission and SPS.
R2-1706448 3GPP TSG-RAN WG2 NR Ad Hoc, Qingdao, China, Jun. 27-29, 2017, Source: Spreadtrum Communications, Title: Discussion on UL grant-free transmission.
R2-1706589 3GPP TSG-RAN WG2 NR Ad Hoc, Qingdao, China, Jun. 27-29, 2017, Source: Nokia, Alcatel-Lucent Shanghai Bell, Title: Unified SPS and Grant-free operation.
R2-1706645 3GPP TSG-RAN WG2 NR Ad Hoc, Qingdao, China, Jun. 27-29, 2017, Source: ZTE, Title: Consideration on the multiple SPS and grant free.
R2-1706687 3GPP TSG-RAN WG2 NR Ad Hoc, Qingdao, China, Jun. 27-29, 2017, Source: InterDigital, Inc., Title: SPS and Grant-free operation for NR.

(56) References Cited

OTHER PUBLICATIONS

R2-1707098 3GPP TSG-RAN WG2 NR Ad Hoc, Qingdao, China, Jun. 27-29, 2017, Source: Samsung, Title: Uplink SPS and Grant-free Transmission Aspects.
R2-1707174 3GPP TSG-RAN WG2 NR Ad Hoc, Qingdao, China, Jun. 27-29, 2017, Source: Ericsson, Title: Grant Free and Semi-Persistent Scheduling in NR.
R2-1707247 3GPP TSG-RAN WG2 NR Ad Hoc, Qingdao, China, Jun. 27-29, 2017, Source: Huawei, HiSilicon, Title: Modelling of Grant free and SPS.
R2-1707268 3GPP TSG-RAN WG2 NR Ad Hoc, Qingdao, China, Jun. 27-29, 2017, Source: MediaTek Inc., Title: Comparison of SPS and grant-free schemes.
R2-1707500 3GPP TSG-RAN WG2 NR Ad Hoc, Quingdao, China, Jun. 27-29, 2017, Source: Vice-Chairwoman (InterDigital), Title: Report from NR User Plane Break-Out Session.
R2-1708732 3GPP TSG RAN WG2 #99, Berlin, Germany, Aug. 21-25, 2017, Source: InterDigital, Inc., Title: SPS and grant free operation.
R2-1708956 3GPP TSG RAN WG2 #99, Berlin, Germany, Aug. 21-25, 2017, Source: Huawei, HiSilicon, Title: Considerations on SPS and TTI-bundling in EN-DC.
R2-1709125 3GPP TSG RAN WG2 #99, Berlin, Germany, Aug. 21-25, 2017, Source: Qualcomm, Title: On reliable transmission of URLLC data.
R2-1709264 3GPP TSG RAN WG2 #99, Berlin, Germany, Aug. 21-25, 2017, Source: Huawei, HiSilicon, Title: Discussion on type 1 grant-free for connected mode UE.
R2-1710134 3GPP TSG RAN WG2 Meeting #99bis, Prague, Czech Republic, Oct. 9-13, 2017, Source: OPPO, Title: SPS operations for BWP switching.
R2-1710662 3GPP TSG RAN WG2 Meeting #99bis, Prague, Czech Republic, Oct. 9-13, 2017, Source: InterDigital, Inc., Title: SPS and grant free operation.
R2-1710958 3GPP TSG RAN WG2 Meeting #99bis, Prague, Czech Republic, Oct. 9-13, 2017, Source: vivo, Title: Duplication deactivation due to Scell or BWP deactivation.
R2-1711441 3GPP TSG RAN WG2 Meeting #99bis, Prague, Czech Republic, Oct. 9-13, 2017, Source: Huawei, HiSilicon, Title: MAC impact of bandwidth part activation/deactivation.
R2-1711613 3GPP TSG RAN WG2 Meeting #99bis, Prague, Czech Republic, Oct. 9-13, 2017, Source: LG Electronics, Title: PHR for wider bandwidth operation.
R2-1711643 3GPP TSG RAN WG2 Meeting #99bis, Prague, Czech Republic, Oct. 9-13, 2017, Source: Intel Corporation, Title: Activation of SCell containing BWPs.
R2-1711856 3GPP TSG-RAN WG2 #99bis, Prague, Czech Republic, Oct. 9-13, 2017, Source: RAN2, Title: LS to RAN1 on SPS and Grant-free.
R2-1711904 3GPP TSG RAN WG2 Meeting #99bis, Prague, Czech Republic, Oct. 9-13, 2017, Source: Qualcomm Incorporated, Title: UE Power Saving during Active State.
R2-1711993 3GPP TSG-RAN WG2 #99bis, Prague, Czech Republic, Oct. 9-13, 2017, Source: RAN2, Title: LS to RAN1 on SPS and Grant-free.
Apr. 29, 2020—European Office Action—EP 18202948.8.
R1-1717905 3GPP TSG RAN WG1 Meeting #90bis, Prague, Czech Republic, Oct. 9-13, 2017, Source: Huawei, HiSilicon, Title: Bandwidth part activation and adaptation.
U.S. Appl. No. 62/416,235. Pelletier, filed 2016.
U.S. Appl. No. 62/440,262. Pelletier, filed 2016.
U.S. Appl. No. 62/500,785. Pelletier, filed 2017.
U.S. Appl. No. 62/519,249. Pelletier, filed 2017.
U.S. Appl. No. 62/539,057. Pelletier, filed 2017.
U.S. Appl. No. 62/563,440. Pelletier, filed 2017.
Jun. 4, 2021—European Office Action—EP 18202948.8.
R1-1715675 3GPP TSG RAN WG1 Meeting NR Ad Hoc, Nagoya, Japan, Sep. 18-21, 2017, Source: Guangdong OPPO Mobile Telecom, Title: Uplink power control mechanism for NR.
R1-1715838 3GPP TSG RAN WG1 Meeting NR Ad Hoc, Nagoya, Japan, Sep. 18-21, 2017, Source: CATT, Title: NR Power Control Framework.
R1-1715902 3GPP TSG RAN WG1 Meeting NR Ad Hoc, Nagoya, Japan, Sep. 18-21, 2017, Source: LG Electronics, Title: Discussion on UL power control for NR.
R1-1716040 3GPP TSG RAN WG1 Meeting NR Ad Hoc, Nagoya, Japan, Sep. 18-21, 2017, Source: Samsung, Title: On UL Power Control.
R1-1716061 3GPP TSG RAN WG1 Meeting NR Ad Hoc, Nagoya, Japan, Sep. 18-21, 2017, Source: CMCC, Title: Discussion on power control framework.
R1-1716114 3GPP TSG RAN WG1 Meeting NR Ad Hoc, Nagoya, Japan, Sep. 18-21, 2017, Source: NTT DOCOMO, Inc., Title: Power control framework for PUSCH.
R1-1716127 3GPP TSG RAN WG1 Meeting NR Ad Hoc, Nagoya, Japan, Sep. 18-21, 2017, Source: Nokia, Nokia Shanghai Bell, Title: Discussion on NR power control framework.
R1-1716451 3GPP TSG RAN WG1 Meeting NR Ad Hoc, Nagoya, Japan, Sep. 18-21, 2017, Source: Qualcomm Incorporated, Title: Power control and PHR for NR.
R1-1716515 3GPP TSG RAN WG1 Meeting NR Ad Hoc, Nagoya, Japan, Sep. 18-21, 2017, Source: InterDigital Inc., Title: Further Details on Uplink Power Control.
R1-1716535 3GPP TSG RAN WG1 Meeting NR Ad Hoc, Nagoya, Japan, Sep. 18-21, 2017, Source: Panasonic, Title: Discussion on NR power control framework.
R1-1716604 3GPP TSG RAN WG1 Meeting NR Ad Hoc, Nagoya, Japan, Sep. 18-21, 2017, Source: Ericsson, Title: NR UL power control framework.
R1-1716606 3GPP TSG RAN WG1 Meeting NR Ad Hoc, Nagoya, Japan, Sep. 18-21, 2017, Source: Ericsson, Title: Closed loop PC in NR.
R1-1717311 3GPP TSG RAN WG1 Meeting NR Ad Hoc, Nagoya, Japan, Sep. 18-21, 2017, Source: Huawei, HiSilicon, Title: General considerations on UL power control design.
R1-1717408 3GPP TSG RAN WG1 Meeting #90bis, Prague, Czech Republic, Oct. 9-13, 2017, Source: Intel Corporation, Title: Remaining Details On UL Power Control Framework.
R1-1717438 3GPP TSG RAN WG1 Meeting #90bis, Prague, Czech Republic, Oct. 9-13, 2017, Source: ZTE, Sanechips, Title: On NR Power Control.
R1-1717508 3GPP TSG RAN WG1 Meeting #90bis, Prague, Czech Republic, Oct. 9-13, 2017, Source: vivo, Title: Remaining issues on NR UL power control.
R1-1717692 3GPP TSG RAN WG1 Meeting #90bis, Prague, Czech Republic, Oct. 9-13, 2017, Source: Samsung, Title: On UL Power Control.
R1-1717846 3GPP TSG RAN WG1 Meeting NR Ad Hoc, Nagoya, Japan, Sep. 18-21, 2017, Source: CATT, Title: NR Power Control Aspects.
R1-1717892 3GPP TSG RAN WG1 Meeting #90bis, Prague, Czech Republic, Oct. 9-13, 2017, Source: CMCC, Title: Discussion on power control framework.
R1-1717919 3GPP TSG RAN WG1 Meeting #90bis, Prague, Czech Republic, Oct. 9-13, 2017, Source: Panasonic, Title: Discussion on NR power control framework.
R1-1717983 3GPP TSG RAN WG1 Meeting #90bis, Prague, Czech Republic, Oct. 9-13, 2017, Source: LG Electronics, Title: Discussion on UL power control for NR.
R1-1718031 3GPP TSG RAN WG1 Meeting #90bis, Prague, Czech Republic, Oct. 9-13, 2017, Source: OPPO, Title: On uplink power control for NR.
R1-1718228 3GPP TSG RAN WG1 Meeting #90bis, Prague, Czech Republic, Oct. 9-13, 2017, Source: NTT DOCOMO, Inc., Title: Power control framework for PUSCH.
R1-1718502 3GPP TSG RAN WG1 Meeting #90bis, Prague, Czech Republic, Oct. 9-13, 2017, Source: InterDigital, Inc., Title: On NR Power Control Framework.
R1-1718592 3GPP TSG RAN WG1 Meeting #90bis, Prague, Czech Republic, Oct. 9-13, 2017, Source: Qualcomm Incorporated, Title: Power control and PHR for NR.

(56) References Cited

OTHER PUBLICATIONS

R1-1718625 3GPP TSG RAN WG1 Meeting #90bis, Prague, Czech Republic, Oct. 9-13, 2017, Source: ITL, Title: UL power control and PHR.
R1-1718652 3GPP TSG RAN WG1 Meeting #90bis, Prague, Czech Republic, Oct. 9-13, 2017, Source: Ericsson, Title: NR power control framework.
R1-1718655 3GPP TSG RAN WG1 Meeting #90bis, Prague, Czech Republic, Oct. 9-13, 2017, Source: Ericsson, Title: Further details on closed loop power control.
R1-1718692 3GPP TSG RAN WG1 Meeting #90bis, Prague, Czech Republic, Oct. 9-13, 2017, Source: Nokia, Nokia Shanghai Bell, Title: Discussion on NR power control framework.
R1-1718704 3GPP TSG RAN WG1 Meeting #90bis, Prague, Czech Republic, Oct. 9-13, 2017, Source: Motorola Mobility, Lenovo, Title: On NR power control.
3GPP TS 36.413 V13.3.0 (Jun. 2016), Technical Specification, 3rd Generation Partnership Project; Technical Specification Group Radio Access Network; Evolved Universal Terrestrial Radio Access Network (E-UTRAN); S1 Application ; Protocol (S1AP) (Release 13).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V10.3.0 (Sep. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10).
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) Protocol Specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TR 38.802 V14.1.0 (Jun. 2017), Technical Report, 3rd Generation Partnership Project; Technical Specification Group Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
3GPP TSG RAN WG1 Meeting #90bis, Prague, Czech Republic, Oct. 9-13, 2017, Title: RAN1 Chairman's Notes.
3GPP TSG RAN WG1 Meeting #93, Busan, Korea, May 21-25, 2018, Title: RAN1 Chairman's Notes.
3GPP TSG RAN WG2 NR Ad Hoc, Vancouver, Canada, Jan. 22-26, 2018, Source: Session Chair (InterDigital), Title: Report from LTE and NR User Plane Break-Out Session.
R2-1711835 3GPP TSG RAN WG2 Meeting #99bis, Prague, Czech Republic, Oct. 9-13, 2017, Source: Session Chair (InterDigital), Title: Report from LTE and NR User Plane Break-Out Session.
R1-1716353 3GPP TSG RAN WG1 Meeting NR Ad Hoc, Nagoya, Japan, Sep. 18-21, 2017, Source: Ericsson, Title: On dynamic triggering for CSI reports and CSI-RS.
R1-1716354 3GPP TSG RAN WG1 Meeting NR Ad Hoc, Nagoya, Japan, Sep. 18-21, 2017, Source: Ericsson, Title: A comparison of CSI-RS activation schemes based on MAC CE and DCI.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1717939 3GPP TSG RAN WG1 Meeting #90bis, Prague, Czech Republic, Oct. 9-13, 2017, Source: LG Electronics, Title: Discussion on CSI measurement.
R1-1801073 3GPP TSG RAN WG1 NR Ad Hoc, Vancouver, Canada, Jan. 22-26, 2018, Source: RAN2, Title: LS on PDCCH order for initiation of random access.
R1-1805701 3GPP TSG RAN WG1 Meeting #92bis, Sanya, China, Apr. 16-20, 2018, Source: Qualcomm Incorporated, Title: Summary of Remaining Details on RACH Procedure.
R1-1805876 3GPP TSG RAN WG1 Meeting #93, Busan, Korea, May 21-25, 2018, Source: Huawei, HiSilicon, Title: Remaining details of RACH Procedures.
Jan. 16, 2019—European Search Report—EP 18202948.8.
OPPO "SPS operations for BWP switching" Oct. 8, 2017.
Ericsson "URLLC aspects for grant-free UL transmission in NR" Feb. 12, 2017.
Mar. 29, 2019—Extended European Search Report—EP 18205418.9.
Jun. 28, 2019—European Extended Search Report—19166254.3.
Huawei, HiSilicon: "Bandwidth part activation and adaptation", Sep. 1, 20178.
InterDigital, Inc.: "Remaining details of BWP", Sep. 18, 2017.
LG Electronics: "Discussion on carrier aggregation and bandwidth parts", Sep. 18, 2017.
R1-1718901 3GPP TSG RAN WG1 Meeting 90bis, Prague, Czech Republic, Oct. 9-13, 2017, Source: MediaTek Inc., Title: Summary of Bandwidth Part Operation.
Jul. 10, 2019—European Extended Search Report—EP 19175762.4.
3GPP TSG-RAN WG2 Meeting #102: "Email Discussion on SSB and Cell relationship", May 21, 2018.
3GPP TSG RAN WG1 Meeting #93: "Remaining Issues on Beam Management", May 21, 2018.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.

(56) References Cited

OTHER PUBLICATIONS

R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716109 3GPP TSG RAN WG1 Meeting NR Ad Hoc, Nagoya, Japan, Sep. 18-21, 2017, Source: NTT DOCOMO,Inc., Title: Remaining issues on bandwidth parts for NR.
R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.
R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.
R1-1716258 3GPP TSG RAN WG1 Meeting NR Ad Hoc, Nagoya, Japan, Sep. 18-21, 2017, Source: InterDigital, Inc., Title: Remaining details of BWP.
R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.
R1-1716440 3GPP TSG RAN WG1 Meeting NR Ad Hoc, Nagoya, Japan, Sep. 18-21, 2017, Source: Qualcomm Incorporated, Title: CA and BWP.
R1-1716601 3GPP TSG RAN WG1 Meeting NR Ad Hoc, Nagoya, Japan, Sep. 18-21, 2017, Source: Ericsson, Title: On CA related aspects and BWP related aspects.
R1-1716647 3GPP TSG RAN WG1 Meeting NR Ad Hoc, Nagoya, Japan, Sep. 18-21, 2017, Source: Convida Wireless, Title: Discussion on BWP Design.
R1-1717077 3GPP TSG RAN WG1 Meeting #90bis, Prague, Czech Republic, Oct. 9-13, 2017, Source: Huawei, HiSilicon, Title: Remaining issues on bandwidth part.
R1-1717400 3GPP TSG RAN WG1 Meeting #90bis, Prague, Czech Republic, Oct. 9-13, 2017, Source: Intel Corporation, Title: Remaining details for bandwidth parts.
R1-1717504 3GPP TSG RAN WG1 Meeting #90bis, Prague, Czech Republic, Oct. 9-13, 2017, Source: vivo, Title: Remaining details for bandwidth part operation.
R1-1717675 3GPP TSG RAN WG1 Meeting #90bis, Prague, Czech Republic, Oct. 9-13, 2017, Source: Samsung, Title: On Bandwidth Part Operation.
R1-1717839 3GPP TSG RAN WG1 Meeting #90bis, Prague, Czech Republic, Oct. 9-13, 2017, Source: CATT, Title: Remaining aspects of BWP operation.
R1-1717972 3GPP TSG RAN WG1 Meeting #90bis, Prague, Czech Republic, Oct. 9-13, 2017, Source: LG Electronics, Title: Remaining issues on bandwidth parts.
R1-1718050 3GPP TSG RAN WG1 Meeting #90bis, Prague, Czech Republic, Oct. 9-13, 2017, Source: OPPO, Title: Remaining issues on bandwidth part configuration and activation.
R1-1718223 3GPP TSG RAN WG1 Meeting #90bis, Prague, Czech Republic, Oct. 9-13, 2017, Source: NTT DOCOMO, Inc., Title: Remaining issues on bandwidth parts for NR.
R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.
R1-1718365 3GPP TSG RAN WG1 Meeting #90bis, Prague, Czech Republic, Oct. 9-13, 2017, Source: InterDigital, Inc., Title: Remaining details of BWP.
R1-1718404 3GPP TSG RAN WG1 Meeting #90bis, Prague, Czech Republic, Oct. 9-13, 2017, Source: AT&T, Title: Remaining details for bandwidth parts.
R1-1718523 3GPP TSG RAN WG1 Meeting #90bis, Prague, Czech Republic, Oct. 9-13, 2017, Source: Ericsson, Title: On bandwidth parties.
R1-1718580 3GPP TSG RAN WG1 Meeting #90bis, Prague, Czech Republic, Oct. 9-13, 2017, Source: Qualcomm Incorporated, Title: Open Issues on BWP.
R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.
R1-1715454 3GPP TSG RAN WG1 Meeting NR Ad Hoc, Nagoya, Japan, Sep. 18-21, 2017, Source: ZTE, Sanechips, Title: On NR Power Control.
R1-1715478 3GPP TSG RAN WG1 Meeting NR Ad Hoc, Nagoya, Japan, Sep. 18-21, 2017, Source: Huawei, HiSilicon, Title: General considerations on UL power control design.
R1-1715505 3GPP TSG RAN WG1 Meeting NR Ad Hoc, Nagoya, Japan, Sep. 18-21, 2017, Source: Mitsubishi Electric, Title: UL transmission power control.
R1-1715651 3GPP TSG RAN WG1 Meeting NR Ad Hoc, Nagoya, Japan, Sep. 18-21, 2017, Source: vivo, Title: NR UL power control framework.
Canadian Office Action mailed Jan. 14, 2025 in CA Patent Application No. 3,024,549.

\* cited by examiner

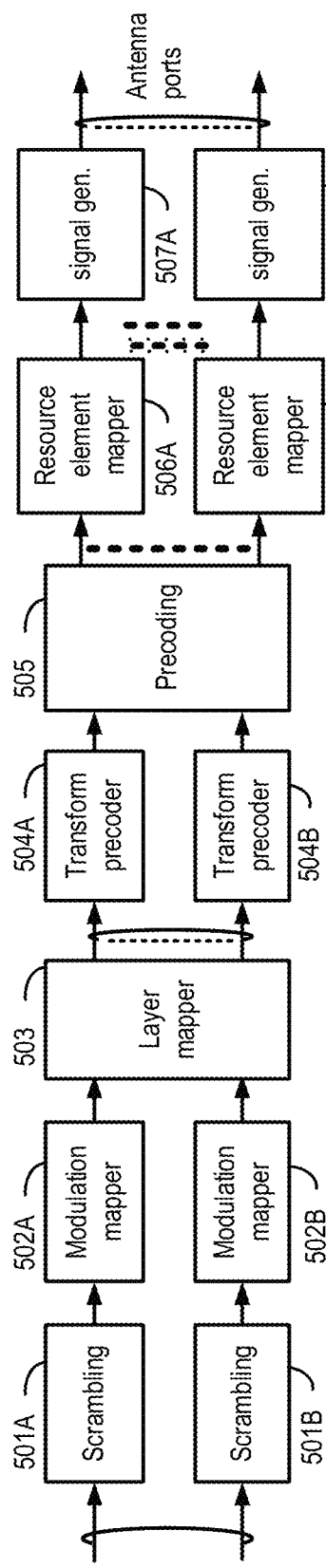
FIG. 5A Example uplink physical channel
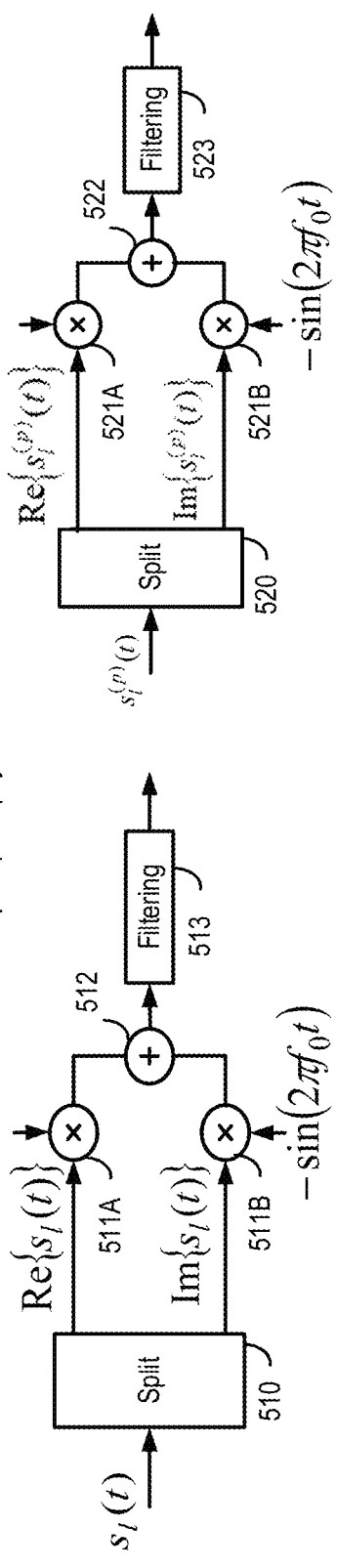
FIG. 5B Example uplink modulation
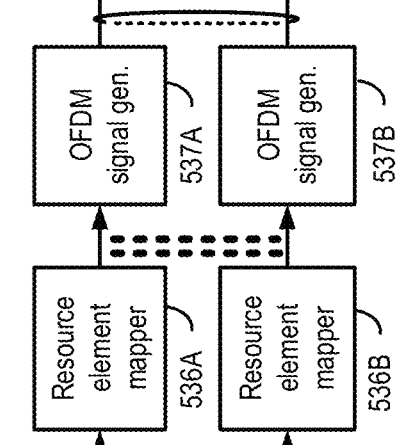
FIG. 5D Example downlink modulation
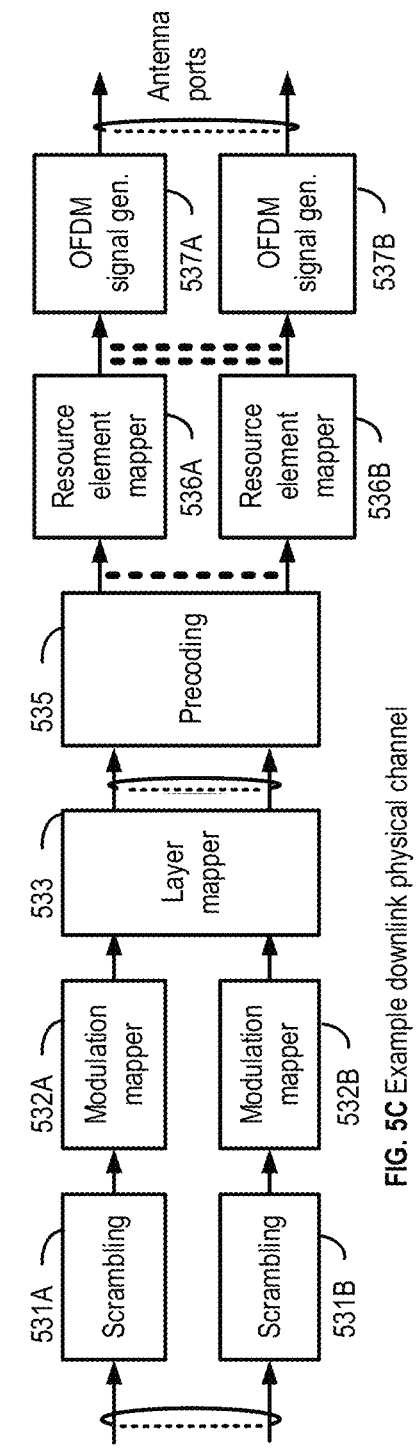
FIG. 5C Example downlink physical channel

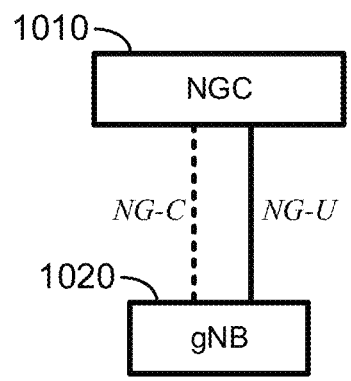
FIG. 10A gNB connected to NGC
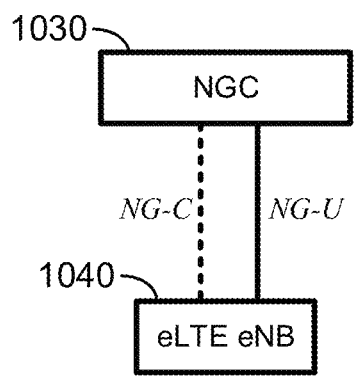
FIG. 10B eLTE eNB connected to NGC

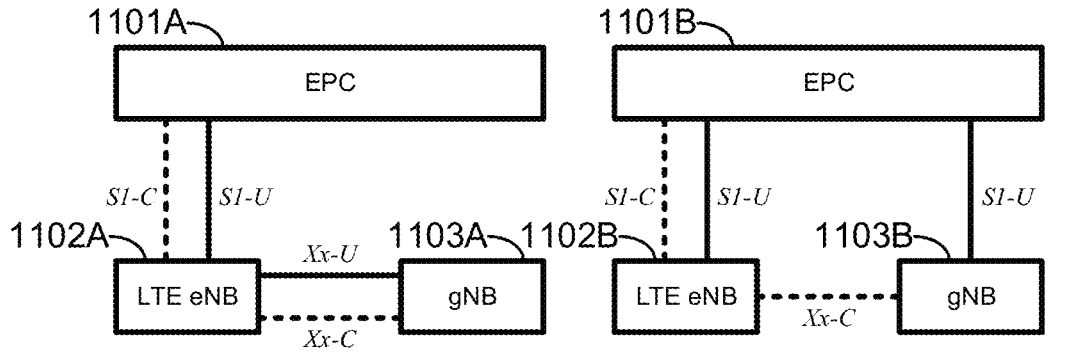

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

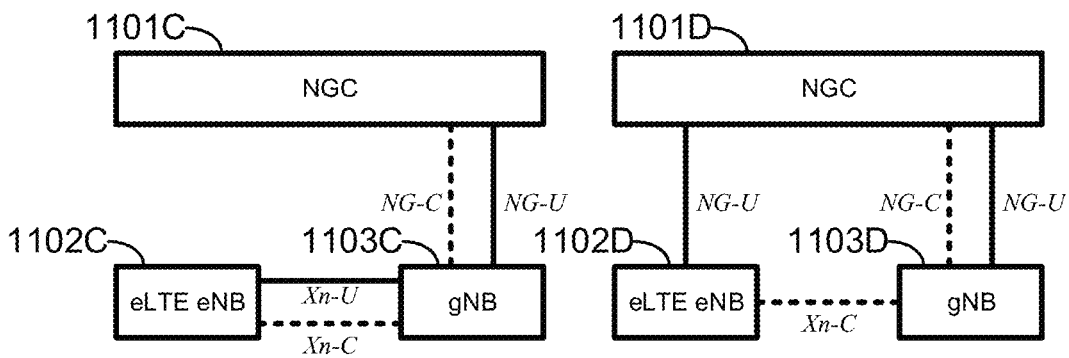

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

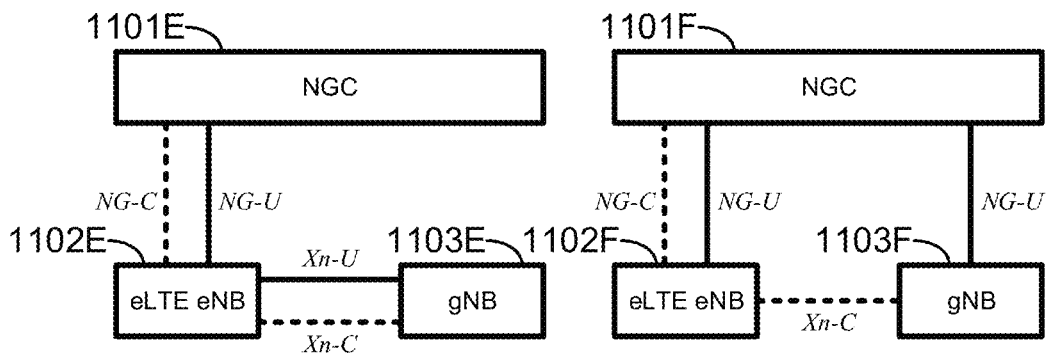

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

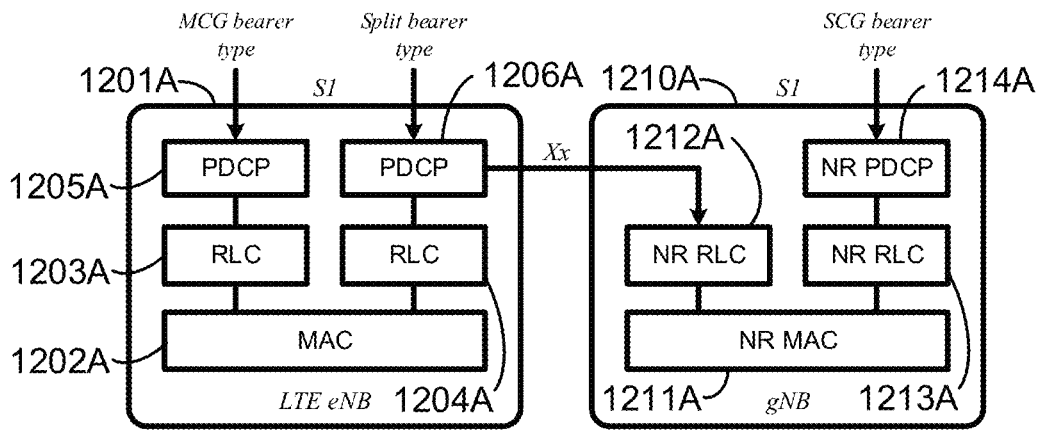
FIG. 12A Radio protocol architecture for split bearer and SCG bearer. LTE eNB connected to EPC with non-standalone gNB.
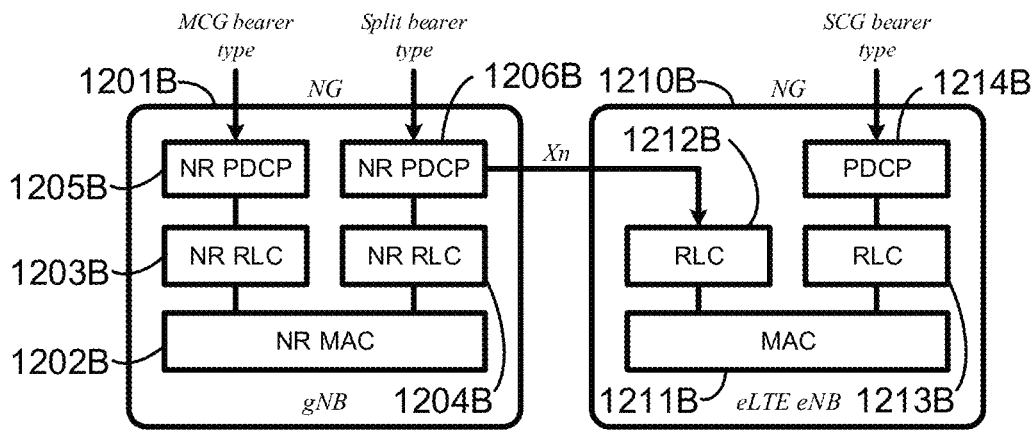
FIG. 12B Radio protocol architecture for split bearer and SCG bearer. gNB connected to NGC with non-standalone eLTE eNB.
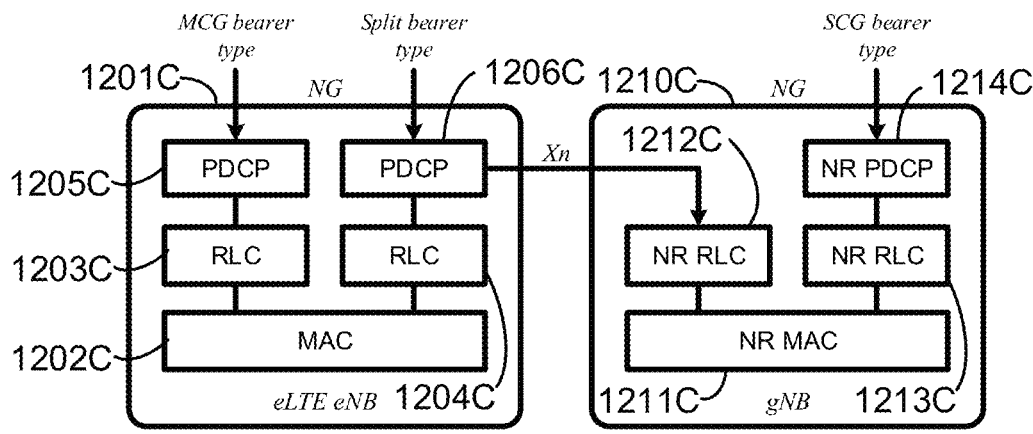
FIG. 12C Radio protocol architecture for split bearer and SCG bearer. eLTE eNB connected to NGC with non-standalone gNB.

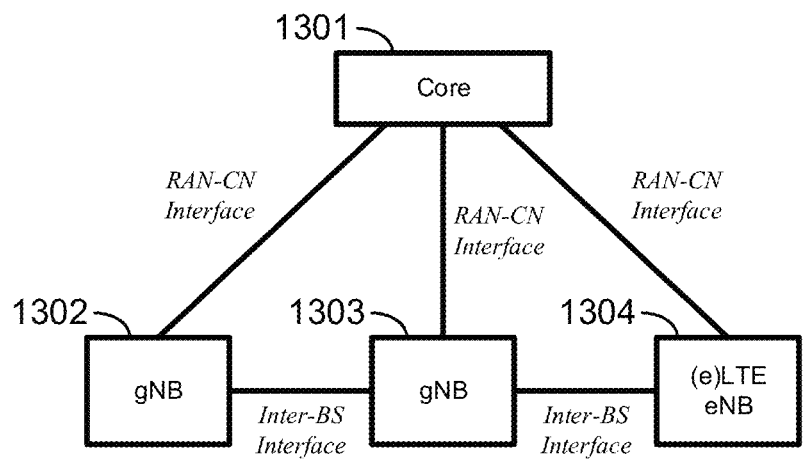
FIG. 13A Non-centralized deployment
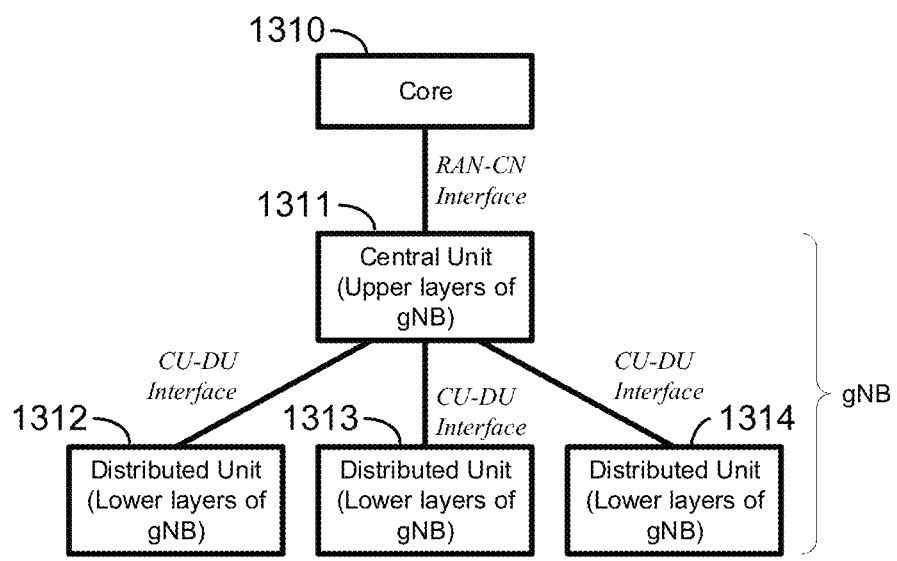
FIG. 13B Centralized deployment

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
|  |  |  |  |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
|  |  |  |  |
| Special | 3, 3A | 45 | Power control commands |
|  | 5 |  | Sidelink operation |
|  | 6-2 |  | Paging/direct indication for eMTC devices |

FIG. 18

| TDD UL/DL Configuration | subframe (TTI, slot, and/or mini-slot) number i | | | | | | | | |
|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

| TPC Command Field in DCI format 0/0A/0B/3/4/4A/4B/6-0A/3B | Accumulated $\delta_{PUSCH,c}$ [dB] | Absolute $\delta_{PUSCH,c}$ [dB] only DCI format 0/0A/0B/4/4A/4B/6-0A |
|---|---|---|
| 0 | -1 | -4 |
| 1 | 0 | -1 |
| 2 | 1 | 1 |
| 3 | 3 | 4 |

| TPC Command Field in DCI format 3A/3B | Accumulated $\delta_{PUSCH,c}$ [dB] |
|---|---|
| 0 | -1 |
| 1 | 1 |

FIG. 19C

| TPC Command Field in DCI format 1A/1B/1D/1/2A/2B/2C/2D/2/3/6-1A | $\delta_{PUCCH}$ [dB] |
|---|---|
| 0 | -1 |
| 1 | 0 |
| 2 | 1 |
| 3 | 3 |

FIG. 20A

| TPC Command Field in DCI format 3A | $\delta_{PUCCH}$ [dB] |
|---|---|
| 0 | -1 |
| 1 | 1 |

FIG. 20B

POWER CONTROL FOR BANDWIDTH PART SWITCHING

CROSS-REFERENCE TO RELATED APPLICATIONS

This application is a continuation of and claims priority to U.S. patent application Ser. No. 17/152,348, filed Jan. 19, 2021, which is a continuation of U.S. patent application Ser. No. 16/193,931, filed on Nov. 16, 2018 (now U.S. Pat. No. 10,945,172), which claims the benefit of U.S. Provisional Application No. 62/587,182, filed on Nov. 16, 2017, each of which is hereby incorporated by reference in its entirety.

BACKGROUND

In wireless communications, bandwidth parts and other wireless resources may be used by wireless devices. A base station may determine that one or more wireless devices should use or switch to one or more bandwidth parts or other wireless resources. It is desired to improve wireless communications without adversely increasing signaling overhead and/or decreasing spectral efficiency.

SUMMARY

The following summary presents a simplified summary of certain features. The summary is not an extensive overview and is not intended to identify key or critical elements.

Systems, apparatuses, and methods are described for communications associated with switching bandwidth parts or other wireless resources. A wireless network may guarantee different service with different quality of service (QoS) requirements. Closed-loop power control (CL-CP) may be used to satisfy different service requirements. CL-CP may be reset properly, in time, taking into account a change of channel conditions. A base station may configure at least one power control process associated with one or more wireless devices. A CL-CP of the power control process may reflect the power change needed according to the channel environmental change. A determination of whether or not to reset the CL-CP may depend at least on a beam change. The wireless device transmission power may change based on an estimated power loss. The wireless device may change the transmission power and/or reset the CL-CP based on or in response to different beam directions. The CL-CP may be applied or inherited from an old beam to a new beam. Among different power control processes, the wireless device may reset the CL-CP based on or in response to beam switching across the power control processes. The at least one power control process may be associated with one or more numerologies. The CL-CP may be reset based on at least on a change of numerology. Different numerologies may be assigned to different frequencies, which may have different levels of propagation loss and/or interference that may be affected by uplink and/or downlink transmission. As the numerology change may result in changing a path loss and/or interference level, a wireless device may reset the CL-CP based on or in response to changing a numerology from one to another. The CL-CP may be reset if the numerology change occurs across different power control processes.

These and other features and advantages are described in greater detail below.

BRIEF DESCRIPTION OF THE SEVERAL VIEWS OF THE DRAWINGS

Examples of several of the various embodiments of the present invention are described herein with reference to the drawings.

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

FIG. 18 shows an example table of DCI formats.

FIG. 19A shows an example table of $K_{PUSCH}$ for TDD configuration 0-6.

FIG. 19B shows an example table of mappings of TPC Command Field in DCI format 0/0A/0B/3/4/4A/4B/6-0A/3B to absolute and accumulated $\delta_{PUSCH,c}$ values.

FIG. 19C shows an example table of mappings of TPC Command Field in DCI format 3A/3B to accumulated $\delta_{PUSCH,c}$ values.

FIG. 20A shows an example table of mappings of TPC Command Field in DCI format 1A/1B/1D/1/2A/2B/2C/2D/2/3/6-1A to $\delta_{PUCCH}$ values.

FIG. 20B shows an example table of mappings of TPC Command Field in DCI format 3A to $\delta_{PUCCH}$ values.

DETAILED DESCRIPTION OF EMBODIMENTS

Figure 1:
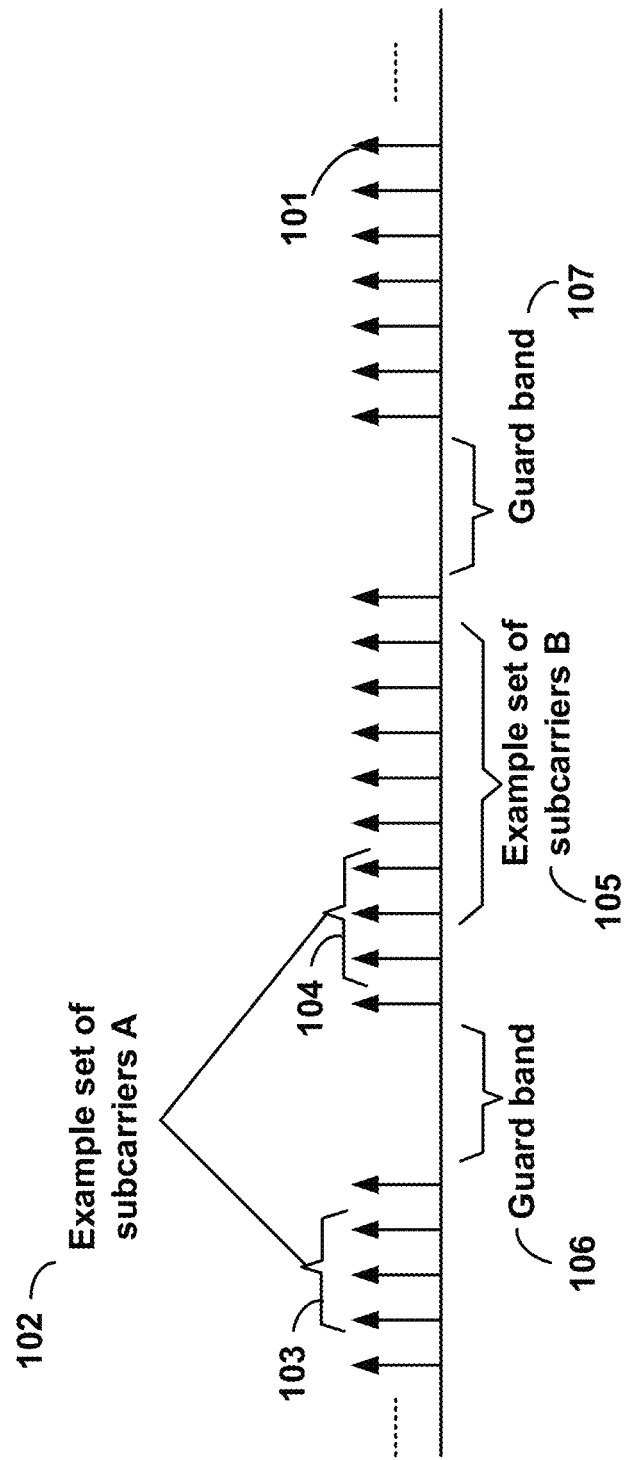
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may relate to bandwidth part switching in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be used. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
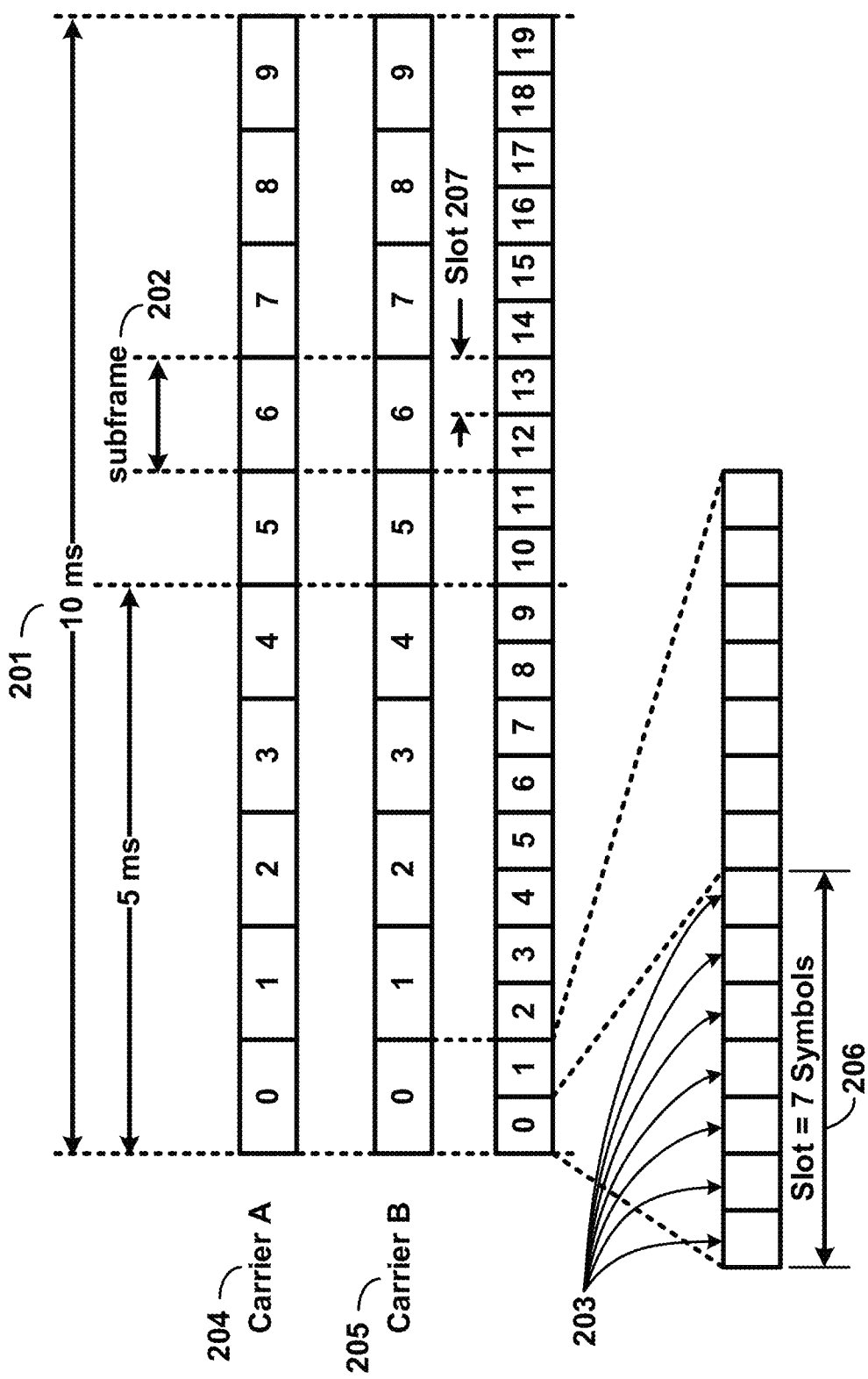
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
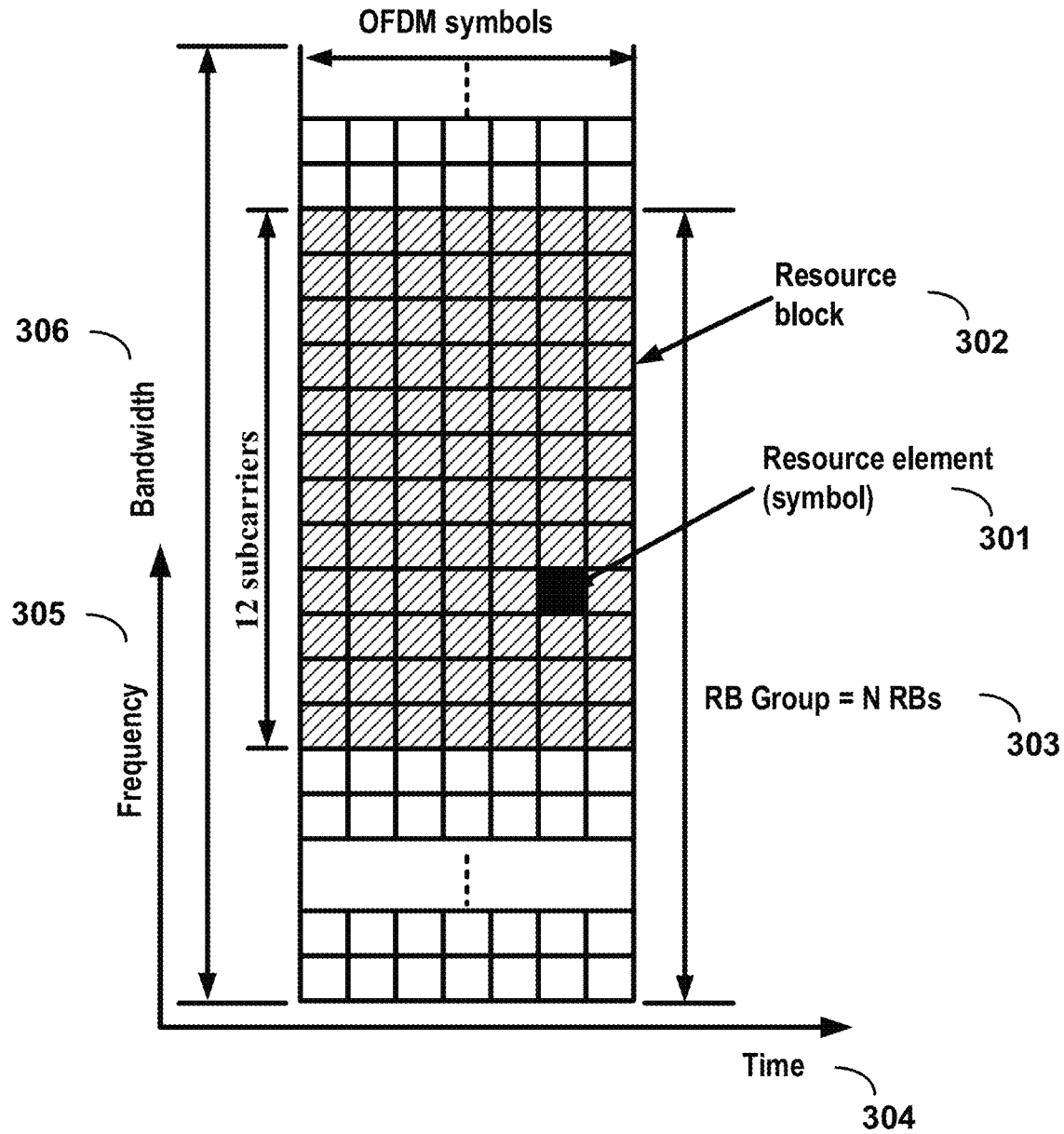
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
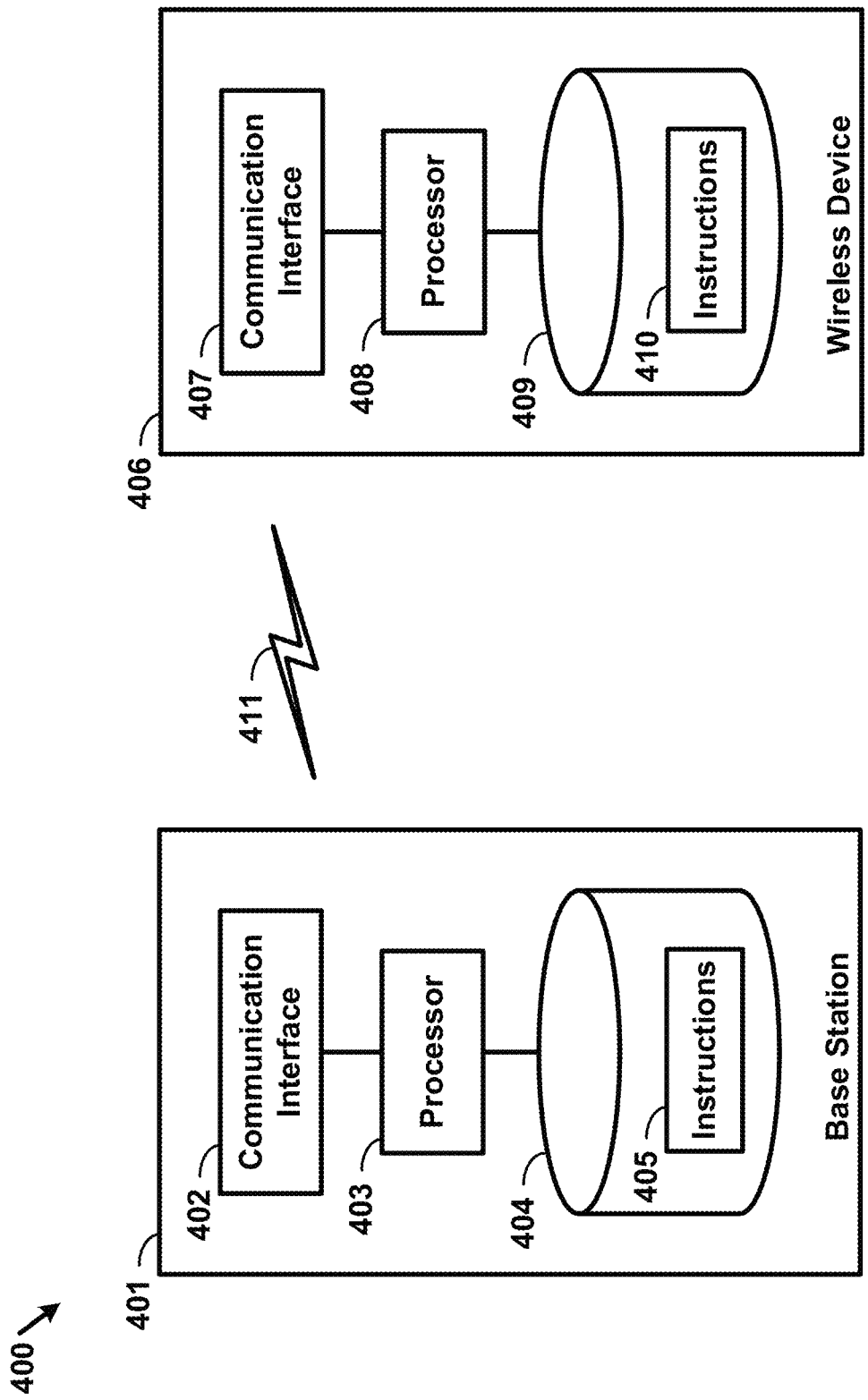
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, abase station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCell-ToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_l(t)$, may be split, by a signal splitter 510, into real and imaginary components, $Re\{s_l(t)\}$ and $Im\{s_l(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_l^{(p)}(t)$, may be split, by a signal splitter 520, into real and imaginary components, $\text{Re}\{s_l^{(p)}(t)\}$ and $\text{Im}\{s_l^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
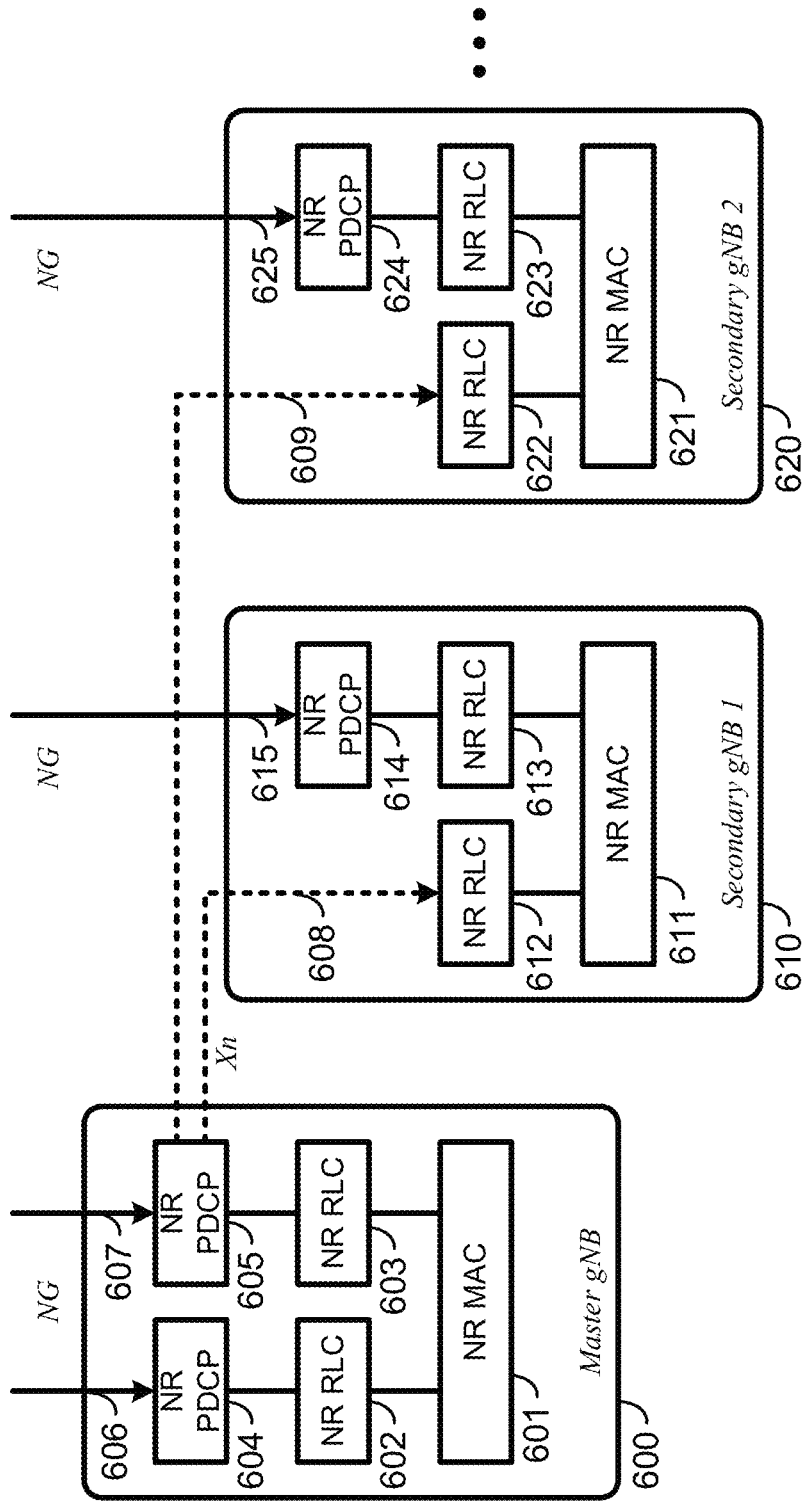
FIG. 6 shows an example protocol structure with multi-connectivity.
Figure 7:
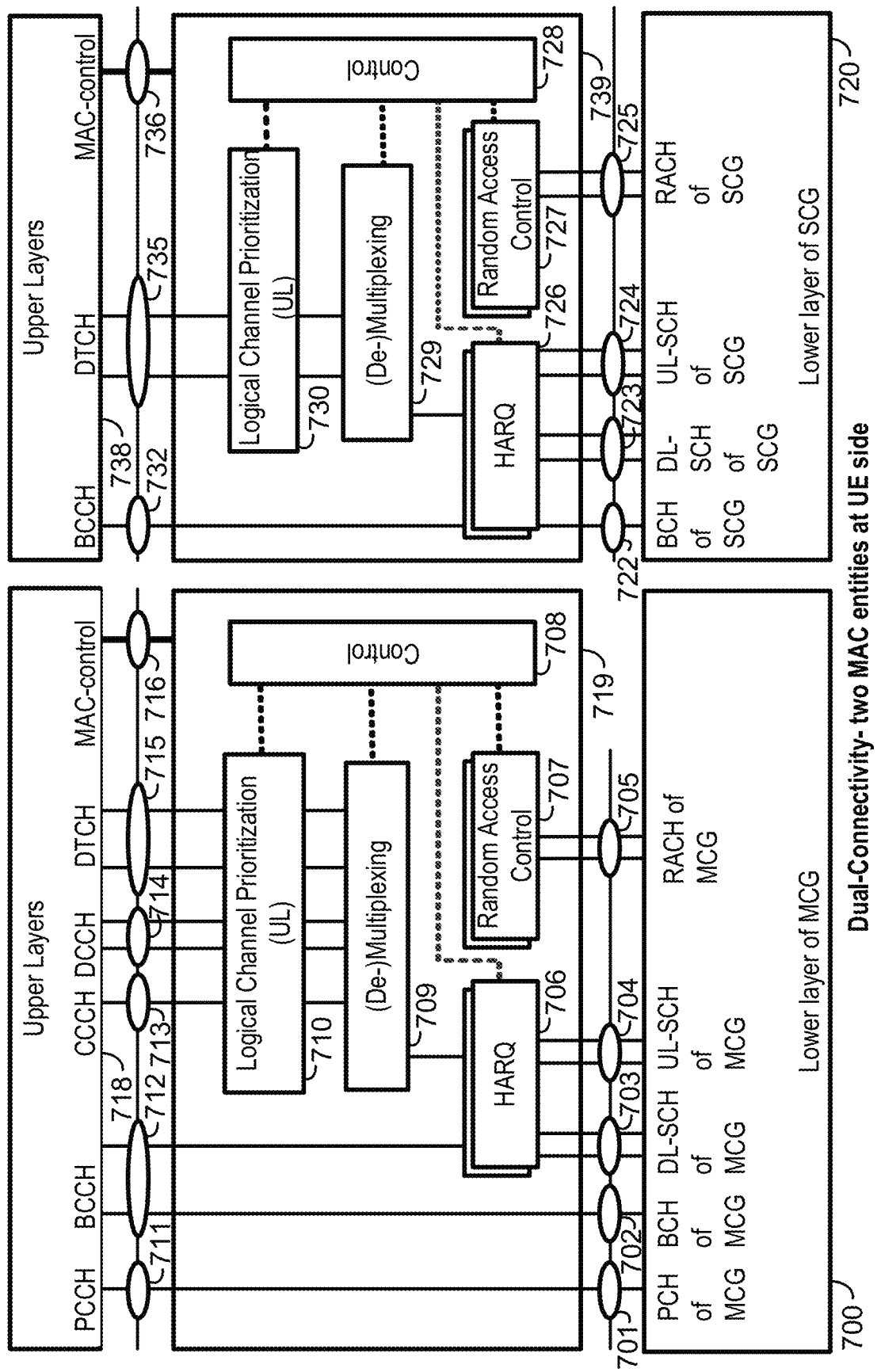
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell, for example, during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a random access (RA) procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
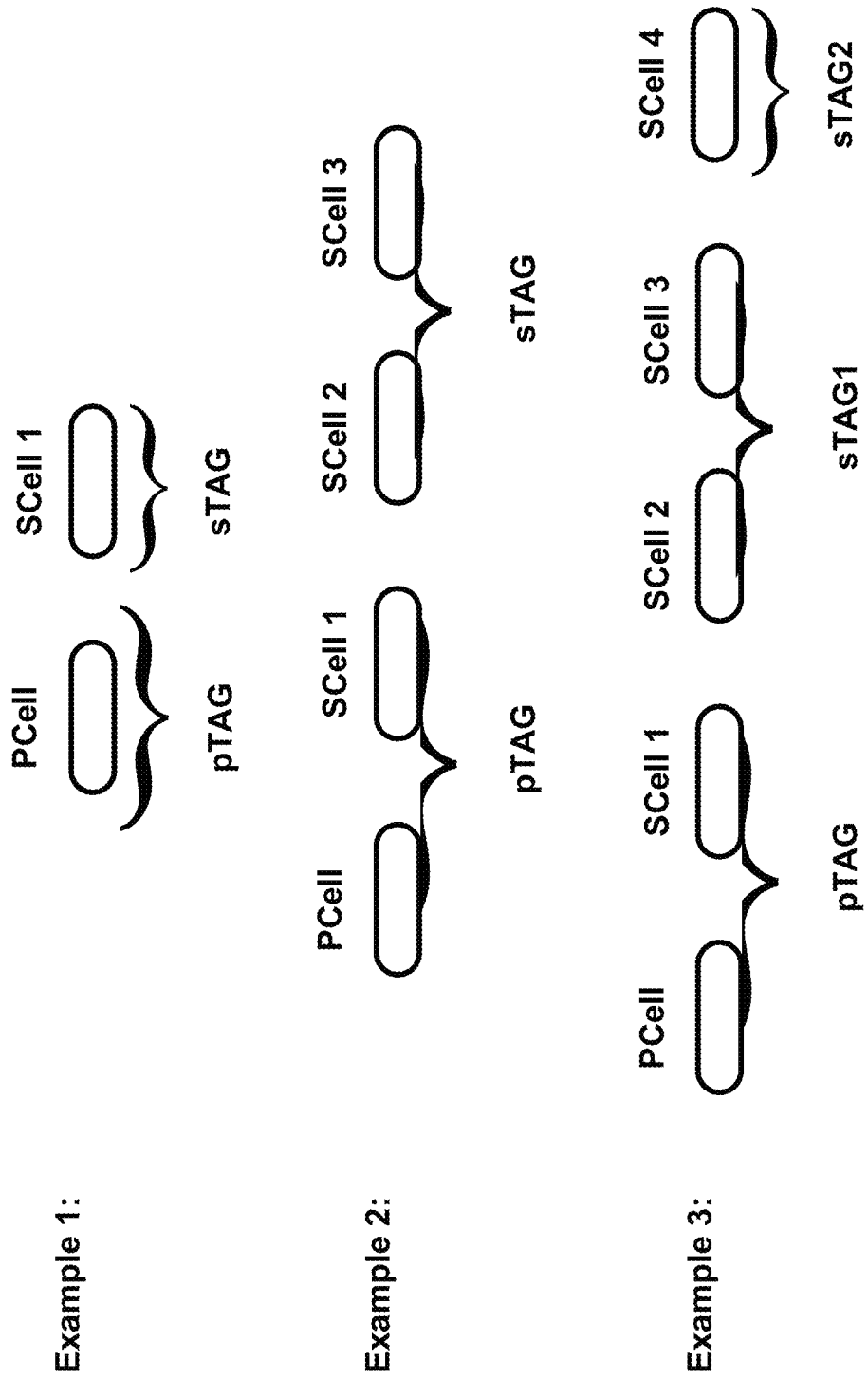
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
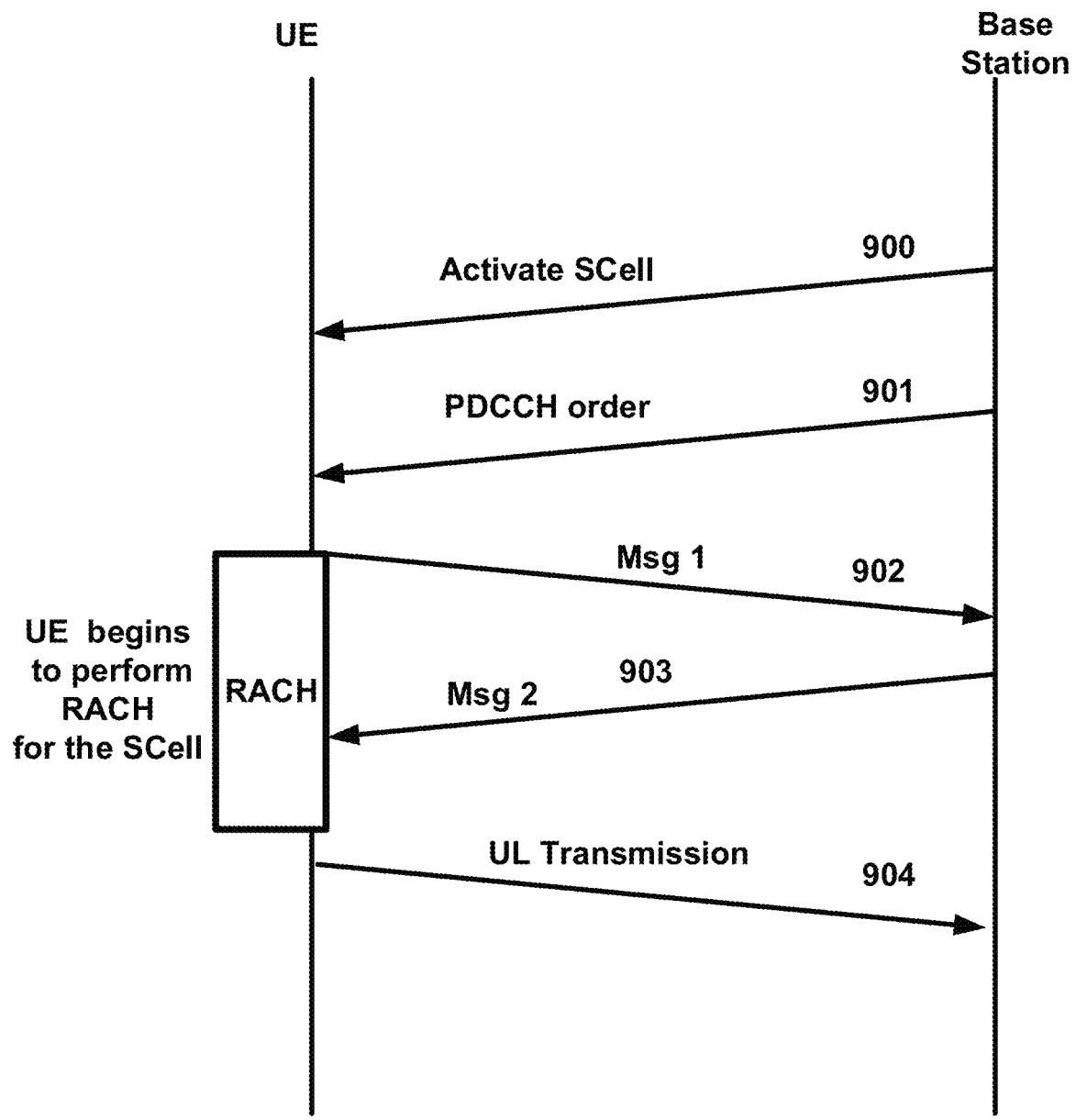
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell, for example, during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change, for example, during operation (e.g., after the Fs interface setup procedure), or the functional split option may change only in the Fs setup procedure (e.g., the functional split option may be static during operation after Fs setup procedure).

Figure 14:
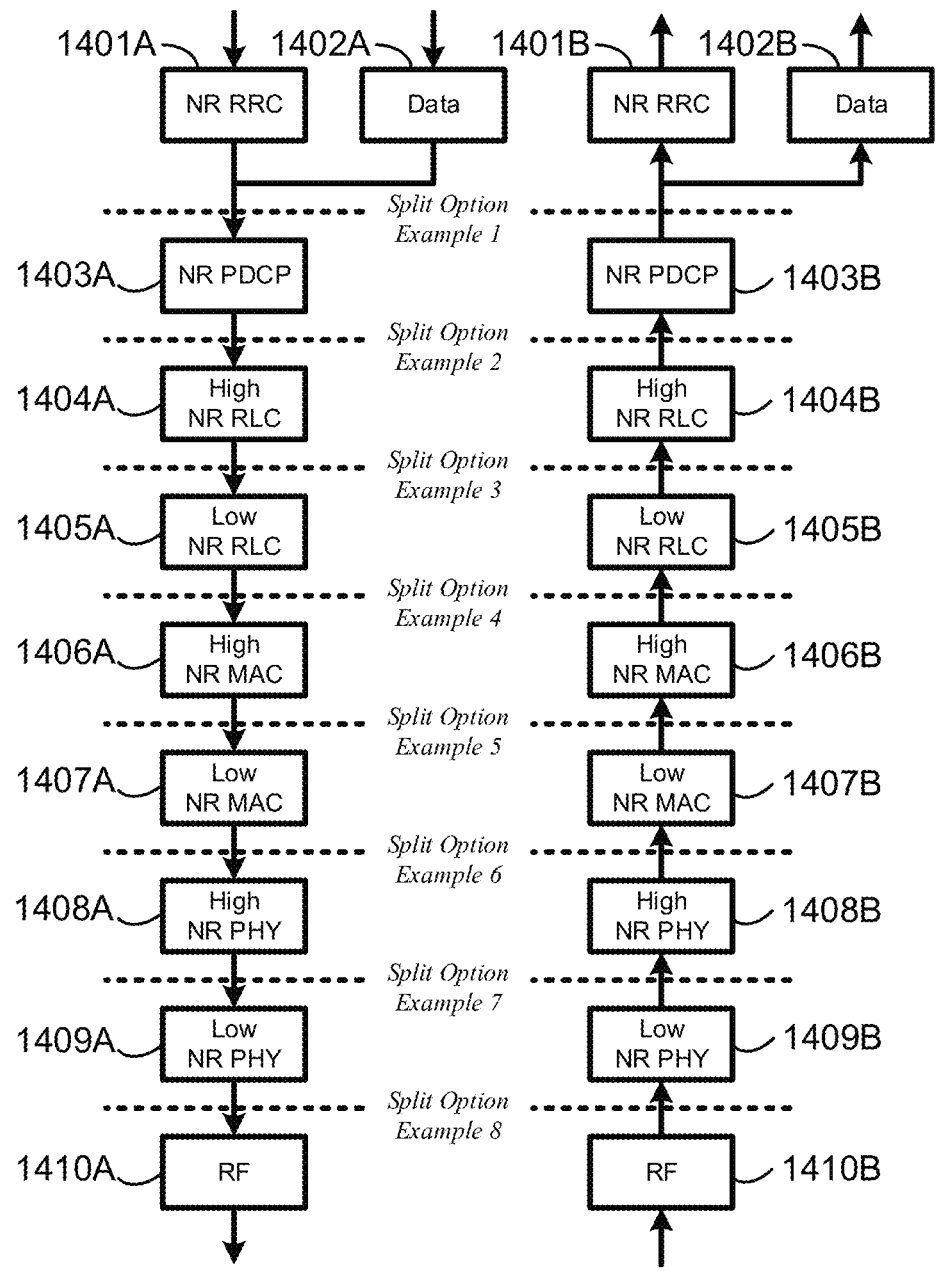
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and a radio frequency (RF) 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel.

LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A wireless device configured for operation with wireless resources (e.g., bandwidth parts (BWPs)) of a serving cell may be configured by higher layers for the serving cell. The wireless device may be configured for a set of BWPs for receptions by the wireless device (e.g., DL BWP set) and/or a set of BWPs for transmissions by the wireless device (e.g., UL BWP set). For a DL BWP, an UL BWP in a set of DL BWPs, and/or an UL BWPs, the wireless device may be configured with at least one of following for the serving cell: a subcarrier spacing for DL and/or UL provided by a higher layer parameter, a cyclic prefix for DL and/or UL provided by a higher layer parameter, a number of contiguous physical resource blocks (PRBs) for DL and/or UL provided by a higher layer parameter, an offset of the first PRB for DL and/or UL in the number of contiguous PRBs relative to the first PRB by a higher layer, and/or Q control resource sets (e.g., if the BWP is a DL BWP). Higher layer signaling may configure a wireless device with Q control resource sets, for example, for each serving cell. For a control resource set q, such that 0≤q<Q, the configuration may comprise one or more of following: a first OFDM symbol provided by one or more higher layer parameters, a number of consecutive OFDM symbols provided by one or more higher layer parameters, a set of resource blocks provided by one or more higher layer parameters, a CCE (control channel element)-to-REG (resource element group) mapping provided by one or more higher layer parameters, a REG bundle size (e.g., for interleaved CCE-to-REG mapping provided by one or more higher layer parameters), and/or antenna port quasi-collocation provided by a higher layer parameter.

A control resource set may comprise a set of CCEs numbered from 0 to $N_{CCE,q}-1$, where $N_{CCE,q}$ may be the number of CCEs in control resource set q. Sets of PDCCH candidates that a wireless device monitors may be defined in terms of PDCCH wireless device-specific search spaces. A PDCCH wireless device-specific search space at CCE aggregation level L∈{1, 2, 4, 8} may be defined by a set of PDCCH candidates for CCE aggregation level L. A wireless device may be configured (e.g., for a DCI format), per serving cell by one or more higher layer parameters, for a number of PDCCH candidates per CCE aggregation level L.

A wireless device may monitor (e.g., in non-DRX mode operation) one or more PDCCH candidate in control resource set q according to a periodicity of $W_{PDCCH,q}$ symbols. The symbols may be configured by one or more higher layer parameters for control resource set q. The carrier indicator field value may correspond to cif-InSchedulingCell, for example, if a wireless device is configured with a higher layer parameter (e.g., cif-InSchedulingCell). For the serving cell on which a wireless device may monitor one or more PDCCH candidate in a wireless device-specific search space, the wireless device may monitor the one or more PDCCH candidates without carrier indicator field (e.g., if the wireless device is not configured with a carrier indicator field). For the serving cell on which a wireless device may monitor one or more PDCCH candidates in a wireless device-specific search space, the wireless device may monitor the one or more PDCCH candidates with carrier indicator field (e.g., if a wireless device is configured with a carrier indicator field). A wireless device may not monitor one or more PDCCH candidates on a secondary cell, for example, if the wireless device is configured to monitor one or more PDCCH candidates with carrier indicator field corresponding to that secondary cell in another serving cell. For the serving cell on which the wireless device may monitor one or more PDCCH candidates, the wireless device may monitor the one or more PDCCH candidates at least for the same serving cell.

A wireless device may receive PDCCH and/or PDSCH in a DL BWP according to a configured subcarrier spacing and cyclic prefix (CP) length for the DL BWP. A wireless device may transmit PUCCH and/or PUSCH in an UL BWP according to a configured subcarrier spacing and CP length for the UL BWP.

A wireless device may be configured, by one or more higher layer parameters, for a DL BWP from a configured DL BWP set for DL receptions. A wireless device may be configured, by one or more higher layer parameters, for an UL BWP from a configured UL BWP set for UL transmissions. A DL BWP index field value may indicate a DL BWP (such as from the configured DL BWP set) for DL receptions, for example, if the DL BWP index field is configured in a DCI format scheduling PDSCH reception to a wireless device. A UL-BWP index field value may indicate the UL BWP (such as from the configured UL BWP set) for UL transmissions, for example, if the UL-BWP index field is configured in a DCI format scheduling PUSCH transmission from a wireless device.

A wireless device may determine that the center frequency for the DL BWP is or should be the same as the center frequency for the UL BWP, such as for TDD. The wireless device may not monitor PDCCH, for example, if the wireless device performs measurements over a bandwidth that is not within the DL BWP for the wireless device.

A wireless device may identify the bandwidth and/or frequency of an initial active DL BWP, such as for an initial active DL BWP. The wireless device may identify the bandwidth and/or frequency after or in response to receiving the NR-PBCH. A bandwidth of an initial active DL BWP may be confined within the wireless device minimum bandwidth for the given frequency band. The bandwidth may be indicated in PBCH, such as for flexible DL information scheduling. Some bandwidth candidates may be predefined. A number of bits (e.g., x bits) may be used for a bandwidth indication.

A frequency location of an initial active DL BWP may be derived from the bandwidth and SS block (e.g., a center frequency of the initial active DL BWP). The edge of the SS block PRB and data PRB boundary may not be aligned. An SS block may have a frequency offset, for example, if the edge of the SS block PRB and data PRB are not aligned. Predefining the frequency location of an SS block and an initial active DL BWP may reduce the PBCH payload size such that additional bits may not be needed for an indication of a frequency location of an initial active DL BWP.

One SS block may comprise at least one primary synchronization signal (PSS) symbol, at least one secondary synchronization signal (SSS) symbol, and one or more PBCH symbols, which may be multiplexed in time division manner, e.g., PSS+PBCH+SSS+PBCH. For the minimum system information delivery, a base station may transmit a part of minimum system information via PBCH. A base station may transmit remaining minimum system information (RMSI) via shared downlink (DL) channel, PDSCH. The bandwidth and frequency location may be informed in RMSI, for example, for the paired UL BWP.

A base station may configure a set of BWPs for a wireless device by RRC signaling. The wireless device may transmit or receive in an active BWP from the configured BWPs in a given time instance. An activation and/or a deactivation of DL bandwidth part may be based on a timer for a wireless device. The wireless device may switch its active DL bandwidth part to a default DL bandwidth part, for example, if a timer expires. If the wireless device has not received scheduling DCI for a time period (e.g., X ms, or after expiry of a timer), the wireless device may switch to the default DL BWP.

A timer (e.g., BWP Inactivity Timer) may be defined to deactivate an active BWP and/or switch to the default BWP. The timer (e.g., BWP Inactivity Timer) may be started if the active BWP is activated by DCI. If PDCCH on the active BWP is received, a wireless device may restart the timer (e.g., BWP Inactivity Timer). If the timer (e.g., BWP Inactivity Timer) expires, a wireless device may deactivate the active BWP, switch to the default BWP, stop the timer, and/or flush (or not flush) all HARQ buffers associated with the original BWP.

A base station and a wireless device may have a different understanding of the starting of the timer, for example, if the wireless device misses one or more scheduling grants. The wireless device may be triggered to switch to the default BWP, but the base station may schedule the wireless device in the previous active BWP. The base station may restrict the location of a common control resource set (CORESET) of BWP2 to be within BWP1 (e.g., the narrow band BWP1 may be the default BWP), for example, if the default BWP is nested within other BWPs. The wireless device may receive an indication (e.g., CORESET) and switch back to BWP2, for example, if the wireless device previously mistakenly switched to the default BWP.

Restricting the location of the indication (e.g., CORESET) may not solve a miss switching problem, for example, if the default BWP and the other BWPs are not overlapped in frequency domain. The base station may maintain a timer for a wireless device. If the timer expires (e.g., if there is no data scheduled for the wireless device for a time period such as Y1 ms), and/or if the base station has not received feedback from the wireless device for a time period (such as Y2 ms), the wireless device may switch to the default BWP. The wireless device may switch to the default BWP to send a paging signal and/or to re-schedule the wireless device in the default BWP.

A base station may not fix the default bandwidth part to be the same as an initial active bandwidth part. The initial active DL BWP may be the SS block bandwidth which is common to wireless devices in the cell. The traffic load may be very heavy, for example, if many wireless devices fall back to a small bandwidth for data transmission. Configuring the wireless devices with different default BWPs may help to balance the load in the system bandwidth.

There may be no initial active BWP on an SCell, for example, if the initial access is performed on the PCell. A DL BWP and/or UL BWP that are activated based on the SCell may be configured or reconfigured by RRC signaling. The default BWP of the SCell may also be configured and/or reconfigured by RRC signaling. The default BWP may be configured or reconfigured by the RRC signaling, and/or the default BWP may be one of the configured BWPs of the wireless device, which may provide a unified design for both PCell and SCell.

The base station may configure a wireless device-specific default DL BWP. The base station may configure the wireless device-specific default DL BWP, for example, after RRC connection, which may be performed for the purpose of load balancing. The default BWP may support connected mode operations other than operations supported by initial active BWP. Other connected mode operations may comprise, for example, fall back and/or connected mode paging. The default BWP may comprise a common search space, such as at least the search space needed for monitoring the pre-emption indications. The default DL and UL BWPs may be independently configured to the wireless device, such as for FDD.

The initial active DL BWP and/or UL BWP may be set as default DL BWP and/or UL BWP, respectively. A wireless device may return to default DL BWP and/or UL BWP. For example, if a wireless device does not receive control for a long time (e.g., based on a timer expiration or a time duration reaching a threshold), the wireless device may fall back to a default BWP (e.g., default DL BWP and/or default UL BWP).

A base station may configure a wireless device with multiple BWPs. The multiple BWPs may share at least one CORESET including a default BWP. CORESET for RMSI may be shared for all configured BWPs. The wireless device may receive control information via the common CORESET, for example, without going back to another BWP or a default BWP. The common CORESET may schedule data within only a default BWP, which may minimize the ambiguity of resource allocation, for example, if a frequency region of a default BWP may belong to all or more than one of the configured BWPs.

A semi-static pattern of BWP switching to default BWP may be performed, for example, if the configured BWP is associated with a different numerology from a default BWP. Switching to a default BWP may be performed, for example, to check RMSI at least periodically. Switching to a default BWP may be necessary particularly if BWPs use different numerologies.

Reconfiguration of a default BWP from an initial BWP may be performed, such as for RRC connected wireless devices. A default BWP may be the same as an initial BWP, such as for RRC IDLE wireless devices. Additionally or alternatively, a wireless device (e.g., RRC IDLE wireless device) may fall back to an initial BWP regardless of a default BWP. If a wireless device performs a measurement based on SS block, reconfiguration of a default BWP outside of an initial BWP may become very inefficient, for example, due to frequent measurement gaps. If a default BWP is reconfigured to outside of an initial BWP, the following conditions may be satisfied: a wireless device may be in a CONNECTED mode, and/or a wireless device may not be configured with an SS block based measurement for both serving cell and neighbor cells.

A DL BWP other than the initial active DL BWP may be configured as the default DL BWP for a wireless device. Reconfiguring the default DL BWP may be performed based on load balancing and/or different numerologies used for an active DL BWP and an initial active DL BWP. A default BWP on a PCell may be an initial active DL BWP for a transmission of RMSI. The transmission of RMSI may comprise one or more of an RMSI CORESET with a CSS, and/or a wireless device-specific search space (e.g., UE-specific search space (USS)). The initial active BWP and/or default BWP may remain an active BWP for a user after a wireless device becomes RRC connected.

Downlink and uplink BWPs may be independently activated, such as for a paired spectrum. Downlink and uplink bandwidth parts may be jointly activated, such as for an unpaired spectrum. In bandwidth adaptation (e.g., where the bandwidth of the active downlink BWP may be changed), a joint activation of a new downlink BWP and a new uplink BWP may be performed (e.g., for an unpaired spectrum). A new DL/UL BWP pair may be activated such that the bandwidth of the uplink BWPs may be the same (e.g., there may not be a change of an uplink BWP).

There may be an association of DL BWP and UL BWP in RRC configuration. For example, a wireless device may not retune the center frequency of a channel bandwidth (BW) between DL and UL, such as for TDD. If the RF is shared between DL and UL (e.g., in TDD), a wireless device may not retune the RF BW for every alternating DL-to-UL and UL-to-DL switching.

Applying an association between a DL BWP and an UL BWP may enable an activation and/or deactivation command to switch both DL and UL BWPs. Such switching may comprise switching a DL BWP together with switching an UL BWP. If an association is not applied between a DL BWP and an UL BWP, separate BWP switching commands may be necessary.

A DL BWP and an UL BWP may be configured separately for the wireless device. Pairing of the DL BWP and the UL BWP may impose constraints on the configured BWPs (e.g., the paired DL BWP and UL BWP may be activated simultaneously or near simultaneously such as within a threshold time period). A base station may indicate a DL BWP and an UL BWP to a wireless device for activation, for example, in a FDD system. A base station may indicate to a wireless device a DL BWP and an UL BWP with the same center frequency for activation, for example, in a TDD system. No pairing and/or association of the DL BWP and UL BWP may be mandatory, even for TDD system, for example, if the activation and/or deactivation of the BWP for the wireless device is instructed by the base station. Pairing and/or association of the DL BWP and UL BWP may be determined by a base station.

An association between a DL carrier and an UL carrier within a serving cell may be performed by carrier association. A wireless device may not be expected to retune the center frequency of a channel BW between DL and UL, such as for a TDD system. An association between a DL BWP and an UL BWP may be required for a wireless device. An association may be performed by grouping DL BWP configurations with same center frequency as one set of DL BWPs and grouping UL BWP configurations with same center frequency as one set of UL BWPs. The set of DL BWPs may be associated with the set of UL BWPs sharing the same center frequency. There may be no association between a DL BWP and an UL BWP, for example, if the association between a DL carrier and an UL carrier within a serving cell may performed by carrier association, such as for an FDD serving cell.

A wireless device may identify a BWP identity from a DCI, which may simplify an indication process. The total number of bits for a BWP identity may depend on the number of bits that may be used within a scheduling DCI (and/or a switching DCI), and/or the wireless device minimum BW. The number of BWPs may be determined based on the wireless device supported minimum BW and/or the network maximum BW. The maximum number of BWPs may be determined based on the network maximum BW and/or the wireless device minimum BW. For example, if 400 MHz is the network maximum BW and 50 MHz is the wireless device minimum BW, 8 BWPs may be configured to the wireless device such that 3 bits may be required within the DCI to indicate the BWP. Such a split of the network BW (e.g., depending on the wireless device minimum BW) may be useful for creating one or more default BWPs from the network side by distributing wireless devices across the entire network BW (e.g., for load balancing purposes).

At least two DL and two UL BWPs may be supported by a wireless device for a BWP adaption. The total number of BWPs supported by a wireless device may be given by 2≤number of DL/UL BWP≤floor (network maximum BW/wireless device minimum DL/UL BW), where floor(x) may be a floor function that returns the greatest integer being less than or equal to x. For example, a maximum number of configured BWPs may be four for DL and UL, respectively, or a maximum number of configured BWPs for UL may be two. Any other number of BWPs, for example, greater than or equal to 2 and less than or equal to a floor, may be supported by a wireless device.

Different sets of BWPs may be configured for different DCI formats and/or scheduling types, respectively. BWPs may be configured for non-slot-based scheduling (e.g., for larger BWPs) or for slot-based scheduling (e.g., for smaller BWPs). If different DCI formats are defined for slot-based scheduling and non-slot-based scheduling, different BWPs may be configured for different DCI formats. Different BWP configurations may provide flexibility between different scheduling types without increasing DCI overhead. A 2-bit field may be used to indicate a BWP among four BWPs for a DCI format. For example, four DL BWPs or two or four UL BWPs may be configured for each DCI format. The same or different BWPs may be configured for different DCI formats.

A required maximum number of configured BWPs (which may exclude the initial BWP) may depend on the flexibility needed for a BWP functionality. It may be sufficient to be able to configure one DL BWP and one UL BWP (or a single DL/UL BWP pair for an unpaired spectrum), which may correspond to minimal support of bandlimited devices. There may be a need to configure at least two DL BWPs and at least a single uplink BWP for a paired spectrum (or two DL/UL BWP pairs for an unpaired spectrum), such as to support bandwidth adaptation. There may be a need to configure one or more DL (or UL) BWPs that jointly cover different parts of the downlink (or uplink) carrier, such as to support dynamic load balancing between different parts of the spectrum. Two BWPs may be sufficient, for example, for dynamic load balancing. In addition to the two bandwidth parts, two other bandwidth parts may be needed, such as for bandwidth adaptation. A maximum number of configured BWPs may be four DL BWPs and two UL BWPs for a paired spectrum. A maximum number of configured BWPs may be four DL/UL BWP pairs for an unpaired spectrum.

A wireless device may monitor for RMSI and broadcasted OSI, which may be transmitted by a base station within a common search space (CSS) on the PCell. RACH response and paging control monitoring on the PCell may be transmitted within the CSS. A wireless device may not monitor the common search space, for example, if the wireless device is allowed to be on an active BWP configured with a wireless device-specific search space (USSS or USS).

At least one of configured DL bandwidth parts may comprise at least one CORESET with a CSS type, such as for a PCell. To monitor RMSI and broadcast OSI, the wireless device may periodically switch to the BWP containing the CSS. The wireless device may periodically switch to the BWP containing the CSS for RACH response and paging control monitoring on the PCell.

BWP switching to monitor the CSS may result in increasing overhead, for example, if the BWP switching occurs frequently. The overhead due to the CSS monitoring may depend on an overlapping in frequency between any two BWPs. In a nested BWP configuration (e.g., where one BWP may be a subset of another BWP), the same CORESET configuration may be used across the BWPs. A default BWP may comprise the CSS, and another BWP may comprise the CSS, for example, if the default BWP is a subset of another BWP. The BWPs may be partially overlapping. A CSS may be across a first BWP and a second BWP, for example, if the overlapping region is sufficient. Two non-overlapping BWP configurations may exist.

There may be one or more benefits from configuring the same CORESET containing the CSS across BWPs. For example, the RMSI and broadcast OSI monitoring may be performed without necessitating BWP switching, RACH response and paging control monitoring on the PCell may be performed without switching, and/or robustness for BWP switching may improve. A base station and a wireless device may be out-of-sync as to which BWP is currently active and the DL control channel may still work, for example, if CORESET configuration is the same across BWPs. One or more constraints on BWP configuration may be acceptable. A BWP may provide power saving, such that various configurations, including a nested configuration, may be very versatile for different applications. For BWP configurations that are non-overlapping in frequency, a wireless device may not have specific requirements to monitor RMSI and broadcast OSI in the CSS.

Group-common search space (GCSS) may be supported (e.g., in NR). The GCSS may be used in addition to or as an alternative to CSS for certain information. A base station may configure GCSS within a BWP for a wireless device. Information such as RACH response and paging control may be transmitted on GCSS. The wireless device may monitor GCSS, for example, instead of switching to the BWP containing the CSS for such information. A base station may transmit information on GCSS, for example, for a pre-emption indication and other group-based commands on a serving cell. A wireless device may monitor the GCSS for the information, including for example, for the SCell which may not have CSS.

A CORESET may be configured without using a BWP. The CORESET may be configured based on a BWP, which may reduce signaling overhead. A first CORESET for a wireless device, for example, during an initial access, may be configured based on a default BWP. A CORESET for monitoring PDCCH for RAR and paging may be configured based on a DL BWP. The CORESET for monitoring group common (GC)-PDCCH for SFI may be configured based on a DL BWP. The CORESET for monitoring GC-DCI for a pre-emption indication may be configured based on a DL BWP. A BWP index may be indicated in the CORESET configuration. A default BWP index may not be indicated in the CORESET configuration.

A contention-based random access (CBRA) RACH procedure may be supported via an initial active DL BWP and/or an initial active UL BWP, for example, if the wireless device identity is unknown to the base station. The contention-free random access (CFRA) RACH procedure may be supported via the USS configured in an active DL BWP for the wireless device. An additional CSS for RACH purposes may not need to be configured per BWP, such as for the CFRA RACH procedure supported via the USS configured in an active DL BWP for the wireless device. Idle mode paging may be supported via an initial active DL BWP. Connected mode paging may be supported via a default BWP. No additional configurations for the BWP for paging purposes may be needed for paging. A configured BWP (e.g., on a serving cell) may have the CSS configured for monitoring pre-emption indications for a pre-emption.

A group-common search space may be associated with at least one CORESET configured for the same DL BWP (e.g., for a configured DL BWP). The wireless device may or may not autonomously switch to a default BWP (e.g., where a group-common search space may be available) to monitor for a DCI, for example, depending on the monitoring periodicity of different group-common control information types. A group-common search space may be configured in the same CORESET, for example, if there is at least one CORESET configured on a DL BWP.

A center frequency of an activated DL BWP may or may not be changed. If the center frequency of the activated DL BWP and the deactivated DL BWP is not aligned, the active UL BWP may be switched implicitly (e.g., for TDD).

BWPs with different numerologies may be overlapped. Rate matching for CSI-RS and/or SRS of another BWP in the overlapped region may be performed, which may achieve dynamic resource allocation of different numerologies in a FDM and/or a TDM manner. For a CSI measurement within one BWP, if the CSI-RS and/or SRS collides with data and/or an RS in another BWP, the collision region in another BWP may be rate matched. CSI information over the two or more BWPs may be determined by a base station based on wireless device reporting. Dynamic resource allocation with different numerologies in a FDM manner may be achieved by base station scheduling.

PUCCH resources may be configured in a configured UL BWP, in a default UL BWP, and/or in both a configured UL BWP and a default UL BWP. If the PUCCH resources are configured in the default UL BWP, a wireless device may retune to the default UL BWP for transmitting an SR. The PUCCH resources may be configured per a default BWP or per a BWP other than the default BWP. The wireless device may transmit a scheduling request (SR) in the current active BWP without retuning. If a configured SCell is activated for a wireless device, a DL BWP may be associated with an UL BWP at least for the purpose of PUCCH transmission, and/or a default DL BWP may be activated. If the wireless device is configured for UL transmission in the same serving cell, a default UL BWP may be activated.

At least one of configured DL BWPs may comprise one CORESET with common search space (CSS), for example, at least in a primary component carrier. The CSS may be needed at least for RACH response (e.g., a msg2) and/or a pre-emption indication. One or more of configured DL bandwidth parts for a PCell may comprise a CORESET with the CSS type for RMSI and/or OSI, for example, if there is no periodic gap for RACH response monitoring on the PCell. A configured DL bandwidth part for a PCell may comprise one CORESET with the CSS type for RACH response and paging control for a system information update. A configured DL bandwidth part for a serving cell may comprise a CORESET with the CSS type for a pre-emption indication and/or other group-based commands. One or more of configured DL bandwidth parts for a PCell may comprise a CORESET with a CSS type for RMSI, OSI, and/or RACH response and paging control for a system information update, for example, if a periodic gap for RACH response monitoring is present on the PCell. A configured DL bandwidth part for a serving cell may comprise a CORESET with a CSS type for a pre-emption indication and/or other group-based commands.

BWPs may be configured with respect to common reference point (e.g., PRB 0) on a component carrier. The BWPs may be configured using TYPE1 RA as a set of contiguous PRBs, with PRB granularity for the START and LENGTH. The minimum length may be determined by the minimum supported size of a CORESET. A CSS may be configured on a non-initial BWP, such as for RAR and paging.

To monitor common channel or group common channel for a connected wireless device (e.g., RRC CONNECTED UE), an initial DL BWP may comprise a control channel for RMSI, OSI, and/or paging. The wireless device may switch a BWP to monitor such a control channel. A configured DL BWP may comprise a control channel (e.g., for a Msg2). A configured DL BWP may comprise a control channel for an SFI. A configured DL BWP may comprise a pre-emption indication and/or other group common indicators such as for power control.

A DCI may explicitly indicate activation and/or deactivation of a BWP. A DCI without data assignment may comprise an indication to activate and/or deactivate BWP. A wireless device may receive a first indication via a first DCI to activate and/or deactivate a BWP. A second DCI with a data assignment may be transmitted by the base station, for example, for a wireless device to start receiving data. The wireless device may receive the first DCI in a target CORESET within a target BWP. A base station scheduler may make conservative scheduling decisions, for example, until the base station receives CSI feedback.

A DCI without scheduling for active BWP switching may be transmitted, for example, to measure the CSI before scheduling. A DCI with scheduling for active BWP switching may comprise setting the resource allocation field to zero, such that no data may be scheduled. Other fields in the DCI may comprise one or more CSI and/or SRS request fields.

Single scheduling a DCI to trigger active BWP switching may provide dynamic BWP adaptation for wireless device power saving, for example, during active state. Wireless device power saving, for example, during active state, may occur for an ON duration, and/or if an inactivity timer is running and/or if C-DRX is configured. A wireless device may consume a significant amount of power monitoring PDCCH, without decoding any grant, for example if a C-DRX is enabled. To reduce the power consumption, for example, during PDCCH monitoring, two BWPs may be configured: a narrower BWP for PDCCH monitoring, and a wider BWP for scheduled data. The wireless device may switch back-and-forth between the narrower BWP and the wider BWP, depending on the burstiness of the traffic. The wireless device may revisit a BWP that it has previously used. Combining a BWP switching indication and a scheduling grant may provide an advantage of low latency and/or reduced signaling overhead for BWP switching.

An SCell activation and/or deactivation may or may not trigger a corresponding action for its configured BWP. A dedicated BWP activation and/or deactivation DCI may impact a DCI format. A scheduling DCI with a dummy grant may be used. The dummy grant may be constructed by invalidating one or some of the fields, such as the resource allocation field. A fallback scheduling DCI format (which may contain a smaller payload) may be used, which may improve the robustness for BWP DCI signaling without incurring extra work by introducing a new DCI format.

A DCI with data assignment may comprise an indication to activate and/or deactivate a BWP along with a data assignment. A wireless device may receive a combined data allocation and BWP activation and/or deactivation message. A DCI format may comprise a field to indicate BWP activation and/or deactivation and/or a field indicating an UL grant and/or a DL grant. The wireless device may start receiving data with a single DCI, such as the DCI format described above. The DCI may indicate one or more target resources of a target BWP. A base station scheduler may have insufficient information about the CSI in the target BW and may make conservative scheduling decisions.

The DCI may be transmitted on a current active BWP, and scheduling information may be for a new BWP, for example, for the DCI with data assignment. There may be a single active BWP. There may be one DCI in a slot for scheduling the current BWP or scheduling another BWP. The same CORESET may be used for the DCI scheduling of the current BWP and the DCI scheduling of another BWP. The DCI payload size for the DCI scheduling current BWP and the scheduling DCI for BWP switching may be the same, which may reduce the number of blind decoding attempts.

A BWP group may be configured by a base station, in which a numerology in one group may be the same, which may support using the scheduling DCI for BWP switching. The BWP switching for the BWP group may be configured, such that BIF may be present in the CORESETs for one or more BWPs in the group. Scheduling DCI for BWP switching may be configured per BWP group, in which an active BWP in the group may be switched to any other BWP in the group.

A DCI comprising a scheduling assignment and/or grant may not comprise an active-BWP indicator. A scheduling DCI may switch a wireless devices active BWP to the transmission direction for which the scheduling is valid (e.g., for a paired spectrum). A scheduling DCI may switch the wireless devices active DL/UL BWP pair regardless of the transmission direction for which the scheduling is valid (e.g., for an unpaired spectrum). A downlink scheduling assignment and/or grant with no assignment may occur, which may allow for a switching of an active BWP without scheduling downlink and/or uplink transmissions.

A timer-based activation and/or deactivation BWP may be supported. A timer for activation and/or deactivation of DL BWP may reduce signaling overhead and may allow wireless device power savings. The activation and/or deactivation of a DL BWP may be based on an inactivity timer, which may be referred to as a BWP inactive (or inactivity) timer. A wireless device may start and/or reset a timer upon reception of a DCI. The timer may expire, for example, if the wireless device is not scheduled for the duration of the timer. The wireless device may activate and/or deactivate the appropriate BWP based on the expiry of the timer. The wireless device may, for example, activate the default BWP and/or deactivate the source BWP.

A BWP inactive timer may be beneficial for power saving for a wireless device. A wireless device may reduce power, for example, by switching to a default BWP with a smaller bandwidth. A wireless device may use a BWP inactive timer, for example, for a fallback if missing a DCI based activation and/or deactivation signaling, such as by switching from one BWP to another BWP. Triggering conditions of the BWP inactive timer may follow triggering conditions for the DRX timer in LTE or any other system. An on-duration of the BWP inactive timer may be configured and/or the timer may start, for example, if a wireless device-specific PDCCH is successfully decoded indicating a new transmission, for example, during the on-duration. The timer may restart, for example, if a wireless device-specific PDCCH is successfully decoded indicating a new transmission. The timer may stop, for example, if the wireless device is scheduled to switch to the default DL BWP. The BWP inactive timer may start, for example, if the wireless device switches to a new DL BWP. The timer may restart, for example, if a wireless device-specific PDCCH is successfully decoded, wherein the wireless device-specific PDCCH may be associated with a new transmission, a retransmission, SPS activation and/or deactivation, or another purpose.

A wireless device may switch to a default BWP, for example, if the wireless device does not receive any control and/or data from the network, for example, during the running of the BWP inactive timer. The timer may be reset, for example, upon reception of any control and/or data. The timer may be triggered, for example, if wireless device receives a DCI to switch its active DL BWP from the default BWP to another BWP. The timer may be reset, for example, if a wireless device receives a DCI to schedule PDSCH(s) in the BWP other than the default BWP.

A DL BWP inactive timer may be defined separately from a UL BWP inactive timer. Timers for the DL BWP and UL BWP may be set independently and/or jointly. For the separate timers (e.g., if there is DL data and UL timer expires), UL BWP may not be deactivated since PUCCH configuration may be affected if both DL BWP and UL BWP are activated. For the uplink, if there is UL feedback signal related to DL transmission, the timer may be reset. The UL timer may not be set if there is DL data. If there is UL data and the DL timer expires, there may be no issue if the DL BWP is deactivated since UL grant is transmitted in the default DL BWP. A BWP inactivity-timer may allow fallback to default BWP on a PCell and/or SCell.

A timer-based activation and/or deactivation of BWP may be similar to a wireless device DRX timer. There may not be a separate inactivity timer for BWP activation and/or deactivation for the wireless device DRX timer. A wireless device DRX inactivity timer may trigger BWP activation and/or deactivation. There may be separate inactivity timers for BWP activation and/or deactivation for the wireless device DRX timer. For example, the DRX timers may be defined in a MAC layer, and the BWP timer may be defined in a physical layer. A wireless device may stay in a wider BWP for as long as the inactivity timer is running, for example, if the same DRX inactivity timer is used for BWP activation and/or deactivation. The DRX inactivity timer may be set to a large value of 100-200 milliseconds for a C-DRX cycle of 320 milliseconds, which may be larger than the ON duration (e.g., 10 milliseconds). Setting the DRX inactivity timer in the above manner may provide power savings, for example, based on a narrower BWP not being achievable. To realize wireless device power saving promised by BWP switching, a new timer may be defined and it may be configured to be smaller than the DRX inactivity timer. From the point of view of DRX operation, BWP switching may allow wireless device to operate at different power levels, for example, during the active state, effectively providing intermediate operating points between the ON and OFF states.

With a DCI explicit activation and/or deactivation of BWP, a wireless device and a base station may not be synchronized with respect to which BWP is activated and/or deactivated. The base station scheduler may not have CSI information related to a target BWP for channel-sensitive scheduling. The base station may be limited to conservative scheduling for one or more first several scheduling occasions. The base station may rely on periodic or aperiodic CSI-RS and associated CQI report(s) to perform channel-sensitive scheduling. Relying on periodic or aperiodic CSI-RS and associated CQI report(s) may delay channel-sensitive scheduling and/or lead to signaling overhead, such as if aperiodic CQI is requested. To mitigate a delay in acquiring synchronization and channel state information, a wireless device may transmit an acknowledgement upon receiving an activation and/or deactivation of a BWP. A CSI report based on the provided CSI-RS resource may be transmitted after activation of a BWP and may be used as acknowledgment of activation and/or deactivation.

A base station may provide a sounding reference signal for a target BWP after a wireless device tunes to a new BWP. The wireless device may report the CSI, which may be used as an acknowledgement by the base station to confirm that the wireless device receives an explicit DCI command and activates and/or deactivates the appropriate BWPs. For an explicit activation and/or deactivation via DCI with data assignment, a first data assignment may be carried out without a CSI for the target BWP.

A guard period may be defined to take RF retuning and related operations into account. A wireless device may neither transmit nor receive signals in the guard period. A base station may need to know the length of the guard period. For example, the length of the guard period may be reported to the base station as a wireless device capability. The length of the guard period may be based on the numerologies of the BWPs and the length of the slot. The length of the guard period for RF retuning may be reported as a wireless device capability. The wireless device may report the guard period as an absolute time and/or in symbols.

The base station may maintain the time domain position of guard period in alignment between the base station and the wireless device, for example, if the base station knows the length of the guard period. The guard period for RF retuning may be predefined for time pattern triggered BWP switching. The BWP switching and/or guard period may be triggered by DCI and/or a timer. For BWP switching following a time pattern, the position of the guard period may be defined. The guard period may not affect the symbols carrying CSS, for example, if the wireless device is configured to switch periodically to a default BWP for CSS monitoring.

A single DCI may switch the wireless device's active BWP from one to another within a given serving cell. The active BWP may be switched to a second BWP of the same link direction, for example an UL BWP or a DL BWP. A separate field may be used in the scheduling DCI to indicate the index of the BWP for activation such that wireless device may determine the current DL/UL BWP according to a detected DL/UL grant without requiring any other control information. The multiple scheduling DCIs transmitted in this duration may comprise the indication to the same BWP, for example, if the BWP change does not happen during a certain time duration. During the transit time wherein potential ambiguity may happen, base station may send scheduling grants in the current BWP or together in the other BWPs containing the same target BWP index, such that wireless device may obtain the target BWP index by detecting the scheduling DCI in either one of the BWPs. The duplicated scheduling DCI may be transmitted an arbitrary number (e.g., K) times. A wireless device may switch to the target BWP and start to receive or transmit (UL) in the target BWP according to the BWP indication field, for example, if the wireless device receives one of the K times transmissions.

Switching between BWPs may introduce time gaps, for example, if wireless device is unable to receive one or more messages due to re-tuning. Breaks of several time slots may severely affect the TCP ramp up as the wireless device may not be able to transmit and receive, for example, during those slots, affecting obtained RTT and data rate. A break in reception may make wireless device out of reach from network point of view reducing network interest to utilize short inactivity timer. If BWP switching takes significant time and a wireless device requires new reference symbols to update AGC, channel estimation, etc., active BWP switching may not be adopted in the wireless device. In some configurations, BWP switching may be performed where the BWP center frequency remains the same if switching between BWPs.

A frequency location of a wireless device's RF bandwidth may be indicated by base station. The RF bandwidth of the wireless device may be smaller than the carrier bandwidth for considering the wireless device RF bandwidth capability.

The supported RF bandwidth for a wireless device is usually a set of discrete values (e.g., 10 MHz, 20 MHz, 50 MHz, etc.). For energy saving purpose, the wireless device RF bandwidth may be determined as the minimum available bandwidth supporting the bandwidth of the BWP. The granularity of BWP bandwidth may be PRB level, which may be decoupled with wireless device RF bandwidth. As a result, the wireless device RF bandwidth may be larger than the BWP bandwidth. The wireless device may receive signals outside the carrier bandwidth, especially if the configured BWP is configured near the edge of the carrier bandwidth. Inter-system interference or the interference from an adjacent cell outside the carrier bandwidth may affect the receiving performance of the BWP. To keep the wireless device RF bandwidth in the carrier bandwidth, the frequency location of the wireless device RF bandwidth may be indicated by base station.

A gap duration may be determined based on a measurement duration and a retuning gap. The retuning gap may vary. If a wireless device does not need to switch its center, the retuning may be relatively short, such as 20 μs. A wireless device may indicate the necessary retuning gap for a measurement configuration, for example, if the network may not know whether the wireless device needs to switch its center or not to perform measurement. The returning gap may depend on the current active BWP that may be dynamically switched via switching mechanism. Wireless devices may need to indicate the returning gap dynamically.

The measurement gap may be indirectly created, for example, if the network may configure a certain measurement gap. The measurement gap may comprise the smallest retuning latency. The smallest returning latency may be determined, for example, if a small retuning gap may be utilized and/or if both measurement bandwidth and active BWP is included within the wireless device maximum RF capability and the center frequency of the current active BWP may be not changed. The wireless device may skip receiving and/or transmitting, for example, if a wireless device needs more gap than the configured.

A different measurement gap and retuning gap may be utilized for RRM and CSI. For CSI measurement, if periodic CSI measurement outside of active BWP may be configured, a wireless device may need to perform its measurement periodically per measurement configuration. For RRM, it may be up to wireless device implementation where to perform the measurement as long as it satisfies the measurement requirements. The worst case retuning latency for a measurement may be used. As the retuning latency may be different between intra-band and inter-band retuning, separate measurement gap configurations between intra-band and inter-band measurement may be considered.

A respective DCI format may comprise an explicit identifier to distinguish them, for example, for multiple DCI formats with the same DCI size of a same RNTI. The same DCI size may come from zero-padding bits in at least a wireless device-specific search space.

In BWP switching, a DCI in the current BWP may need to indicate resource allocation in the next BWP that the wireless device may be expected to switch. The resource allocation may be based on the wireless device-specific PRB indexing, which may be per BWP. A range of the PRB indices may change as the BWP changes. The DCI to be transmitted in the current BWP may be based on the PRB indexing for the current BWP. The DCI may need to indicate the RA in the new BWP, which may cause a resource conflict. To resolve the conflict without significantly increasing wireless devices blind detection overhead, the DCI size and bit fields may not change per BWP for a given DCI type.

As the range of the PRB indices may change as the BWP changes, one or more employed bits among the total bit field for RA may be dependent on the employed BWP. A wireless device may use the indicated BWP ID that the resource allocation may be intended to identify the resource allocation bit field.

The DCI size of the BWP may be based on a normal DCI detection without BWP retuning and/or on a DCI detection, for example, during the BWP retuning. A DCI format may be independent of the BW of the active DL/UL BWP, which may be called as fallback DCI. At least one of DCI format for DL may be configured to have the same size for a wireless device for one or more configured DL BWPs of a serving cell. At least one of the DCI formats for UL may be configured to have the same size for a wireless device for one or more configured UL BWPs of a serving cell. A BWP-dependent DCI format may be monitored at the same time (e.g. a normal DCI) for both active DL BWP and active UL BWP. A wireless device may monitor both DCI formats at the same time. A base station may assign the fallback DCI format to avoid ambiguity, for example, during a transition period in the BWP activation and/or deactivation.

If a wireless device is configured with multiple DL BWPs and/or multiple UL BWPs in a serving cell, an inactive DL and/or UL BWP may be activated by a DCI scheduling a DL assignment or UL grant in the BWP. As the wireless device may be monitoring the PDCCH on the currently active DL BWP, the DCI may comprise an indication to a target BWP that the wireless device may switch to for PDSCH reception or UL transmission. A BWP indication may be inserted in the wireless device-specific DCI format. The bit width of this field may depend on the maximum possible and/or presently configured number of DL and/or UL BWPs. The BWP indication field may be a fixed size based on the maximum number of configured BWPs.

A DCI format size may match the BW of the BWP in which the PDCCH may be received. To avoid an increase in the number of blind decodes, the wireless device may identify the RA field based on the scheduled BWP. For a transition from a small BWP to a larger BWP, the wireless device may identify the RA field as being the LSBs of the required RA field for scheduling the larger BWP.

The same DCI size for scheduling different BWPs may be defied by keeping the same size of resource allocation fields for one or more configured BWPs. A base station may be aware of a wireless device switching BWPs based on a reception of ACK/NACK from the wireless device. The base station may not be aware of a wireless device switching BWPs, for example, if the base station does not receive at least one response from the wireless device. To avoid such a mismatch between base station and wireless device, a fallback mechanism may be used. The base station may transmit the scheduling DCI for previous BWPs and for newly activated BWP since the wireless device may receive the DCI on either BWP, for example, if there is no response from the wireless device. The base station may confirm the completion of the active BWP switching, for example, after or in response to the base station receiving a response from the wireless device. The base station may not transmit multiple DCIs, for example, if the same DCI size for scheduling different BWPs may be considered and CORE-SET configuration may be the same for different BWPs. DCI format(s) may be configured user-specifically per cell rather than per BWP. The wireless device may start to monitor pre-configured search-space on the CORESET, for example, if a wireless device synchronizes to a new BWP.

The size of DCI format in different BWPs may vary and may change at least due to different size of RA bitmap on different BWPs. The size of DCI format configured in a cell for a wireless device may be dependent on scheduled BWPs. If the DCI formats may be configured per cell, the corresponding header size in DCI may be relatively small.

The monitored DCI format size on a search-space of a CORESET may be configurable with sufficiently fine granularity and/or the granularity may be predefined. The monitored DCI format size with sufficient granularity may be beneficial, for example, if a base station may freely set the monitoring DCI format size on the search-spaces of a CORESET. The DCI format size may be set such that it may accommodate the largest actual DCI format size variant among one or more BWPs configured in a serving cell.

For a wireless device-specific serving cell, one or more DL BWPs and one or more UL BWPs may be configured by a dedicated RRC for a wireless device. This may be done as part of the RRC connection establishment procedure for a PCell. For an SCell, this may be done via RRC configuration indicating the SCell parameters.

A default DL and/or a default UL BWP may be activated since there may be at least one DL and/or UL BWP that may be monitored by the wireless device depending on the properties of the SCell (DL only, UL only, or both), for example, if a wireless device receives an SCell activation command. The BWP may be activated upon receiving an SCell activation command. The BWP may be informed to the wireless device via the RRC configuration that configured the BWP on this serving cell. For an SCell, RRC signaling for SCell configuration/reconfiguration may be used to indicate which DL BWP and/or UL BWP may be activated if the SCell activation command is received by the wireless device. The indicated BWP may be the initially active DL and/or UL BWP on the SCell. The SCell activation command may activate DL and/or UL BWP.

For an SCell, RRC signaling for the SCell configuration/reconfiguration may be used for indicating a default DL BWP on the SCell. The default DL BWP may be used for fallback purposes. The default DL BWP may be same or different from the initially activated DL and/or UL BWP indicated to wireless device as part of the SCell configuration. A default UL BWP may be configured to a wireless device for transmitting PUCCH for SR, for example, if the PUCCH resources are not configured in every BWP for SR.

An SCell may be for DL only. For a DL only SCell, a wireless device may keep monitoring an initial DL BWP (e.g., initial active or default) until the wireless device receives SCell deactivation command. An SCell may be for UL only. For the UL only SCell, the wireless device may transmit on the indicated UL BWP, for example, if a wireless device receives a grant. The wireless device may not maintain an active UL BWP if wireless device does not receive a grant. A failure to maintain the active UL BWP due to a grant not being received may not deactivate the SCell. An SCell may be for UL and DL. For a UL and DL SCell, a wireless device may keep monitoring an initial DL BWP (e.g., initial active or default) until the wireless device receives an SCell deactivation command. The UL BWP may be used if there may be a relevant grant or an SR transmission.

A BWP deactivation may not result in a SCell deactivation. The active DL and/or UL BWPs may be considered deactivated, for example, if the wireless device receives the SCell deactivation command.

A wireless device may be expected to perform RACH procedure on an SCell, for example, during activation. Activation of UL BWP may be needed for the RACH procedure. At an SCell activation, DL only (only active DL BWP) and/or DL/UL (both DL/UL active BWP) may be configured. A wireless device may select default UL BWP based on measurement or the network configures which one in its activation.

One or more BWPs may be semi-statically configured via wireless device-specific RRC signaling. If a wireless device maintains RRC connection with a primary component carrier (CC), the BWP in a secondary CC may be configured via RRC signaling in the primary CC. One or more BWPs may be semi-statically configured to a wireless device via RRC signaling in a PCell. A DCI transmitted in an SCell may indicate a BWP among the one or more configured BWP and grant detailed resource based on the indicated BWP. For cross-CC scheduling, a DCI transmitted in a PCell may indicate a BWP among the one or more configured BWPs, and grants detailed resource based on the indicated BWP.

A DL BWP may be initially activated for configuring CORESET for monitoring the first PDCCH in the SCell, for example, if an SCell may be activated. The DL BWP may serve as a default DL BWP in the SCell. For the wireless device performing initial access via a SS block in PCell, the default DL BWP in an SCell may not be derived from SS block for initial access. The default DL BWP in an SCell may be configured by RRC signaling in the PCell.

An indication indicating which DL BWP and/or which UL BWP are active may be in the RRC signaling for SCell configuration and/or reconfiguration, for example, if an SCell is activated. The RRC signaling for SCell configuration/reconfiguration may be used for indicating which DL BWP and/or which UL BWP are initially activated if the SCell may be activated. An indication indicating which DL BWP and/or which UL BWP are active may be in the SCell activation signaling, for example, if an SCell is activated. SCell activation signaling may be used for indicating which DL BWP and/or which UL BWP are initially activated if the SCell may be activated.

For PCells and SCells, initial default BWPs for DL and UL (e.g., for RMSI reception and PRACH transmission) may be valid until at least one BWP is configured for the DL and UL via RRC wireless device-specific signaling respectively. The initial default DL/UL bandwidth parts may become invalid and new default DL/UL bandwidth parts may take effect. The SCell configuration may comprise default DL/UL bandwidth parts.

An initial BWP on a PCell may be defined by a master information block (MIB). An initial BWP and default BWP may be separately configurable for the SCell. An initial BWP may be the widest configured BWP of the SCell. A wireless device may retune to a default BWP that may be the narrow BWP. The SCell may be active and may be ready to be opened if an additional data burst arrives.

A BWP on SCell may be activated by means of cross-cell scheduling DCI. The cross-cell scheduling may be configured for a wireless device. The base station may activate a BWP on the SCell by indicating CIF and BWP in the scheduling DCI.

A wireless device and/or base station may perform synchronization tracking within an active DL BWP without a SS block. A tracking reference signal (TRS) and/or the DL BWP configuration may be configured. A DL BWP with a SS block or TRS may be configured as a reference for synchronization tracking.

SS-block based RRM measurements may be decoupled within the BWP framework. Measurement configurations for each RRM and CSI feedback may be independently configured from the BWP configurations. CSI and SRS measurements/transmissions may be performed within the BWP framework.

For a modulation coding scheme (MCS) assignment of the first one or more DL data packets after active DL BWP switching, the network may assign robust MCS to a wireless device for the first one or more DL data packets based on RRM measurement reporting. For a MCS assignment of the first one or more DL data packets after active DL BWP switching, the network may signal to a wireless device by active DL BWP switching DCI to trigger aperiodic CSI measurement/reporting to speed up link adaptation convergence. For a wireless device, periodic CSI measurement outside the active BWP in a serving cell may not supported. For a wireless device, RRM measurement outside active BWP in a serving cell may be supported. For a wireless device, RRM measurement outside configured BWPs in a serving cell may be supported. RRM measurements may be performed on a SSB and/or CSI-RS. The RRM/RLM measurements may be independent of BWPs.

A wireless device may not be configured with aperiodic CSI reports for non-active DL BWPs. The CSI measurement may be obtained after the BW opening and the wide-band CQI of the previous BWP may be used as starting point for the other BWP on the component carrier.

A wireless device may perform CSI measurements on the BWP before scheduling. Before scheduling on a new BWP, a base station may intend to find the channel quality on the potential new BWPs before scheduling the user on that BWP. The wireless device may switch to a different BWP and measure channel quality on the BWP and then transmit the CSI report. There may be no scheduling needed.

Resource allocation for data transmission for a wireless device not capable of supporting the carrier bandwidth may be derived based on a two-step frequency-domain assignment process. A first step may indicate a bandwidth part, and a second step may indicate one or more physical resource blocks (PRBs) within the bandwidth part.

One or multiple bandwidth part configurations for each component carrier may be semi-statically signaled to a wireless device. A BWP may comprise a group of contiguous PRBs, wherein one or more reserved resources may be configured within the bandwidth part. The bandwidth of a bandwidth part may be equal to or be smaller than the maximal bandwidth capability supported by a wireless device. The bandwidth of a bandwidth part may be at least as large as the SS block bandwidth. The bandwidth part may or may not contain the SS block. The configuration of a BWP may comprise at least one of following properties: Numerology, Frequency location (e.g. center frequency), or Bandwidth (e.g. number of PRBs).

A bandwidth part may be associated with one or more numerologies, wherein the one or more numerologies may comprise sub-carrier spacing, CP type, and/or slot duration indicators. A wireless device may expect at least one DL BWP and at least one UL BWP being active among a set of configured BWPs for a given time. A wireless device may receive/transmit within active DL/UL bandwidth part(s) using the associated numerology, for example, at least PDSCH and/or PDCCH for DL and PUCCH and/or PUSCH for UL, or a combination thereof.

Multiple BWPs with same or different numerologies may be active for a wireless device simultaneously. The active multiple bandwidth parts may not imply that it may be required for wireless device to support different numerologies at the same instance. The active DL/UL bandwidth part may not span a frequency range larger than the DL/UL bandwidth capability of the wireless device in a component carrier.

A wireless network may support single and multiple SS block transmissions in wideband CC in the frequency domain. For non-CA wireless device with a smaller BW capability and potentially for CA wireless devices, a wireless network may support a measurement gap for RRM measurement and other purposes (e.g., path loss measurement for UL power control) using SS blocks. There may be no SS blocks in the active BWPs. A wireless device may be notified of the presence/parameters of the SS block(s) and parameters necessary for RRM measurement via at least one of following: RMSI, other system information, and/or RRC signaling A maximum bandwidth for CORESET for RMSI scheduling and PDSCH carrying RMSI may be equal to or smaller than a DL bandwidth of a wireless network that one or more wireless devices may support in a frequency range. For at least for one RACH preamble format, the bandwidth may be equal to or smaller than a UL bandwidth of a wireless network that one or more wireless devices may support in a frequency range. Other RACH preamble formats with larger bandwidth than a certain bandwidth of the wireless network that one or more wireless devices may support.

CORESET for RMSI scheduling and PDSCH for RMSI may be confined within the BW of one PBCH. CORESET for RMSI scheduling may be confined within the BW of one PBCH and PDSCH for RMSI may not be confined within the BW of one PBCH. CORESET for RMSI scheduling and PDSCH for RMSI may not be confined within the BW of one PBCH.

There may be one active DL BWP for a given time instant. A configuration of a DL bandwidth part may comprise at least one CORESET. PDSCH and corresponding PDCCH (PDCCH carrying scheduling assignment for the PDSCH) may be transmitted within the same BWP if PDSCH transmission starts no later than an arbitrary number (K) symbols after the end of the PDCCH transmission. PDCCH and PDSCH may be transmitted in different BWPs, for example, if PDSCH transmission starting more than K symbols after the end of the corresponding PDCCH. The value of K may depend on at least numerology or reported wireless device retuning time. For the indication of active DL/UL bandwidth part(s) to a wireless device, DCI (directly and/or indirectly), MAC CE, Time pattern (e.g. DRX like) and/or combinations thereof may be considered.

A wireless network may support switching between partial bands for SRS transmissions in a CC. The RF retuning requirement for partial band switching may be considered, for example, if a wireless device is not capable of simultaneous transmission in partial bands in a CC. The partial band may indicate a bandwidth part.

Common PRB indexing may be used at least for DL BWP configuration in RRC connected state. A reference point may be PRB 0, which may be common to one or more wireless devices sharing a wideband CC from network perspective, regardless of the wireless devices being NB, CA, or WB wireless devices. An offset from PRB 0 to the lowest PRB of the SS block accessed by a wireless device may be configured by high layer signaling, for example, via RMSI and/or wireless device-specific signaling. A common PRB indexing may be for maximum number of PRBs for a given numerology, wherein the common PRB indexing may be for RS generation for wireless device-specific PDSCH and/or may be for UL.

There may be an initial active DL/UL bandwidth part pair for a wireless device until the wireless device is explicitly configured and/or reconfigured with one or more BWPs, for example, during or after a RRC connection may be established. The initial active DL/UL bandwidth part may be confined within the wireless device minimum bandwidth for a given frequency band. A wireless network may support activation and/or deactivation of DL and UL BWP by explicit indication. A MAC CE-based approach may be used for the activation and/or deactivation of DL and UL BWP. A wireless network may support an activation and/or deactivation of DL bandwidth part by means of timer for a wireless device to switch its active DL bandwidth part to a default DL bandwidth part. A default DL bandwidth part may be the initial active DL bandwidth part defined above. The default DL bandwidth part may be reconfigured by the network.

A measurement or transmission SRS outside of the active BWP for a wireless device may constitute a measurement gap. The wireless device may not monitor CORESET, for example, during the measurement gap.

A SRS transmission in an active UL BWP may use the same numerology as configured for the BWP. A wireless network may support wireless device specific configured bandwidth based on tree-like SRS bandwidth sets. Parameters used for configuring bandwidth allocation, such as CSRS and BSRS, may be reused in a wireless device specific manner. A wireless network may support to sound substantially all UL PRBs in a BWP.

Frequency hopping for a PUCCH may occur within an active UL BWP for the wireless device. There may be multiple active BWPs, and the active BWP may refer to BWP associated with the numerology of PUCCH For paired spectrum, a base station may configure DL and UL BWPs separately and independently for a wireless device-specific serving cell for a wireless device. For active BWP switching using at least scheduling DCI, a DCI for DL may be used for DL active BWP switching and a DCI for UL may be used for UL active BWP switching. A wireless network may support a single DCI switching DL and UL BWP jointly.

For unpaired spectrum, a base station may jointly configure a DL BWP and an UL BWP as a pair. The DL and UL BWPs of a DL/UL BWP pair may share the same center frequency but may be of different bandwidths for a wireless device-specific serving cell for a wireless device. For active BWP switching using at least scheduling DCI, a DCI for either DL or UL may be used for switching from one DL/UL BWP pair to another pair, particularly where both DL and UL are activated to a wireless device in the corresponding unpaired spectrum. There may not be a restriction on DL BWP and UL BWP pairing. For a wireless device, a configured DL (or UL) BWP may overlap in frequency domain with another configured DL (or UL) BWP in a serving cell.

For a serving cell, a maximal number of DL/UL BWP configurations may be for paired spectrum, for example, 4 DL BWPs and 4 UL BWPs. A maximal number of DL/UL BWP configurations may be for unpaired spectrum, for example, 4 DL/UL BWP pairs. A maximal number of DL/UL BWP configurations may be for SUL, for example, 4 UL BWPs.

A wireless network may support a dedicated timer for timer-based active DL BWP switching to the default DL BWP for paired spectrum. A wireless device may start the timer if it switches its active DL BWP to a DL BWP other than the default DL BWP. A wireless device may restart the timer to the initial value if it successfully decodes a DCI to schedule PDSCH in its active DL BWP. A wireless device may switch its active DL BWP to the default DL BWP if the timer expires.

A wireless network may support a dedicated timer for timer-based active DL/UL BWP pair switching to the default DL/UL BWP pair for unpaired spectrum. A wireless device may start the timer, for example, if it switches its active DL/UL BWP pair to a DL/UL BWP pair other than the default DL/UL BWP pair. A wireless device may restart the timer to the initial value, for example, if it successfully decodes a DCI to schedule PDSCH in its active DL/UL BWP pair. A wireless device may switch its active DL/UL BWP pair to the default DL/UL BWP pair, for example, if the timer expires.

RRC signaling for SCell configuration and/or reconfiguration may indicate a first active DL BWP and/or a first active UL BWP if the SCell may be activated. A wireless network may support an SCell activation signaling that does not contain any information related to the first active DL/UL BWP. An active DL BWP and/or UL BWP may be deactivated if the SCell may be deactivated. The SCell may be deactivated by an SCell deactivation timer.

A wireless device may be configured with at least a timer for timer-based active DL BWP (or DL/UL BWP pair) switching and/or a default DL BWP (or a DL/UL BWP pair) that may be used if the timer may be expired. The default DL BWP may be different from the first active DL BWP. A default DL BWP (or DL/UL BWP pair) may be configured/reconfigured to a wireless device for a PCell. The default DL BWP may be an initial active DL BWP if no default DL BWP is configured. In a serving cell where PUCCH may be configured, a configured UL BWP may comprise PUCCH resources.

A common search space for at least RACH procedure may be configured in one or more BWPs for a wireless device in a PCell. A common search space for group-common PDCCH (e.g. SFI, pre-emption indication, etc.) may be configured in one or more BWPs for a wireless device in a serving cell.

A DL and/or UL BWP may be configured to a wireless device by resource allocation Type 1 with one PRB granularity of starting frequency location and one PRB granularity of bandwidth size, wherein the granularity may not imply that a wireless device may adapt its RF channel bandwidth accordingly.

A DCI format size itself may not be a part of RRC configuration irrespective of BWP activation and deactivation in a serving cell. The DCI format size may depend on different operations and/or configurations of different information fields in the DCI.

An initial active DL BWP may be defined as frequency location and bandwidth of RMSI CORESET and numerology of RMSI. The PDSCH delivering RMSI may be confined within the initial active DL BWP. A wireless device may be configured with PRB bundling size(s) per BWP.

A wireless network may support configuring CSI-RS resource on BWP with a transmission BW equal to or smaller than the BWP. A wireless network may support at least the CSI-RS spanning contiguous RBs in the granularity of an arbitrary number (X) RBs, for example, if the CSI-RS BW is smaller than the BWP. If CSI-RS BW is smaller than the corresponding BWP, it may be at least larger than X RBs. The value of X may be the same or different for beam management and CSI acquisition. The value of X may or may not be numerology-dependent.

For frequency division duplex (FDD), a base station may configure separate sets of BWP configurations for DL and/or UL per component carrier. A numerology of DL BWP configuration may be applied to at least PDCCH, PDSCH, and/or corresponding DMRS. A numerology of UL BWP configuration may be applied to at least PUCCH, PUSCH, and/or corresponding DMRS. For time division duplex (TDD), base station may configure separate sets of BWP configurations for DL and/or UL per component carrier. A numerology of DL BWP configuration may be applied to at least PDCCH, PDSCH, and/or corresponding DMRS. A numerology of UL BWP configuration may be applied to at least PUCCH, PUSCH, and/or corresponding DMRS. A wireless device may not retune the center frequency of channel BW between DL and UL, for example, if different active DL and UL BWPs are configured.

One or more scheduling request (SR) configurations may be configured for a BWP of a cell for a wireless device. A wireless device may use SR resources configured by the SR configurations in a BWP to indicate to the base station the numerology/TTI/service type of a logical channel (LCH) or logical channel group (LCG) that triggered the SR. The maximum number of SR configurations may be the maximum number of logical channels/logical channel groups.

There may be at most one active DL BWP and at most one active UL BWP at a given time for a serving cell. A BWP of a cell may be configured with a specific numerology and/or TTI. For a logical channel and/or logical channel group that triggers a SR transmission, for example, while the wireless device operates in one active BWP, the corresponding SR may remain triggered based on BWP switching.

The logical channel and/or logical channel group to SR configuration mapping may be configured and/or reconfigured based on switching of the active BWP. The RRC dedicated signaling may configure and/or reconfigure the logical channel and/or logical channel group to SR configuration mapping on the new active BWP if the active BWP is switched.

A mapping between a logical channel and/or logical channel group and SR configuration may be configured if a BWP is configured. The RRC may pre-configure mapping between logical channels and/or logical channel groups to SR configurations for the configured BWPs. Based on switching of the active BWP, a wireless device may use the RRC configured mapping relationship for the new BWP. A RRC may configure the mapping between logical channel and SR configurations for the BWP. The sr-ProhibitTimer and SR_COUNTER corresponding to a SR configuration may continue and the value of the sr-ProhibitTimer and the value of the SR_COUNTER may be their values before the BWP switching.

A plurality of logical channel/logical channel group to SR configuration mappings may be configured in a serving cell. A logical channel/logical channel group may be mapped to at most one SR configuration per BWP. A logical channel/logical channel group mapped onto multiple SR configurations in a serving cell may have one SR configuration active at a time, such as that of the active BWP. A plurality of logical channel/logical channel group to SR-configuration mappings may be supported in carrier aggregation (CA). A logical channel/logical channel group may be mapped to one (or more) SR configuration(s) in each of PCell and PUCCH-SCell. A logical channel/logical channel group configured to be mapped to one (or more) SR configuration(s) in each of both PCell and PUCCH-SCell may have two active SR configurations (one on PCell and one on PUCCH-SCell) at a time for CA. The SR resource is received first may be used.

A base station may configure one SR resource per BWP for the same logical channel/logical channel group. If a SR for one logical channel/logical channel group is pending, a wireless device may transmit a SR with the SR configuration in another BWP after BWP switching. The sr-ProhibitTimer and SR_COUNTER for the SR corresponding to the logical channel/logical channel group may continue based on BWP switching. The wireless device may transmit the SR in another SR configuration corresponding to the logical channel/logical channel group in another BWP after BWP switching if a SR for one logical channel/logical channel group may be pending, If multiple SRs for logical channels/logical channel groups mapped to different SR configurations are triggered, the wireless device may transmit one SR corresponding to the highest priority logical channel/logical channel group. The wireless device may transmit multiple SRs with different SR configurations. SRs triggered at the same time (e.g., in the same NR-UNIT) by different logical channels/logical channel groups mapped to different SR configurations may be merged into a single SR corresponding to the SR triggered by the highest priority logical channel/logical channel group.

If an SR of a first SR configuration is triggered by a first logical channel/logical channel group, for example, while an SR procedure triggered by a lower priority logical channel/logical channel group may be on-going on another SR configuration, the later SR may be allowed to trigger another SR procedure on its own SR configuration independently of the other SR procedure. A wireless device may be allowed to send independently triggered SRs for logical channels/logical channel groups mapped to different SR configurations. A wireless device may be allowed to send triggered SRs for LCHs corresponding to different SR configurations independently.

The dsr-TransMax may be independently configured per SR configuration. The SR_COUNTER may be maintained for each SR configuration independently. A common SR_COUNTER may be maintained for all the SR configurations per BWP.

PUCCH resources may be configured per BWP. The PUCCH resources in the currently active BWP may be used for UCI transmission. PUCCH resources may be configured per BWP. PUCCH resources may be utilized in a BWP not currently active for UCI transmission. PUCCH resources may be configured in a default BWP and BWP switching may be necessary for PUCCH transmission. A wireless device may be allowed to send SR1 in BWP1 even though BWP1 may be no longer active. The network may reconfigure (e.g., pre-configure) the SR resources so that both SR1 and SR2 may be supported in the active BWP. An anchor BWP may be used for SR configuration. In an example, the wireless device may send SR2 as a fallback.

A logical channel/logical channel group mapped to a SR configuration in an active BWP may also be mapped to the SR configuration in another BWP to imply same or different information, such as numerology and/or TTI and priority. A MAC entity can be configured with a plurality of SR configurations within the same BWP. The plurality of the SR configurations may be on the same BWP, on different BWPs, or on different carriers. The numerology of the SR transmission may differ from the numerology that the logical channel/logical channel group that triggered the SR may be mapped to.

The PUCCH resources for transmission of the SR may be on different BWPs or different carriers for a LCH mapped to multiple SR configurations. The selection of which configured SR configuration within the active BWP to transmit one SR may be up to wireless device implementation if multiple SRs are triggered. A single BWP can support multiple SR configurations. Multiple sr-ProhibitTimers (e.g., each for one SR configuration) may be running at the same time. A drs-TransMax may be independently configured per SR configuration. A SR_COUNTER may be maintained for each SR configuration independently. A single logical channel/logical channel group may be mapped to zero or one SR configurations. A PUCCH resource configuration may be associated with a UL BWP. One or more logical channels may be mapped to none or one SR configuration per BWP in CA.

A BWP may consist of a group of contiguous PRBs in the frequency domain. The parameters for each BWP configuration may include numerology, frequency location, bandwidth size (e.g., in terms of PRBs), CORESET. CORESET may be required for each BWP configuration, such as for a single active DL bandwidth part for a given time instant. One or more BWPs may be configured for each component carrier, for example, if the wireless device is in RRC connected mode.

The configured downlink assignment may be initialized (e.g., if not active) or re-initialized (e.g., if already active) using PDCCH if a new BWP may be activated. For uplink SPS, the wireless device may have to initialize and/or re-initialize the configured uplink grant if switching from one BWP to anther BWP. If a new BWP is activated, the configured uplink grant may be initialized (e.g., if not already active) or re-initialized (e.g., if already active) using PDCCH.

For Type 1 uplink data transmission without grant, there may be no L1 signaling to initialize or re-initialize the configured grant. The wireless device may not determine that the Type 1 configured uplink grant may be active if the BWP may be switched, for example, even if the wireless device is already active in the previous BWP. The Type 1 configured uplink grant may be re-configured using RRC dedicated signaling for switching the BWP. The Type 1 configured uplink grant may be re-configured using dedicated RRC signaling if a new BWP is activated.

If SPS is configured on the resources of a BWP and the BWP is subsequently deactivated, the SPS grants or assignments may not continue. All configured downlink assignments and configured uplink grants using resources of this BWP may be cleared, for example, if a BWP is deactivated. The MAC entity may clear the configured downlink assignment or/and uplink grants upon receiving activation and/or deactivation of BWP.

The units of drx-RetransmissionTimer and drx-ULRetransmissionTimer may be OFDM symbol corresponding to the numerology of the active BWP. If a wireless device is monitoring an active DL BWP for a long time without activity, the wireless device may move to a default BWP in order to save power. A BWP inactivity timer may be introduced to switch from an active BWP to the default BWP. Autonomous switching to a DL default BWP may consider both DL BWP inactivity timers and/or DRX timers, such as HARQ RTT and DRX retransmission timers. A DL BWP inactivity timer may be configured per MAC entity. A wireless device may be configured to monitor PDCCH in a default BWP, for example, if a wireless device uses a long DRX cycle.

A power headroom report (PHR) may not be triggered due to the switching of BWP. The support of multiple numerologies/BWPs may not impact PHR triggers. A PHR may be triggered upon BWP activation. A prohibit timer may start upon PHR triggering due to BWP switching. A PHR may not be triggered due to BWP switching, for example, while the prohibit timer may be running. A PHR may be reported per activated and/or deactivated BWP.

Packet Data Convergence Protocol (PDCP) duplication may be in an activated state, for example, while the wireless device receives the BWP deactivation command. The PDCP duplication may not be deactivated, for example, if the BWP on which the PDCP duplication is operated on is deactivated. The PDCP entity may stop sending the data to the deactivated RLC buffer, for example, even if the PDCP duplication may not be deactivated.

RRC signaling may configure a BWP to be activated, for example, if the SCell is activated. Activation and/or deactivation MAC CE may be used to activate both the SCell and the configured BWP. A HARQ entity can serve different BWP within one carrier.

For a wireless device-specific serving cell, one or more DL BWPs and one or more UL BWPs may be configured by dedicated RRC for a wireless device. A single scheduling DCI may switch the wireless device's active BWP from one to another. An active DL BWP may be deactivated by means of timer for a wireless device to switch its active DL bandwidth part to a default DL bandwidth part. A narrower BWP may be used for DL control monitoring and a wider BWP may be used for scheduled data. Small data may be allowed in the narrower BWP without triggering BWP switching.

For a wireless device with a RRC connected mode, RRC signaling may support to configure one or more BWPs (for both DL BWP and UL BWP) for a serving cell (PCell, PSCell). RRC signaling may support to configure zero or more BWPs, for both DL BWP and UL BWP, for a serving cell SCell having at least 1 DL BWP. For a wireless device, the PCell, PSCell, and each SCell may have a single associated SSB in frequency. A cell defining SS block may be changed by synchronous reconfiguration for PCell/PSCell and SCell release/add for the SCell. For example, a SS block frequency that needs to be measured by the wireless device may be configured as individual measurement object, such as having one measurement object corresponds to a single SS block frequency. The cell defining SS block may be considered as the time reference of the serving cell and for RRM serving cell measurements based on SSB irrespective of which BWP may be activated. One or more RRC timers and counters related to RLM may not be reset, for example, if the active BWP may be changed.

A SR configuration may comprise a collection of sets of PUCCH resources across different BWPs and cells, wherein per cell, at any given time there may be at most one usable PUCCH resource per LCH. One single LTE-like set of SR PUCCH resources may be configured per LCH per BWP and one BWP may be active at a time.

BWP switching and cell activation and/or deactivation may not interfere with the operation of the counter and timer. The wireless device may or may not stop using configured downlink assignments and/or configured uplink grants using resources of the BWP, for example, if a BWP may be deactivated. The wireless device may suspend the configured grants of the or clear it. The wireless device may not suspend and/or clear the configured grants. A new timer (e.g., a BWP inactivity timer) may be used to switch from an active BWP to a default BWP after a certain inactive time. The BWP inactivity timer may be independent from the DRX timers.

A wireless device may not transmit on UL-SCH on the BWP that may be deactivated. A BWP may be inactive during a period of time, for example, if a BWP inactivity timer is running for the BWP. A base station may send a control message to a wireless device to configure a first timer value of a BWP inactivity timer. The first timer value may determine how long a BWP inactivity timer runs, for example, a period of time that a BWP inactivity timer runs. The BWP inactivity timer may be implemented as a countdown timer from a first timer value down to zero. The BWP inactivity timer may be implemented as a count-up timer from zero up to a first timer value down. The BWP inactivity timer may be implemented as a down-counter from a first timer value down to zero. The BWP inactivity timer may be implemented as a count-up counter from zero up to a first timer value down. A wireless device may restart a BWP inactivity timer (e.g., UL BWP and/or DL BWP inactivity timers) if the wireless device receives (and/or decodes) a DCI to schedule PDSCH(s) in its active BWP (e.g., its active UL BWP, its active DL BWP, and/or UL/DL BWP pair).

A wireless device may not transmit on UL-SCH on the BWP that may be deactivated. The wireless device may not monitor the PDCCH on the BWP that may be deactivated. The wireless device may not transmit PUCCH on the BWP that may be deactivated. The wireless device may not transmit on PRACH on the BWP that may be deactivated. The wireless device may not flush HARQ buffers if performing BWP switching.

A base station may transmit a DCI via a PDCCH at least for scheduling decision and power-control commends. The DCI may include downlink scheduling assignments, uplink scheduling grants, and/or power-control commands. The downlink scheduling assignments may include PDSCH resource indication, transport format, HARQ information, control information related to multiple antenna schemes, and/or a command for power control of the PUCCH used for transmission of ACK/NACK after or in response to downlink scheduling assignments. The uplink scheduling grants may include PUSCH resource indication, transport format, and HARQ related information, and/or a power control command of the PUSCH.

The DCI may have one or more formats. The different formats may correspond to different DCI message sizes. Supporting spatial multiplexing with noncontiguous allocation of RBs in the frequency domain may require a larger scheduling message in comparison with an uplink grant allowing for frequency-contiguous allocation only. The DCI may have one or more DCI formats associated with a particular message size and usage. A variety of example DCI formats are shown in FIG. 18. The example DCI formats show sizes for 20 MHz FDD operation with 2 TX antennas at the base station and no carrier aggregation. However, other formats can be for other operations, at other frequencies, with a variable number of antennas, and with or without carrier aggregation as appropriate. A radio access technology may define the example DCI format in FIG. 18 with different format numbers and/or sizes. A radio access technology may combine one or more example DCI formats in FIG. 18 into one DCI format. For example, the one DCI format may comprise at least one first field in a first DCI format and at least one second field in a second DCI format. A radio access technology may split an example DCI format in FIG. 18 into one or more DCI formats. For example, a DCI introduced in a radio access technology may comprise at least one field in any of example DCI formats in FIG. 18.

A wireless device may monitor one or more PDCCHs to detect one or more DCIs with one or more DCI formats. The one or more PDCCHs may be transmitted in common search space (CSS) or wireless device-specific search space (USS or USSS). A wireless device may monitor the one or more PDCCHs with one or more DCI formats, which may be selectively chosen to save power consumption. A non-eMTC wireless device may not attempt to detect a DCI with DCI format 6 that may be used for an eMTC wireless device. A wireless device may consume more power as the number of DCI formats that a wireless device attempts to detect increases.

One or more DCI formats used for downlink scheduling may comprise one or more fields. The number of the one or more fields may vary depending on a DCI format. The one or more fields may indicate resource information, a carrier indicator (such as 0 or 3 bits), RB allocation, HARQ process number, MCS, NDI, and RV (such as for the first TB), MCS, NDI and RV (such as for the second TB), MIMO related information (including PMI, precoding information, transport block swap flag, power offset between PDSCH and reference signal, reference-signal scrambling sequence, number of layers, and/or antenna ports for the transmission, PDSCH resource-element mapping, and QCI), downlink assignment index (DAI), TPC for PUCCH, SRS request (such as 1 bit), triggering one-shot SRS transmission, ACK/NACK offset, DCI format 0/1A indication (used to differentiate between DCI format 1A and 0, as the two formats have the same message size), and/or padding.

One or more DCI formats used for uplink scheduling may comprise one or more fields. The number of the one or more fields may vary depending on a DCI format. The one or more fields may indicate resource information (including a carrier indicator, resource allocation type, and/or RB allocation), MCS, NDI (such as for the first TB), MCS, NDI (such as for the second TB), phase rotation of the uplink DMRS, precoding information, CSI request, requesting an aperiodic CSI report, SRS request (such as 2 bit and used to trigger aperiodic SRS transmission using one of up to three preconfigured settings), uplink index/DAI, TPC for PUSCH, DCI format 0/1A indication, and/or padding.

A wireless network may support a wide bandwidth operation. A base station may transmit one or more PDCCHs in one or more control resource sets (CORESETs). A base station may transmit one or more RRC message comprising configuration parameters of one or more CORESETs. At least one of the one or more CORESETs may include a first OFDM symbol (such as CORESET_StartSymbol), a number of consecutive OFDM symbols (e.g, CORESET_NumSymbol), a set of resource blocks (such as CORESET_RB-Set), a CCE-to-REG mapping (e.g, CORESET_mapping), and/or a REG bundle size. The REG bundle size may be utilized for an interleaved CCE-to-REG mapping such as CORESET_REG_bundle.

A base station may transmit one or more messages comprising configuration parameters of one or more active bandwidth parts (BWPs). The one or more active BWPs may be associated with different numerologies. A base station may transmit one or more control information for cross-BWP scheduling to a wireless device.

Wireless networks may use a variety of power control mechanisms with a number of power control parameters. Physical layer power control mechanisms may utilize layer 2 parameters. Downlink power control parameters may determine energy per resource element (EPRE). Resource element energy may include energy prior to CP insertion and/or the average energy taken over all constellation points for the modulation scheme applied. Uplink power control parameters may determine the average power over a SC-FDMA symbol in which the physical channel may be transmitted. Uplink power control parameters may control the transmit power of the different uplink physical channels.

A wireless device may use power control mechanisms for PUSCH and SRS with a type 1 frame structure for a LAA SCell if the wireless device is configured with a LAA SCell for uplink transmissions. The wireless device may use power control mechanisms for MCG and/or SCG. The wireless device may use power control mechanisms for a PUCCH-SCell having a primary PUCCH group and/or a secondary PUCCH group.

For PUSCH, the transmit power $\hat{P}_{PUSCH,c}(i)$ may be scaled by the ratio of the number of antennas ports with a non-zero PUSCH transmission to the number of configured antenna ports for the transmission scheme. The resulting scaled power may be then split equally across the antenna ports on which the non-zero PUSCH is transmitted. For PUCCH or SRS, the transmit power $\hat{P}_{PUCCH}(i)$, or $\hat{P}_{SRS,c}(G)$ may be split equally across the configured antenna ports for PUCCH or SRS. $\hat{P}_{SRS,c}(i)$ may be the linear value of $P_{SRS,c}(i)$. A cell wide overload indicator (OI) and a High Interference Indicator (HII) to control UL interference may be parameters.

For a serving cell with frame structure type 1, a wireless device may not be expected to be configured with UplinkPowerControlDedicated-v12x0.

If the wireless device transmits PUSCH without a simultaneous PUCCH for the serving cell C, then the wireless device transmit power $P_{PUSCH,c}(i)$ for PUSCH transmission in subframe (TTI, slot, and/or mini-slot) i for the serving cell C may be given by $$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

If the wireless device transmits PUSCH simultaneous with PUCCH for the serving cell C, then the wireless device transmit power $P_{PUSCH,c}(i)$ for the PUSCH transmission in subframe (TTI, slot, and/or mini-slot) i for the serving cell C may be given by $$P_{PUSCH,c}(i) = \min\left\{\begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array}\right\}$$

[dBm]

If the wireless device is not transmitting PUSCH for the serving cell c, for the accumulation of TPC command received with DCI, such as a example DCI format 3/3A in FIG. 18, for PUSCH, the wireless device may assume that the wireless device transmit power $P_{PUSCH,c}(i)$ for the PUSCH transmission in subframe (TTI, slot, and/or mini-slot) i for the serving cell C is computed by $$P_{PUSCH,c}(i) = \min\{P_{CMAX,c}(i), P_{O\_PUSCH,c}(1) + \alpha_c(1) \cdot PL_c + f_c(i)\}$$

For both types of $f_c(*)$ (accumulation or current absolute) the first value may be set as follows:

If $P_{O\_UE\_PUSCH,c}$ may be changed by higher layers and serving cell c may be the primary cell or if $P_{O\_UE\_PUSCH,c}$ value may be received by higher layers and serving cell c is a Secondary cell, then $$f_c(0)=0$$

If the wireless device may receive the random access response message for a serving cell c, the wireless device may set $f_c(0)=\Delta P_{rampup,c}+\delta_{msg2,c}$, where $\delta_{msg2,c}$ may be the TPC command indicated in the random access response corresponding to the random access preamble transmitted in the serving cell c, and $$\Delta P_{rampup,c} = \min\left[\left\{\max\left(0, P_{CMAX,c} - \left(\begin{array}{l}10\log_{10}(M_{PUSCH,c}(0)) + \\ P_{O\_PUSCH,c}(2) + \\ \alpha_c(2) \cdot PL + \Delta_{TF,c}(0)\end{array}\right)\right)\right\}, \Delta P_{rampuprequested}\right]$$

and $\Delta P_{rampuprequested,c}$ may be provided by higher layers and may correspond to the total power ramp-up requested by higher layers from the first to the last preamble in the serving cell c, $M_{PUSCH,c}(0)$ may be the bandwidth of the PUSCH resource assignment expressed in number of resource blocks valid for the subframe (TTI, slot, and/or mini-slot) of first PUSCH transmission in the serving cell c, and $\Delta TF$, c(0) may be the power adjustment of first PUSCH transmission in the serving cell c. If $P_{O\_UE\_PUSCH,c,2}$ value may be received by higher layers for a serving cell c, the wireless device may set $f_{c,2}(0)=0$ $P_{CMAX,c}(i)$ may be the configured wireless device transmit power in subframe (TTI, slot, and/or mini-slot) i for serving cell c and $\hat{P}_{CMAX,c}(i)$ may be the linear value of $P_{CMAX,c}(i)$ If the wireless device transmits PUCCH without PUSCH in subframe (TTI, slot, and/or mini-slot) i for the serving cell c, for the accumulation of TPC command received with a DCI format, such as an example DCI format 3/3A in FIG. 18, for PUSCH, the wireless device may assume $P_{MAX,c}(i)$. If the wireless device does not transmit PUCCH and PUSCH in subframe (TTI, slot, and/or mini-slot) i for the serving cell c, for the accumulation of TPC command received with a DCI format, such as an example DCI format 3/3A in FIG. 18, for PUSCH, the wireless device may compute $P_{CMAX,c}(i)$ assuming MPR=0 dB, A-MPR=0 dB, P-MPR=0 dB and $\Delta TC$=0 dB, where MPR, A-MPR, P-MPR and $\Delta TC$ may be pre-defined.

$\hat{P}_{PUCCH}(i)$ may be the linear value of $P_{PUCCH}(i)$, $M_{PUSCH,c}(i)$ may be the bandwidth of the PUSCH resource assignment expressed in number of resource blocks valid for subframe (TTI, slot, and/or mini-slot) i and serving cell c.

If the wireless device is configured with higher layer parameter for serving cell c and if subframe (TTI, slot, and/or mini-slot) belongs to uplink power control subframe (TTI, slot, and/or mini-slot) set 2 as indicated by the higher layer parameter:

a. if j=0, the wireless device may set $P_{O\_PUSCH,c}(0)= P_{O\_UE\_PUSCH,c,2}(0)+P_{O\_NOMINAL\_PUSCH,c,2}(0)$ where j=0 may be used for PUSCH (re)transmissions corresponding to a semi-persistent grant. $P_{O\_UE\_PUSCH,c,2}(0)$ and $P_{O\_NOMINAL\_PUSCH,c,2}$ may be the parameters provided by higher layers for each serving cell C;

b. if j=1, the wireless device may set $P_{O\_PUSCH,c}(1)= P_{O\_UE\_PUSCH,c,2}(1)+P_{O\_NOMINAL\_PUSCH,c,2}(1)$, where j=1 may be used for PUSCH (re)transmissions corresponding to a dynamic scheduled grant.

$P_{O\_UE\_PUSCH,c,2}(1)$ and $P_{O\_NOMINAL\_PUSCH,c,2}(1)$ may be the parameters provided by higher layers for serving cell C; and c. if j=2, the wireless device may set $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower $(P_{O\_PRE})$ and $\Delta_{PREAMBLE\_Msg3}$ may be signaled from higher layers for serving cell C, where j=2 may be used for PUSCH (re)transmissions corresponding to the random access response grant.

$P_{O\_PUSCH,c}(j)$ may be a parameter comprising the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent (configured and/or grant-free) grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$ where the parameter preambleInitialReceivedTargetPower $(P_{O\_PRE})$ and $\Delta_{PREAMBLE\_Msg3}$ may be signaled from higher layers for serving cell c.

If the wireless device may be configured with higher layer parameter for serving cell C and if subframe (TTI, slot, and/or mini-slot) belongs to uplink power control subframe (TTI, slot, and/or mini-slot) set 2 as indicated by the higher layer parameter, a. For j=0 or 1, the wireless device may set $\alpha_c(j) = \alpha_{c,2} \in \{0, 0.4, 0.5, 0.6, 0.7, 0.8, 0.9, 1\}$ $\alpha_{c,2}$ may be the parameter alpha-SubframeSet2-r12 provided by higher layers for each serving cell c.

b. For j=2, the wireless device may set $\alpha_c(j)=1$.

Otherwise c. For j=0 or 1, $\alpha_c \in \{0, 0.4, 0.5, 0.6, 0.7, 0.8, 0.9, 1\}$ may be a 3-bit parameter provided by higher layers for serving cell C. For j=2, the wireless device may set $\alpha_c(j)=1$.

$PL_c$ may be the downlink path loss estimate calculated in the wireless device for serving cell c in dB and $PL_c$=referenceSignalPower–higher layer filtered reference signal received power (RSRP), where referenceSignalPower may be provided by higher layers and RSRP may be defined for the reference serving cell and the higher layer filter configuration may be defined for the reference serving cell.

If serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP.

If serving cell c belongs to a TAG containing the PSCell then, for the uplink of the PSCell, the PSCell may be used as the reference serving cell for determining referenceSignalPower and higher layer filtered RSRP, for the uplink of the secondary cell other than PSCell, the serving cell configured by the higher layer parameter pathlossReferenceLinking may be used as the reference serving cell for determining referenceSignalPower and higher layer filtered RSRP.

If serving cell c belongs to a TAG not containing the primary cell or PSCell then serving cell c may be used as the reference serving cell for determining referenceSignalPower and higher layer filtered RSRP.

$\Delta_{TF,c}(i) = 10 \log_{10}(2^{BPR \cdot K_s} - 1) \cdot \beta_{offset}^{PUSCH})$ for $K_S = 1.25$ and 0 for $K_S = 0$ where $K_S$ may be given by the parameter, such as deltaMCS-Enabled, provided by higher layers for each serving cell c. BPRE and $\beta_{offset}^{PUSCH}$, for each serving cell c, may be computed as below. $K_S = 0$ may be for transmission mode 2.

BPRE=$O_{CQI}/N_{RE}$ may be for control data sent via PUSCH without UL-SCH data and $$\sum_{r=0}^{C-1} K_r/N_{RE}$$

for other examples. C may be the number of code blocks, $K_r$ may be the size for code block r, $O_{CQI}$ may be the number of CQI/PMI bits including CRC bits and $N_{RE}$ may be the number of resource elements determined as $N_{RE} = M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ may be pre-defined. $\beta_{offset}^{PUSCH} = \beta_{offset}^{CQI}$ may be for control data sent via PUSCH without UL-SCH data and 1 for other examples.

$\delta_{PUSCH,c}$ may be a correction value, also referred to as a TPC command and may be included in PDCCH/EPDCCH with a DCI format, such as an example DCI format 0/0A/0B/4/4A/4B in FIG. 18 or in MPDCCH with a DCI format, such as an example DCI format 6-0A in FIG. 18, for serving cell c or jointly coded with other TPC commands in PDCCH/MPDCCH with a DCI format, such as an example DCI format 3/3A in FIG. 18, whose CRC parity bits may be scrambled with TPC-PUSCH-RNTI.

If the wireless device may be configured with higher layer parameter for serving cell c and if subframe (TTI, slot, and/or mini-slot) i belongs to uplink power control subframe (TTI, slot, and/or mini-slot) set 2 as indicated by the higher layer parameter the current PUSCH power control adjustment state for serving cell c may be given by $f_{c,2}(i)$, and the wireless device may use $f_{c,2}(i)$ instead of $f_c(i)$ to determine $P_{PUSCH,c}(i)$. Otherwise, the current PUSCH power control adjustment state for serving cell c may be given by $f_c(i)$, $f_{c,2}(i)$ and $f_c(i)$ may be defined by:

$f_c(i) = f_c(i-1) + \delta_{PUSCH,c}(i - K_{PUSCH})$ and $f_{c,2}(i) = f_{c,2}(i-1) + \delta_{PUSCH,c}(i - K_{PUSCH})$ if accumulation is enabled based on the parameter, such as Accumulation-enabled, provided by higher layers or if the TPC command $\delta_{PUSCH,c}$ may be included in a PDCCH/EPDCCH with a DCI format, such as an example DCI format 0 in FIG. 18, or in a MPDCCH with a DCI format, such as an example DCI format 6-0A in FIG. 18, for serving cell c where the CRC may be scrambled by the Temporary C-RNTI where $\delta_{PUSCH,c}(i - K_{PUSCH})$ may be signaled on PDCCH/EPDCCH with a DCI format, such as an example DCI format 0/0A/0B/4/4A/4B in FIG. 18 or MPDCCH with a DCI format, such as an example DCI format 6-0A in FIG. 18 or PDCCH/MPDCCH with a DCI format, such as an example DCI format 3/3A in FIG. 18 on subframe (TTI, slot, and/or mini-slot) $i - K_{PUSCH}$, and where $f_c(0)$ may be the first value after reset of accumulation. For a BL/CE wireless device configured with CEModeA, subframe (TTI, slot, and/or mini-slot) $i - K_{PUSCH}$ may be the last subframe (TTI, slot, and/or mini-slot) in which the MPDCCH with a DCI format, such as 6-0A or MPDCCH with a DCI format, such as 3/3A may be transmitted.

The value of $K_{PUSCH}$ may be, for FDD or FDD-TDD and serving cell frame structure type 1, $K_{PUSCH}=4$. For TDD, if the wireless device may be configured with more than one serving cell and the TDD UL/DL configuration of at least two configured serving cells may be not the same, or if the wireless device may be configured with the parameter for at least one serving cell, or for FDD-TDD and serving cell frame structure type 2, the "TDD UL/DL configuration" may refer to the UL-reference UL/DL configuration for serving cell c. For TDD UL/DL configurations 1-6, $K_{PUSCH}$ may be given in a predefined table for example as shown in FIG. 19A.

For TDD UL/DL configuration 0, the PUSCH transmission in subframe (TTI, slot, and/or mini-slot) 2 or 7 may be scheduled with a PDCCH/EPDCCH of a DCI format, such as an example DCI format 0/4 in FIG. 18, or a MPDCCH of a DCI format, such as an example DCI format 6-0A in FIG. 18, in which the LSB of the UL index may be set to 1, $K_{PUSCH}=7$. For all other PUSCH transmissions, $K_{PUSCH}$ may be given in a predefined table for example as shown in FIG. 19A.

For a serving cell with frame structure type 3, for an uplink DCI format, such as an example DCI format 0A/0B/4A/4B in FIG. 18, with PUSCH trigger A set to 0, $K_{PUSCH}$ may be equal to k+l, where k and l may be pre-defined.

For an uplink DCI format, such as 0A/0B/4A/4B, with PUSCH trigger A set to 1 and upon the detection of PDCCH with DCI CRC scrambled by CC-RNTI and with 'PUSCH trigger B' field set to '1', $K_{PUSCH}$ may be equal to p+k+l, where p, k and l may be pre-defined.

A wireless device may detect multiple TPC commands in subframe (TTI, slot, and/or mini-slot) $i-K_{PUSCH}$, the wireless device may use the TPC command in the PDCCH/EPDCCH with a DCI format, such as an example DCI format 0A/0B/4A/4B in FIG. 18, which may schedule PUSCH transmission in subframe (TTI, slot, and/or mini-slot) i.

For serving cell c and a non-BL/CE wireless device, the wireless device may attempt to decode a PDCCH/EPDCCH of a DCI format, such as an example DCI format 0/0A/0B/4/4A/4B in FIG. 18, with the wireless device's C-RNTI or a DCI format, such as an example DCI format 0 in FIG. 18, for SPS (or configured grant, Grant-free type1, and/or grant-free type 2) C-RNTI and a PDCCH of a DCI format, such as an example DCI format 3/3A in FIG. 18, with this wireless device's TPC-PUSCH-RNTI in every subframe (TTI, slot, and/or mini-slot) except for example if in DRX or where serving cell c may be deactivated.

For serving cell c and a BL/CE wireless device configured with CEModeA, the wireless device may attempt to decode a MPDCCH of a DCI format, such as an example DCI format 6-0A in FIG. 18, with the wireless device's C-RNTI or SPS (OR CONFIGURED GRANT, GRANT-FREE TYPE1, AND/OR GRANT-FREE TYPE 2) C-RNTI and a MPDCCH of a DCI format, such as an example DCI format 3/3A in FIG. 18, with this wireless device's TPC-PUSCH-RNTI in every BL/CE downlink subframe (TTI, slot, and/or mini-slot) except for example if in DRX.

For a non-BL/CE wireless device, if a DCI format, such as an example DCI format 0/0A/0B/4/4A/4B in FIG. 18, for serving cell c and a DCI format, such as an example DCI format 3/3A in FIG. 18, may be both detected in the same subframe, then the wireless device may use the $\delta_{PUSCH,c}$ provided in a DCI format, such as an example DCI format 0/0A/0B/4/4A/4B in FIG. 18.

For a BL/CE wireless device configured with CEModeA, if a first DCI format, such as an example DCI format 6-0A in FIG. 18, for serving cell C and a second DCI, such as an example DCI format 3/3A in FIG. 18, may be both detected in the same subframe, then the wireless device may use the $\delta^{PUSCH,c}$ provided in the first DCI format, such as an example DCI format 6-0A in FIG. 18.

$\delta_{PUSCH,c}=0$ dB for a subframe (TTI, slot, and/or mini-slot) where no TPC command may be decoded for serving cell c or where DRX occurs or i may be not an uplink subframe (TTI, slot, and/or mini-slot) in TDD or FDD-TDD and serving cell c frame structure type 2.

$\delta_{PUSCH,c}=0$ dB if the subframe (TTI, slot, and/or mini-slot) i may be not the first subframe (TTI, slot, and/or mini-slot) scheduled by a PDCCH/EPDCCH of a DCI format such as an example DCI format 0B/4B in FIG. 18.

The $\delta_{PUSCH,c}$ dB accumulated values signaled on PDCCH/EPDCCH with a DCI format, such as an example DCI format 0/0A/0B/4/4A/4B in FIG. 18 or MPDCCH with a DCI format, such as an example DCI format 6-0A in FIG. 18, may be given in a predefined table, for example as shown in FIG. 19B. In an example, if the PDCCH/EPDCCH with a DCI format, such as DCI format 0 or MPDCCH with a DCI format, such as an example DCI format 6-0A in FIG. 18, may be validated as a (or GF) activation or release PDCCH/EPDCCH/MPDCCH, then $\delta_{PUSCH,c}$ may be 0 dB.

The $\delta_{PUSCH}$ dB accumulated values signaled on PDCCH/MPDCCH with a DCI format, such as an example DCI format 3/3A in FIG. 18, may be one of SET1 given in a predefined table, for example as shown in FIG. 19B, or SET2 given in a predefined table, for example as shown in FIG. 19C as determined by the parameter, such as TPC-Index, provided by higher layers.

Positive TPC commands for serving cell c may not be accumulated if, for example, a wireless device has reached $P_{CMAX,c}(i)$ for serving cell c.

Negative TPC commands may not be accumulated if, for example, a wireless device has reached minimum power.

The wireless device may reset accumulation if, for example, the wireless device may be not configured with higher layer parameter comprising power control parameters dedicated for the wireless device, such as UplinkPowerControlDedicated, for serving cell c. For serving cell c, $P_{O\_UE\_PUSCH,c}$ value may be changed by higher layers.

For serving cell c, the wireless device may receive a random access response message for serving cell c. The wireless device may be configured with higher layer parameter, such as UplinkPowerControlDedicated, for serving cell c, the wireless device may reset accumulation corresponding to $f_c(*)$ for serving cell c, $P_{O\_UE\_PUSCH,c}$ value may be changed by higher layers, the wireless device may receive a random access response message for serving cell c, the wireless device may reset accumulation corresponding to $f_{c,2}(*)$ for serving cell c, and/or $P_{O\_UE\_PUSCH,c,2}$ value may be changed by higher layers.

The wireless device may be configured with higher layer parameter, such as UplinkPowerControlDedicated, for serving cell c and if subframe (TTI, slot, and/or mini-slot) i may belong to uplink power control subframe (TTI, slot, and/or mini-slot) set 2 as indicated by the higher layer parameter, such as tpc-SubframeSet-r12, the wireless device may set $f_c(i)=f_c(i-1)$ subframe (TTI, slot, and/or mini-slot) i may not belong to uplink power control subframe (TTI, slot, and/or mini-slot) set 2 as indicated by the higher layer parameter the wireless device may set $f_{c,2}(i)=f_{c,2}(i-1)$ The wireless device may set $f_c(i)=\delta_{PUSCH,c}(i-K_{PUSCH})$ and $f_{c,2}(i)=\delta_{PUSCH,c}(i-K_{PUSCH})$ if accumulation may be not enabled for serving cell c based on the parameter, such as Accumulation-enabled, provided by higher layers, where $\delta^{PUSCH,c}(i-K_{PUSCH})$ was signaled on PDCCH/EPDCCH with a DCI format, such as an example DCI format 0/0A/0B/4/4A/4B in FIG. 18, or MPDCCH with a DCI format, such as an example DCI format 6-0A in FIG. 18 for serving cell c on subframe (TTI, slot, and/or mini-slot) $i-K_{PUSCH}$.

For a BL/CE wireless device configured with CEModeA, subframe (TTI, slot, and/or mini-slot) i−$K_{PUSCH}$ may be the last subframe (TTI, slot, and/or mini-slot) in which the MPDCCH with a DCI format such as an example DCI format 6-0A or MPDCCH with a DCI format such as an example DCI format 3/3A may be transmitted.

For FDD or FDD-TDD and serving cell frame structure type 1, the wireless device may set $K_{PUSCH}$=4. For TDD, if the wireless device may be configured with more than one serving cell and the TDD UL/DL configuration of at least two configured serving cells may be not the same, or if the wireless device may be configured with the parameter for at least one serving cell, or FDD-TDD and serving cell frame structure type 2, the "TDD UL/DL configuration" may refer to the UL-reference UL/DL configuration for serving cell c.

For TDD UL/DL configurations 1-6, $K_{PUSCH}$ may be given in a predefined table, for example as shown in FIG. 19A. For TDD UL/DL configuration 0, if the PUSCH transmission in subframe (TTI, slot, and/or mini-slot) 2 or 7 may be scheduled with a PDCCH/EPDCCH of a DCI format, such as 0/4 or a MPDCCH with a DCI format, such as 6-0A in which the LSB of the UL index may be set to 1, the wireless device may set $K_{PUSCH}$=7. For all other PUSCH transmissions, $K_{PUSCH}$ may be given in a predefined table, for example as shown in FIG. 19A.

For a serving cell with frame structure type 3, for an uplink DCI format, such as an example DCI format 0A/4A in FIG. 18, with PUSCH trigger A set to 0, $K_{PUSCH}$ may be equal to k+l, where k and l may be pre-defined.

For an uplink DCI format, such as an example DCI format 0B/4B in FIG. 18, with PUSCH trigger A set to 0, $K_{PUSCH}$ may be equal to k+l+i' with i'=mod($n_{HARQ\_ID}^{i}$−$n_{HARQ\_ID}$, $N_{HARQ}$), where niHARQ_ID may be HARQ process number in subframe (TTI, slot, and/or mini-slot) i, and k, l, nHARQ_ID and NHARQ may be pre-defined.

For an uplink DCI format, such as 0A/4A with PUSCH trigger A set to 1 and upon the detection of PDCCH with DCI CRC scrambled by CC-RNTI and with 'PUSCH trigger B' field set to '1', $K_{PUSCH}$ may be equal to p+k+l, where p, k and l may be pre-defined.

For an uplink DCI format, such as an example DCI format 0B/4B in FIG. 18, with PUSCH trigger A set to 1 and upon the detection of PDCCH with DCI CRC scrambled by CC-RNTI and with 'PUSCH trigger B' field set to '1', $K_{PUSCH}$ may be equal to p+k+l+i' with i'=mod($n_{HARQ\_ID}^{9}$−

$n_{HARQ\_ID}$, $N_{HARQ}$) where niHARQ_ID may be HARQ process number in subframe (TTI, slot, and/or mini-slot) i, and p, k, l, nHARQ_ID and NHARQ may be pre-defined.

A wireless device may detect multiple TPC commands in subframe (TTI, slot, and/or mini-slot) i−$K_{PUSCH}$. The wireless device may use the TPC command in the PDCCH/EPDCCH with a DCI format, such as an example DCI format 0A/0B/4A/4B in FIG. 18, which may schedule PUSCH transmission in subframe (TTI, slot, and/or mini-slot) i. The $\delta_{PUSCH,c}$ dB absolute values signaled on PDCCH/EPDCCH with a DCI format, such as an example DCI format 0/0A/0B/4/4A/4B in FIG. 18, or a MPDCCH with a DCI format, such as an example DCI format 6-0A in FIG. 18 may be given in a predefined table, for example as shown in FIG. 19B. If the PDCCH/EPDCCH with DCI format 0 or a MPDCCH with DCI format 6-02A may be validated as a SPS (OR CONFIGURED GRANT, GRANT-FREE TYPE1, AND/OR GRANT-FREE TYPE 2) activation or release PDCCH/EPDCCH/MPDCCH, then $\delta_{PUSCH,c}$ may be 0 dB.

for a non-BL/CE wireless device, the wireless device may set $f_c(i)=f_c(i-1)$ and $f_{c,2}(i)=f_{c,2}(i-1)$ for a subframe (TTI, slot, and/or mini-slot) where no PDCCH/EPDCCH with a DCI format, such as an example DCI format 0/0A/0B/4/4A/4B in FIG. 18, may be decoded for serving cell c or where DRX may occur or i may be not an uplink subframe (TTI, slot, and/or mini-slot) in TDD or FDD-TDD and serving cell c frame structure type 2.

For a BL/CE wireless device configured with CEModeA, the wireless device may set $f_c(i)=f_c(i-1)$ and $f_{c,2}(i)=f_{c,2}(i-1)$ for a subframe (TTI, slot, and/or mini-slot) where no MPDCCH with DCI format 6-0A may be decoded for serving cell c or where DRX occurs or i may be not an uplink subframe (TTI, slot, and/or mini-slot) in TDD.

The wireless device may be configured with higher layer parameter, such as UplinkPowerControlDedicated, for serving cell c and if subframe (TTI, slot, and/or mini-slot) i may belong to uplink power control subframe (TTI, slot, and/or mini-slot) set 2 as indicated by the higher layer parameter, the wireless device may set $f_c(i)=f_c(i-1)$, and if subframe (TTI, slot, and/or mini-slot) i may not belong to uplink power control subframe (TTI, slot, and/or mini-slot) set 2 as indicated by the higher layer parameter, the wireless device may set $f_{c,2}(i)=f_{c,2}(i-1)$.

Serving cell C may be the primary cell, for a PUCCH format, such as 1/1a/1b/2/2a/2b/3, the setting of the wireless device Transmit power $P_{PUCCH}$ for the physical uplink control channel (PUCCH) transmission in subframe (TTI, slot, and/or mini-slot) i for serving cell c may be defined by $$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} [dBm].$$

Serving cell c may be the primary cell, for a PUCCH format, such as 4/5, the setting of the wireless device Transmit power $P_{PUCCH}$ for the physical uplink control channel (PUCCH) transmission in subframe (TTI, slot, and/or mini-slot) i for serving cell c may be defined by $$P_{PUCCH}(i) = \min\left\{ \begin{array}{l} P_{CMAX,c}(i), \\ P_{0\_PUCCH} + PL_c + 10\log_{10}(M_{PUCCH,c}(i)) + \Delta_{TF,c}(i) + \Delta_{F\_PUCCH}(F) + g(i) \end{array} \right\} [dBm].$$

The wireless device may be not transmitting PUCCH for the primary cell, for the accumulation of TPC command for PUCCH, the wireless device may assume that the wireless device transmit power $P_{PUCCH}$ for PUCCH in subframe (TTI, slot, and/or mini-slot) i may be computed by $$P_{PUCCH}(i) = \min\ \{P_{CMAX,c}(i), P_{0\_PUCCCH} + PL_c + g(i)\}\ [dBm].$$

The wireless device may set $$g(i) = g(i-1) + \sum_{m=0}^{M-1} \delta_{PUCCH}(i-k_m)$$

where g(i) may be the current PUCCH power control adjustment state and where g(0) may be the first value after reset.

For FDD or FDD-TDD and primary cell frame structure type 1, the wireless device may set M=1 and $k_0$=4. For TDD, values of M and $k_m$ may be pre-defined. The $\delta_{PUCCH}$ dB values signaled on PDCCH with a DCI format, such as an example DCI format 1A/1B/1D/1/2A/2/2B/2C/2D in FIG. 18 or EPDCCH with a DCI format, such as an example DCI format 1A/1B/1D/1/2A/2/2B/2C/2D in FIG. 18 or MPDCCH with a DCI format, such as an example DCI format 6-1A in FIG. 18 may be given in a predefined table, such as shown in FIG. 20A. For the PDCCH with a DCI format, such as an example DCI format 1/1A/2/2A/2B/2C/2D in FIG. 18 or EPDCCH with a DCI format, such as an example DCI format 1/1A/2A/2/2B/2C/2D in FIG. 18 or MPDCCH with a DCI format, such as an example DCI format 6-1A in FIG. 18 may be validated as an SPS (OR CONFIGURED GRANT, GRANT-FREE TYPE1, AND/OR GRANT-FREE TYPE 2) activation PDCCH/EPDCCH/MPDCCH, or the PDCCH/EPDCCH, such as with a DCI format 1A or MPDCCH, such as with a DCI format 6-1A may be validated as an SPS (OR CONFIGURED GRANT, GRANT-FREE TYPE1, AND/OR GRANT-FREE TYPE 2) release PDCCH/EPDCCH/MPDCCH, then $\delta_{PUCCH}$ may be 0 dB.

The $\delta_{PUCCH}$ dB values signaled on PDCCH/MPDCCH with a DCI format, such as an example DCI format 3/3A may be given in a predefined table, such as shown in FIG. 20A and FIG. 20B as semi-statically configured by higher layers.

The $P_{O\_UE\_PUCCH}$ value may be changed by higher layers, the wireless device may set g(0)=0 and the wireless device may set $g(0)=\Delta P_{rampup}+\delta_{msg2}$ where $\delta_{msg2}$ may be the TPC command indicated in the random access response corresponding to the random access preamble transmitted in the primary cell, and if the wireless device is transmitting PUCCH in subframe (TTI, slot, and/or mini-slot) i, $$\Delta P_{rampup} = \min\left[\left\{\max\left(0, P_{CMAX,c} - \begin{pmatrix} P_{0\_PUCCH} \\ +PL_c + h(n_{CQI}, n_{HARQ}, n_{SR}) \\ +\Delta_{F\_PUCCH}(F) + \Delta_{TxD}(F') \end{pmatrix}\right)\right\}, \Delta P_{rampuprequested}\right]$$

The wireless device may set $\Delta P_{rampup}$=min [{max(0, $P_{CMAX,c}$ ($P_{O\_PUCCH}+PL_c$))}, $\Delta P_{rampuprequested}$] and $\Delta P_{rampuprequested}$ be provided by higher layers and may correspond to the total power ramp-up requested by higher layers from the first to the last preamble in the primary cell.

Positive TPC commands for the primary cell may not be accumulated, for example, if the wireless device has reached $P_{CMAX,c}(i)$ for the primary cell. Negative TPC commands may not be accumulated for example, if the wireless device has reached minimum power. The wireless device may reset accumulation $P_{O\_UE\_PUCCH}$ value may be changed by higher layers and the wireless device may receive a random access response message for the primary cell. g(i)=g(i−1) if i may be not an uplink subframe (TTI, slot, and/or mini-slot) in TDD or FDD-TDD and primary cell frame structure type 2.

$P_{CMAX,c}(i)$ may be the configured wireless device transmit power in subframe (TTI, slot, and/or mini-slot) i for serving cell C. The wireless device may not transmit PUCCH and PUSCH in subframe (TTI, slot, and/or mini-slot) i for the serving cell c, for the accumulation of TPC command for PUCCH, the wireless device may compute $P_{CMAX,c}(i)$ assuming MPR=0 dB, A-MPR=0 dB, P-MPR=0 dB and $\Delta$TC=0 dB, where MPR, A-MPR, P-MPR and $\Delta$TC may be pre-defined.

The parameter $\Delta_{F\_PUCCH}(F)$ may be provided by higher layers. A $\Delta_{F\_PUCCH}(F)$ value may correspond to a PUCCH format (F) relative to PUCCH format 1a, where a PUCCH format (F) may be pre-defined. The wireless device may be configured by higher layers to transmit PUCCH on two antenna ports, the value of $\Delta_{TxD}(F)$ may be provided by higher layers where each PUCCH format F' may be pre-defined, otherwise, $\Delta_{TxD}(F')$=0.

$h(n_{CQI}, n_{HARQ}, n_{SR})$ may be a PUCCH format dependent value, where $n_{CQI}$ may correspond to the number of information bits for the channel quality information. The wireless device may set $n_{SR}$=1 if subframe (TTI, slot, and/or mini-slot) i may be configured for SR for the wireless device not having any associated transport block for UL-SCH, otherwise the wireless device may set $n_{SR}$=0. In an example, if the wireless device may be configured with more than one serving cell, or the wireless device may be configured with one serving cell and transmitting using PUCCH format 3, the value of $n_{HARQ}$ may be pre-defined, otherwise, $n_{HARQ}$ may be the number of HARQ-ACK bits sent in subframe (TTI, slot, and/or mini-slot) i.

Fr PUCCH format 1, 1a and 1b the wireless device may set $h(n_{CQI}, n_{HARQ}, n_{SR})$=0. For PUCCH format 1b with channel selection, if the wireless device may be configured with more than one serving cell, the wireless device may set $$h(n_{CQI}, n_{HARQ}, n_{SR}) = \frac{(n_{HARQ}-1)}{2},$$

otherwise, $h(n_{CQI}, n_{HARQ}, n_{SR})$=0

For PUCCH format 2, 2a, 2b and normal cyclic prefix, the wireless device may set $$h(n_{CQI}, n_{HARQ}, n_{SR}) = \begin{cases} 10 \log_{10}\left(\frac{n_{CQI}}{4}\right) & \text{if } n_{CQI} \geq 4 \\ 0 & \text{otherwise} \end{cases}$$

For PUCCH format 2 and extended cyclic prefix, the wireless device may set $$h(n_{CQI}, n_{HARQ}, n_{SR}) = \begin{cases} 10 \log_{10}\left(\frac{n_{CQI}+n_{HARQ}}{4}\right) & \text{if } n_{CQI}+n_{HARQ} \geq 4 \\ 0 & \text{otherwise} \end{cases}$$

For PUCCH format 3 and if the wireless device transmits HARQ-ACK/SR without periodic CSI, the wireless device may be configured by higher layers to transmit PUCCH format 3 on two antenna ports, or if the wireless device transmits more than 11 bits of HARQ-ACK/SR, the wireless device may set $$h(n_{CQI}, n_{HARQ}, n_{SR}) = \frac{n_{HARQ} + n_{SR} - 1}{3}$$

The wireless device may also set $$h(n_{CQI}, n_{HARQ}, n_{SR}) = \frac{n_{HARQ} + n_{SR} - 1}{2}$$

For PUCCH format 3 and if the wireless device transmits HARQ-ACK/SR and periodic CSI, the wireless device may be configured by higher layers to transmit PUCCH format 3 on two antenna ports, or if the wireless device transmits more than 11 bits of HARQ-ACK/SR and CSI, the wireless device may set $$h(n_{CQI}, n_{HARQ}, n_{SR}) = \frac{n_{HARQ} + n_{SR} + n_{CQI} - 1}{3}$$

The wireless device may also set $$h(n_{CQI}, n_{HARQ}, n_{SR}) = \frac{n_{HARQ} + n_{SR} + n_{CQI} - 1}{2}$$

For PUCCH format 4, $M_{PUCCH,c}(i)$ may be the bandwidth of the PUCCH format 4 expressed in number of resource blocks valid for subframe (TTI, slot, and/or mini-slot) i and serving cell c.

For PUCCH format 5, the wireless device may set $M_{PUCCH,c}(i)=1$.

The wireless device may set $\Delta_{TF,c}(i)=10 \log_{10}(2^{1.25 \cdot BPRE(i)})$ where $BPRE(i)=O_{UCI}(i)/N_{RR}(i)$.

$O_{UCI}(i)$ may be the number of HARQ-ACK/SR/RI/CQI/PMI bits including CRC bits transmitted on PUCCH format 4/5 in subframe (TTI, slot, and/or mini-slot) i The wireless device may set $N_{RE}(i)=M_{PUCCH,c}(i) \cdot N_{sc}^{RB} \cdot N_{symb}^{PUCCH}$ for PUCCH format 4 and $N_{RE}(i)=N_{sc}^{RB} \cdot N_{symb}^{PUCCH}/2$ for PUCCH format 5, the wireless device may set $N_{symb}^{PUCCH}=2 \cdot (N_{symb}^{UL}-1)-1$ if shortened PUCCH format 4 or shortened PUCCH format 5 may be used in subframe (TTI, slot, and/or mini-slot) i and $N_{symb}^{PUCCH}=2 \cdot (N_{symb}^{UL}-1)$ otherwise.

$P_{O\_PUCCH}$ may be a parameter composed of the sum of a parameter $P_{O\_NOMINAL\_PUCCH}$ provided by higher layers and a parameter $P_{O\_UE\_PUCCH}$ provided by higher layers.

$\delta_{PUCCH}$ may be a wireless device specific correction value, also referred to as a TPC command, included in a PDCCH with a DCI format, such as an example DCI format 1A/1B/1D/1/2A/2/2B/2C/2D in FIG. 18 for the primary cell, or included in a MPDCCH, such as with an example DCI format 6-1A in FIG. 18, or included in an EPDCCH, such as with a DCI format such as an example DCI format 1A/1B/1D/1/2A/2/2B/2C/2D in FIG. 18 for the primary cell, or sent jointly coded with other wireless device specific PUCCH correction values on a PDCCH/MPDCCH, such as with an example DCI format 3/3A in FIG. 18, whose CRC parity bits may be scrambled with TPC-PUCCH-RNTI.

For a non-BL/CE wireless device, if the wireless device may be not configured for EPDCCH monitoring, the wireless device may attempt to decode a PDCCH of DCI format, such as an example DCI format 3/3A in FIG. 18, with the wireless device's TPC-PUCCH-RNTI and one or several PDCCHs of a DCI format, such as an example DCI format 1A/1B/1D/1/2A/2/2B/2C/2D in FIG. 18, with the wireless device's C-RNTI or SPS (OR CONFIGURED GRANT, GRANT-FREE TYPE1, AND/OR GRANT-FREE TYPE 2) C-RNTI on every subframe (TTI, slot, and/or mini-slot) except for example if in DRX.

A wireless device may be configured for EPDCCH monitoring, the wireless device may attempt to decode a PDCCH of a DCI format, such as an example DCI format 3/3A in FIG. 18, with the wireless device's TPC-PUCCH-RNTI and one or several PDCCHs of a DCI format, such as an example DCI format 1A/1B/1D/1/2A/2/2B/2C/2D in FIG. 18, with the wireless device's C-RNTI or SPS (OR CONFIGURED GRANT, GRANT-FREE TYPE1, AND/OR GRANT-FREE TYPE 2) C-RNTI, and one or several EPDCCHs of a DCI format, such as an example DCI format 1A/1B/1D/1/2A/2/2B/2C/2D in FIG. 18, with the wireless device's C-RNTI or SPS (OR CONFIGURED GRANT, GRANT-FREE TYPE1, AND/OR GRANT-FREE TYPE 2) C-RNTI.

For a BL/CE wireless device configured with CEModeA, the wireless device may attempt to decode a MPDCCH of a DCI format, such as an example DCI format 3/3A in FIG. 18, with the wireless device's TPC-PUCCH-RNTI and MPDCCH of a DCI format, such as an example DCI format 6-1A in FIG. 18, with the wireless device's C-RNTI or SPS (OR CONFIGURED GRANT, GRANT-FREE TYPE1, AND/OR GRANT-FREE TYPE 2) C-RNTI on every BL/CE downlink subframe (TTI, slot, and/or mini-slot) except for example if in DRX.

The wireless device may decode a PDCCH, such as with DCI format 1A/1B/1D/1/2A/2/2B/2C/2D, an EPDCCH, such as with DCI format 1A/1B/1D/1/2A/2/2B/2C/2D, and/or a MPDCCH, such as with DCI format 6-1A For the primary cell and the corresponding detected RNTI equals the C-RNTI or SPS (OR CONFIGURED GRANT, GRANT-FREE TYPE1, AND/OR GRANT-FREE TYPE 2) C-RNTI of the wireless device and the TPC field in the DCI format may be not used to determine the PUCCH resource, the wireless device may use the $\delta_{PUCCH}$ provided in that PDCCH/EPDCCH/MPDCCH. The wireless device may decode a PDCCH/MPDCCH with DCI format 3/3A, the wireless device may use the $\delta_{PUCCH}$ provided in that PDCCH/MPDCCH. The wireless device may set $\delta_{PUCCH}=0$ dB.

For a BL/CE wireless device configured with CEModeA, if the PUCCH may be transmitted in more than one subframe (TTI, slot, and/or mini-slot) i0, i1, . . . , iN−1 where i0<i1< . . . <iN−1, the PUCCH transmit power in subframe (TTI, slot, and/or mini-slot) ik, k=0, 1, . . . , N−1 may be determined by $P_{PUCCH,c}(i_k)=P_{PUCCH,c}(i_0)$ For a BL/CE wireless device configured with CEModeB, the PUCCH transmit power in subframe (TTI, slot, and/or mini-slot) ik may be determined by $P_{PUCCH,c}(i_k)=P_{CMAX,c}(i_0)$.

The setting of the wireless device Transmit power $P_{SRS}$ for the SRS transmitted on subframe (TTI, slot, and/or mini-slot) i for serving cell c may be defined by, for serving cell c with frame structure type 2, and not configured for PUSCH/PUCCH transmission, $$P_{SRS,c}(i) = \min \{P_{CMAX,c}(i), 10 \log_{10}(M_{SRS,c}) +$$

$$P_{O\_SRS,c}(m) + \alpha_{SRS,c} \cdot PL_c + f_{SRS,c}(i)\} \ [dBm]$$

or

-continued $$P_{SRS,c}(i) =$$

$$\min \{P_{CMAX,c}(i), P_{SRS\_OFFSET,c}(m) + 10 \log_{10}(M_{SRS,c}) + P_{O\_PUSCH,c}(j) +$$

$$\alpha_c(j) \cdot PL_c + f_c(i)\} \ [dBm].$$

For accumulation, $f_{SRS,c}(0)$ may be the first value after reset of accumulation. The wireless device may reset accumulation. For serving cell c, $P_{O\_UE\_SRS,c}$ value may be changed by higher layers. For serving cell c, the wireless device may receive a random access response message for serving cell c. For both types of $f_{SRS,c}(*)$ (accumulation or current absolute) the first value may be set as follows. $P_{O\_UE\_SRS,c}$ may be received by higher layers, the wireless device may set $f_{SRS,c}(0)=0$, and if the wireless device receives the random access response message for a serving cell c the wireless device may set $f_{SRS,c}(0)=\Delta P_{rampup,c}$, where $$\Delta P_{rampup,c} = \min \left[ \left\{ \max \begin{pmatrix} 0, \\ P_{CMAX,c} - (10 \log_{10}(M_{SRS,c}(0)) + P_{O\_SRS,c}(m) + \alpha_{SRS,c} \cdot PL_c) \end{pmatrix} \right\}, \right. \\ \left. \Delta P_{rampuprequested,c} \right]$$

$\Delta P_{rampuprequested,c}$ may be provided by higher layers and may correspond to the total power ramp-up requested by higher layers from the first to the last preamble in the serving cell c, $M_{SRS,c}(0)$ may be the bandwidth of the SRS transmission expressed in number of resource blocks valid for the subframe (TTI, slot, and/or mini-slot) of first SRS transmission in the serving cell c.

$P_{CMAX,c}(i)$ may be the configured wireless device transmit power in subframe (TTI, slot, and/or mini-slot) i for serving cell c. $P_{SRS\_OFFSET,c}(m)$ may be semi-statically configured by higher layers for m=0 and m=1 for serving cell c. For SRS transmission given trigger type 0 then the wireless device may set m=0 and for SRS transmission given trigger type 1 then the wireless device may set m=1. $M_{SRS,c}$ may be the bandwidth of the SRS transmission in subframe (TTI, slot, and/or mini-slot) i for serving cell c expressed in number of resource blocks. $f_c(i)$ may be the current PUSCH power control adjustment state for serving cell c. $P_{O\_PUSCH,c}(j)$ and $\alpha_c(i)$ may be parameters as pre-defined for subframe (TTI, slot, and/or mini-slot) i, where j=1. $\alpha_{SRS,c}$ may be the higher layer parameter, such as alpha-SRS, configured by higher layers for serving cell 1 c. $P_{O\_SRS,c}(m)$ may be a parameter comprising the sum of a component $P_{O\_NOMINAL\_SRS,c}(m)$ provided from higher layers for m=0 and 1 and a component $P_{O\_UE\_SRS,c}(m)$ provided by higher layers for m=0 and 1 for serving cell c. For SRS transmission given trigger type 0 then the wireless device may set m=0 and for SRS transmission given trigger type 1 then the wireless device may set m=1.

For serving cell c with frame structure type 2, and not configured for PUSCH/PUCCH transmission, the current SRS power control adjustment state may be given by $f_{SRS,c}(i)$ and may be defined by $f_{SRS,c}(i)=f_{SRS,c}(i-1)+\delta_{SRS,c}(i-K_{SRS})$ if accumulation may be enabled, and $f_{SRS,c}(i)=\delta_{SRS,c}(i-K_{SRS})$ if accumulation may be not enabled based on higher layer parameter, such as Accumulation-enabled, where $\delta_{SRS,c}(i-K_{SRS})$ may be a correction value, also referred to as a SRS TPC command signaled on PDCCH, such as with an example DCI format 3B in FIG. 18, in the most recent subframe (TTI, slot, and/or mini-slot) i-$K_{SRS}$, where $K_{SRS} \geq 4$.

The wireless device may not be expected to receive different SRS TPC command values for serving cell c in the same subframe (TTI, slot, and/or mini-slot). For serving cell c with frame structure type 2, and not configured for PUSCH/PUCCH transmission, the wireless device may attempt to decode a PDCCH of DCI format 3B with CRC scrambled by higher layer parameter, such as SRS-TPC-RNTI, in every subframe (TTI, slot, and/or mini-slot) except for example if in DRX or where serving cell C may be deactivated.

$\delta_{SRS,c}=0$ dB for a subframe (TTI, slot, and/or mini-slot) where no TPC command in PDCCH with DCI 3B may be decoded for serving cell c or where DRX may occur or i may be not an uplink/special subframe (TTI, slot, and/or mini-slot) in TDD or FDD-TDD and serving cell c frame structure type 2.

A higher layer parameter may indicate 2-bit TPC command, the $\delta_{SRS}$ dB values signaled on PDCCH with a DCI format, such as an example DCI format 3B in FIG. 18, may be given in a predefined table, for example as shown in FIG. 19B, by replacing $\delta_{PUSCH,c}$ with $\delta_{SRS}$, or if higher layer parameter indicates 1-bit TPC command $\delta_{SRS}$ dB signaled on PDCCH with a DCI format, such as an example DCI format 3B in FIG. 18, may be given in a predefined table, for example as shown in FIG. 19C, by replacing $\delta_{PUSCH,c}$ with $\delta_{SRS}$.

A wireless network may support the PUSCH transmit power control that may be given by:

$$P_{PUSCH,c}(i) =$$

$$\min \left\{ \begin{matrix} P_{CMAX,c}(i), \\ 10 \log_{10}(M_{PUSCH,c}(i)) + P_{0,c}(j) + \alpha_c(j) \cdot PL_c(k) + \Delta_{TF,c}(i) + f_c(i,l) \end{matrix} \right\}.$$

i may be a slot, a subframe, mini-slot, and/or TTI. For example, for the path loss measurement RS indication, k may be indicated by beam indication for PUSCH (if present).

A linkage between PUSCH beam indication and k which may be an index of downlink RS resource for PL measurement may be pre-configured via high layer signal. One value k may be RRC configured in a wireless device specific way if PUSCH beam indication is not present. A value of $P_{0,c}(j)$ may comprise one or more cell specific components and one or more wireless device specific components. At least three cell specific component values of $P_{0,c}(j)$ may be configured. $\alpha_c(j)$ may be 1 by default before wireless device specific configuration. j may be configured for at least one of the following aspects: grant-based PUSCH, grant-free PUSCH and PUSCH for msg 3, PUSCH beam indication (if present) for grant-based PUSCH, logical channel of PUSCH, slot sets (if supported), and/or for two uplinks of SUL band combination. If N=2 (number of closed loop process) is configured for wireless device, 1 may be configured for at least one of the following aspects: PUSCH beam indication (if present) for grant-based PUSCH, slot sets (if supported), grant-free PUSCH and grant based PUSCH, logical channel(s) carried by PUSCH, and/or for two uplinks of SUL band combination. $\Delta_{TF,c}(i)$ may take into account received SNR target difference between DFT-s-OFDM and CP-OFDM. $\Delta_{TF,c}(i)$ may not take into account received SNR target difference between DFT-s-OFDM and CP-OFDM. A wireless network may support closed power control commands by downlink DCI for PUCCH power control, by uplink grant for PUSCH power control, and/or by DCI for SRS. A wireless network may support closed power control commands by group common DCI with TPC-PUSCH-RNTI, TPC-PUCCH-RNTI, and/or TPC-SRS-RNTI. A wireless network may support 2 bits TPC command for accumulative power control and absolute power control. A wireless network may support an absolute TPC command mode. For N closed-loop power control processes, such as $f_c(i,l)$, for a wireless network PUCCH power control for serving cell c, N may be 0, 1, or 2. For closed loop power control process, $f_c(i,l)$ and/or $f_c(i)$, for example, if an accumulative TPC command mode may be reset by RRC reconfiguration of $P_{O\_PUSCH}$ and $\alpha_c(j)$.

A wireless network may support $P_{cmax,c}(i)$, $P_{0\_PUCCH}(F)$, $PL_c(k)$, $g(i)$ for a wireless network PUCCH power control in slot i for serving cell c. For example, the wireless network PUCCH power control may be given by $$P_{PUCCH}(i) = \min \left\{ \begin{array}{l} P_{CMAX,c}(i), \\ P_{O\_PUCCH} + PL_c(k) + 10 \log_{10}(M_{PUCCH,c}(i)) + \Delta_{F\_PUCCH}(F) + \Delta_{PUCCH\_TF,c}(i) + g(i) \end{array} \right\} [dBm]$$

where $P_{O\_PUCCH}$ may be able to be replaced by $P_{O\_PUCCH}(F)$, and $g(i)$ may be replaced by $g(i,l)$. F may be the index of PUCCH formats, such as F=0 for PUCCH format 0, F=1 for PUCCH format 1, F=2 for PUCCH format 2, F=3 for PUCCH format 3. $P_{O\_PUCCH}$ may be a parameter comprising the sum of a parameter $P_{O\_NOMINAL\_PUCCH}$ configured by higher layers and a wireless device-specific parameter $P_{O\_UE\_PUCCH}$ configured by higher layers. k may be the index of RS resource(s) for path loss measurement and may be RRC configured. One or more values of k may be configured by RRC signaling. For above 6 GHz, $P_{CMAX,c}(i)$ definition and notation may be different. $\alpha_c(j)$ may be 1, such as full path-loss compensation for a wireless network PUCCH power control. $10 \log_{10}(M_{PUCCH,c}(i))$ may not be applied to the PUCCH transmit power control. $P_{O\_PUCCH}$ may be revised to $P_{O\_PUCCH}(b)$, where one or more $P_{O\_PUCCH}(b)$ may be configured by RRC signaling. $g(i)$ may be revised to $g(i,l)$. A wireless network may support up to 2 closed-loop power control processes, i.e., l=2. The closed-loop control process may be configured by RRC signaling. Reset may be triggered by RRC re-configuration of P0 and/or triggered after or in response to beam changing. A wireless network may support $\Delta_{PUCCH\_TF,c}(i)$ to reflect at least UCI payload size, UCI type (such as SR, HARQ, CSI), different coding gains, PUCCH format, coding schemes and different effective coding rates. $\Delta_{PUCCH\_TF,c}(i)$ may comprise $M_{PUCCH,c}(i)$, which may be related to the PUCCH BW in slot i. $\Delta_{PUCCH\_TF,c}(i)$ may take into account received SNR target difference between DFT-s-OFDM and CP-OFDM. $\Delta_{PUCCH\_TF,c}(i)$ may not take into account received SNR target difference between DFT-s-OFDM and CP-OFDM.

The SRS transmit power may be given by $$P_{SRS,c}(i) = \min \left\{ \begin{array}{l} P_{CMAX,c}(i), \\ P_{SRS\_OFFSET,c}(m) + 10 \log_{10}(M_{SRS,c}(i)) + P_{0,c}(j) + \alpha_c(j) \cdot PL_c(k) + h_c(i,l) \end{array} \right\}$$

where i may be a slot number, j may be the index of open-loop parameter, m may be the index of power offset, and k may be the index of RS resource(s) for path loss measurement.

For power control for SRS transmission at least for CSI acquisition tied with PUSCH power control, a wireless network may support at least $P_{cmax,c}(i)$, $P_{SRS\_OFFSET,c}(m)$, $M_{SRS,c}(i)$, $P_{0,c}(j)$, $\alpha_c(j)$, $PL_c(k)$, $h_c(i,l)$ for power control of SRS resource set. For example, if SRS power control is tied with corresponding PUSCH power control, the wireless device may set $h_c(i,l)=f_c(i,l)$ and $P_{0,c}(j)$, $\alpha c(j)$, $PLc(k)$ may be shared with the corresponding PUSCH power control. $P_{SRS\_OFFSET,c}(m)$ may be RRC configured and may be configured separately for SRS for CSI acquisition and beam management (or may not be configured separately for SRS for CSI acquisition and beam management). $M_{SRS,c}(i)$ may be related to the SRS transmission BW. The value of $M_{SRS,c}(i)$ may be kept unchanged in the same slot. 1 may be the index of close-loop power control process. SRS transmission power within the slot(s) of the SRS resource set may be the same. $P_{cmax,c}(i)$ definition and notation between different frequency bands, such as between below 6 GHz vs. above 6 GHz. The linkage between {j,m,k,l} of SRS and {j,k,l} of PUSCH may be predefined in a specification.

The SRS transmit power may be given by $$P_{SRS,c}(i) = \min\{P_{CMAX,c}(i), P_{0\_SRS,c} + 10 \log_{10}(M_{SRS,c}) + \alpha_{SRS,c} \cdot PL_c(k1) + h_{SRS,c}(i)\}.$$

$$P_{SRS,c}(i) = \min\{P_{CMAX,c}(i), P_{0\_SRS,c} + 10 \log_{10}(M_{SRS,c}) + \alpha_{SRS,c} \cdot PL_c(k1) + h_{SRS,c}(i)\}$$

A unified power control equation may be defined regardless of whether SRS is intended for DL/UL CSI acquisition or beam management as shown above. $P_{SRS,c}(i)$ may further comprise $P_{SRS\_OFFSET,c}$. For example, $h_{SRS,c}(i)$ may be defined per transmit power control process, such as $h_{SRS,c}(i)=h_{SRS,c}(i,l)$ where l may indicate a transmit power control process l. A wireless network may support up to two closed-loop power control processes, such as l=2. The closed-loop control process may be configured by RRC signaling. For example, if SRS power control is tied with corresponding PUSCH power control, the wireless device may set $h_{SRS,c}(i)=f_c(i,l)$.

SRS power control may be tied with corresponding PUSCH power control and may be based on RRC signaling and the following may be down selected: explicit configuration and implicit configuration by base station implementation. A base station may configure the same values for some parameters between PUSCH power control and SRS power control or the same association rule among $P_{0\_SRS,c}$, $\alpha_{SRS,c}$, PL reference and closed-loop may be used for PUSCH and SRS power control. RRC configuration may not be needed for signaling the direct linkage between PUSCH and SRS power control. At least one of the following may be configured by RRC: $P_{SRS\_OFFSET,c}$, $P_{0\_SRS}$, $\alpha_{SRS,c}$, and/or k1 which may indicate DL reference RS(s) for PL estimation (the configuration of 'k1' may be optional). $P_{O\_SRS,c}$, $\alpha_{SRS,c}$, k1, $h_{SRS,c}$, $P_{SRS\_OFFSET,c}$ may be configured for each configured SRS resource in the SRS resource set or only per SRS resource set (if $P_{SRS\_OFFSET,c}$ is supported). Configurations may support an option for common values for at least $P_{O\_SRS,c}$, k1, $\alpha_{SRS,c}$, $P_{SRS\_OFFSET,c}$ to be applied for all the configured SRS resource(s) in the SRS resource set (if $P_{SRS\_OFFSET,c}$ is supported). The same parameters may be configured for multiple SRS resource sets by base station configuration. For $h_{SRS,c}(i)$, at least one of the following may be configured by RRC for serving cell c on which the wireless device is configured with PUSCH: $h_{SRS,c}(i)=f_c(i, 1)$ where l=1, 2, $h_{SRS,c}(i)=0$, and/or $h_{SRS,c}(i)$, for example, if SRS power control is not tied with PUSCH power control. Both accumulative TPC and absolute TPC may be supported for SRS power control. For example, one of accumulative TPC and absolute TPC may be supported for SRS power control. For serving cell c on which the wireless device is not configured with PUSCH, closed-loop power control process for SRS may be separately configured and may not be linked to closed-loop power control process for PUSCH of other serving cell(s) on which the wireless device is configured with PUSCH. For PL estimation, an SRS resource set may be associated with $X_1$ DL reference signal(s) for PL estimation, wherein $X_1$ may be more than 1. A maximum number of PL estimates to be maintained by wireless device may be limited to $X_2$. PL estimation associated with k1 may be kept unchanged per the configured SRS resource set. A wireless device may expect the base station to configure the same type of time-domain behavior (i.e., periodic, semi-persistent, or aperiodic) for all SRS resources in a SRS resource set. A definition of $M_{SRS,c}(j)$ may be different depending on, for example, a subcarrier spacing (SCS). M PRBs may be allocated for both 15 kHz SCS and 120 kHz SCS. $M_{SRS,c}(j)$ may be expressed in the number of PRBs based on 15 kHz regardless of number of PRBs allocated for SRS transmission. 15 kHz SCS, $M_{SRS,c}(j)=M$ and for 120 kHz SCS, $M_{SRS,c}(j)=8M$. For example, $M_{SRS,c}(j)$ may be expressed in terms of the number of PRBs allocated for SCS transmission. For 15 kHz SCS, $M_{SRS,c}(j)=M$ and for 120 kHz SCS, $M_{SRS,c}(j)=M$. For example, $M_{SRS,c}(j)$ may be expressed in the number of PRBs based on 15 kHz SCS for sub-6 GHz and based on 60 kHz SCS for above 6 GHz. For example, for 15 kHz SCS, $M_{SRS,c}(j)=M$ and for 120 kHz SCS, $M_{SRS,c}(j)=2M$.

For PL estimation, a wireless network may support at least higher layer filtered RSRP based on configured CSI-RS and/or SS block. A wireless network may support at least beam-specific RSRP measurement.

A closed loop control parameter (CL-CP) (or may be called as an accumulation) of power control (PC) may be adjusted by signaling from the base station using one or more DCIs comprising at least one transmission power control (TPC) command. The CL-CP may be used to compensate path loss estimation error and/or intra-cell/inter-cell interference in the uplink PC and may be associated with at least one of $f_c(i)$, $g(i)$, $f_{SRS,c}(i)$, $f_c(i,l)$, $g(i,l)$, $h(i,l)$, and/or $h_{SRS,c}(i,l)$ of uplink power control for PUSCH, PUCCH, and/or SRS transmission.

A wireless network may support variable TTI length, such as a slot or variable number of symbols which may have same numerology or different numerologies. For example, a wireless network may support a dynamic TDD slot structure including a.k.a. a self-contained slot structure. In an example, the CL-CP (or accumulation) may comprise one or more parameters affected by a change of TTI, e.g., $K_{PUSCH}$.

The one or more parameters may be signaled by base station depending on the slot, subframe, and/or mini-slot structure that the base station may intend to operate or may be implicitly derived based on the timing of an associated transmission from the wireless device (such as PUSCH/SRS for TPC commands in UL DCI, PUCCH for TPC commands in DL DCI). The one or more parameters, such as $K_{PUSCH}$, for group-common power control, such as LTE DCI format 3/3A, may be supported for periodic/SPS transmissions (such as for CSI, SR, SRS).

A base station may configure a wireless device with at least one CL-CP of PC. The wireless device may receive from a base station one or more RRC messages indicating if the at least one CL-CP is in an accumulated mode or an absolute mode. The at least one CL-CP may be at least beam-specific, numerology-specific, panel-specific, TRP-specific, BWP-specific and/or a combination thereof.

A wireless device may reset the CL-CP if an UL channel condition, such as propagation loss and/or interference level (intra-cell and/or inter-cell) is changed. The UL channel condition may be changed after or in response to a change of beam (or beam pair link (BPL)), panel, TRP, BWP, numerology, and/or a combination thereof. Resetting the CL-CP frequently may cause a transmit power level convergence problem that may result in unstable transmit power level, unnecessary power consumption. As a result, an additional overhead may be inevitable to adjust the power level, and/or may require HW components supporting a larger dynamic range. If a wireless device resets the CL-CP improperly after or in response to changing the channel condition, a wireless device may have DL/UL (coverage) mismatch problem that may result in transmitting a retransmission request frequently, which may cause a latency problem.

If a wireless device resets a CL-CP, the value of CL-CP may start from (or set to) an initial value. The initial value may be 0. The initial value may be predefined. The initial value may be semi-statistically configured by a base station using an RRC message. The initial value may be dynamically configured by a base station using a MAC-CE and/or L1 signaling (such as DCI). The initial value may be configured/updated/changed by a combination of RRC message, MAC-CE, and/or DCI. For example, a base station may transmit, to a wireless device, an RRC message to indicate at least one initial value with an index that may be used in the CL-CP resetting. A base station may transmit, to a wireless device, MAC-CE or DCI to indicate one of the at least one initial value.

A wireless network may support a wideband operation, one or more numerologies, one or more beams (BPLs), one or more panels, and/or one or more TRPs to guarantee different service with different QoS requirements. The closed-loop power control may be critical to satisfy the different service requirements, and CL-CP may be required to be reset properly in time, by taking into account the change of the channel conditions.

A base station may configure at least one power control process. The at least one power control process may be associated with one or more wireless device beams and/or BPLs. In the UL power control, a CL-CP of the power control process may reflect the power change needed according to the channel environmental change. Whether to reset the CL-CP or not may depend at least on a beam (or BPL) change, such as per beam-specific. In a wireless network, beam specific path loss may be supported. The wireless device transmit power may change according to the estimated PL, which may comprise one or more beam forming gains. The wireless device may change the transmit power based on or in response to the different beam direction for example if the DL transmit beams or UL receive beams changes. The wireless device may reset the CL-CP based on in response to the different beam direction. The wireless device may not switch a power control process if the beam is switched if the estimated path loss compensates the propagation loss. Within a power control process, an impact of beam (BPL) changes on a DL/UL transmission may be marginal. Within the same power control process, the CL-CP may be inherited from an old beam (or an old BPL) to a new beam (or a new BPL). Among different power control processes, the wireless device may reset CL-CP after or in response to a beam (or BPL) switching across the power control processes.

The at least one power control process may be associated with one or more numerologies. The CL-CP may be reset based on at least on a change of numerology. Different numerologies may be assigned to different frequencies (e.g., different BWPs), which may have different levels of propagation loss and/or interference that may be affected by UL/DL transmission of intra-cell and/or inter-cell. The numerology change may result in changing a path loss and/or interference level. A wireless device may reset the CL-CP after or in response to changing a numerology from one to another. Within a power control process associated with one or more numerologies, an impact of numerology change on a DL/UL transmission may be marginal. Within the same power control process, the CL-CP may be inherited from an old numerology to a new numerology. The CL-CP may be reset if the numerology change occurs across different power control processes.

The at least one power control process may be associated with one or more TRP (transmission and reception point). A TRP may be associated with one or more beams (or BPLs). For example, a TRP may be associated with one or more numerologies. The CL-CP may be reset based on at least on a change of TRP. The CL-PC may be reused or work as a starting point for the next beam. The estimated path loss and interference levels of the one or more beams (or BPLs) associated with the same TRP may be similar, and the CL-CP between the one or more beams (or BPLs) within the same TRP may be reused. If a TRP change occurs, the CL-CP may be reset since the channel characteristics between different TRPs may be different.

There may be a tradeoff in resetting a CL-CP. If the CL-CP is reset frequently, transmission power may be unstable (such as transmission power may not converge) and/or UL/DL path loss mismatch may not be resolved. A beam (or BPL) switching performed via L1 signaling may occur frequently. If a wireless device resets the CL-CP after or in response to a beam (or BPL) switching, the wireless device may take long time to reflect a sudden change of path loss and/or interference level into the UL transmit power in time, which may result in DL/UL path loss mismatch. If the CL-CP is not reset frequently, the CL-CP may not reflect a change of level of propagation loss and/or interference into a transmit power, such as a TPC command accumulation mismatch between base station and wireless device may not be fixed and/or it may take long for the transmission power to be stable. A numerology and/or a TRP may be associated with one or more beams (or BPLs). If a CL-CP is reset after or in response to changing the numerology, a change of channel status (such as due to a beam (or BPL) switching and/or TRP switching) may not be reflected into the UL power control. A TRP may support one or more numerologies. The one or more numerologies may be defined in different frequencies, which may have different channel characteristics in terms of path loss and/or interference level. Resetting a CL-CP after or in response to changing a TRP may not reflect a change of channel status due to a change of numerology into an UL transmit power.

A wireless device may be configured with one or more bandwidth parts. The configured one or more BWPs may be associated with the same or different numerologies. A default BWP may be configured via an RRC message. An initial active BWP may be configured via an RRC message. The initial active BWP may be a default BWP. A single active BWP may be allowed to be activated in a TTI (such as subframe, slot, and/or mini-slot).

Figure 15:
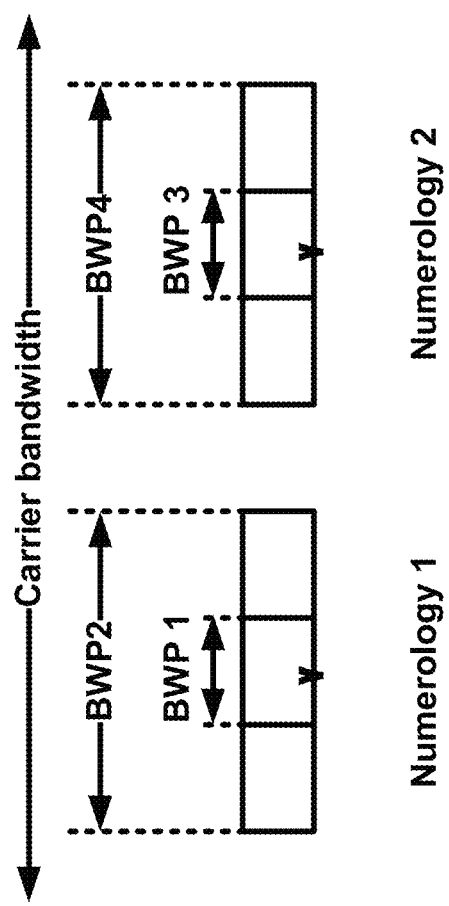
FIG. 15 shows example bandwidth part configurations.

BWP switching may cause a change of level of propagation loss and/or interference. As shown FIG. 15, a base station may configure a wireless device with one or more BWPs that may or may not be overlapped in part. As shown in FIG. 15, BWP1 and BWP2 are overlapped, and BWP1 and BWP3 (or 4) are not overlapped in frequency. A different type of BWP switching may require a separate UL power control parameter setting. Different BWPs that have non-overlapping or small overlapping frequency ranges may experience different interference situations (such as intra-cell and inter-cell) and/or have different path loss.

A base station may transmit a DCI to the wireless device to indicate BWP switching of an active BWP from one to another. A wireless device may reset a CL-CP if an active BWP is switched. It may not efficient if the wireless device resets a CL-CP after or in response to active BWP switching. One or more BWPs may have the similar propagation loss and/or interference. For BWP switching between the one or more BWPs, the wireless device may not need to reset the CL-CP, which may be beneficial to shorten a convergence speed of the UL transmit power. As shown in FIG. 15, the wireless device may not reset the CL-CP after or in response to BWP switching between BWP1 and BWP2 and/or between BWP3 and BWP4.

A base station may transmit a DCI to switch an active BWP from a first BWP to a second BWP. There may be one or more types of BWP switching. The one or more types of BWP switching may comprise a BWP adaptation and BWP jumping. The BWP adaptation and the BWP jumping may be referred to as different names. The BWP adaptation may occur if a frequency range of the first BWP is overlapped with a frequency range of the second BWP in part at least more than a first value. The first value may be predefined. A base station may inform of the first value to the wireless device via an RRC message. The BWP adaptation may occur if the first BWP and the second BWP have the same center frequency. The BWP adaptation may occur if a common search space (CSS) of the first BWP is overlapped with a CSS of the second BWP in part at least more than a second value. The second value may be predefined. A base station may inform of the second value to the wireless device via an RRC message. A base station may transmit one or more RRC messages indicating one or more groups of BWPs. The BWP adaptation may occur if the BWP switching occurs between BWPs within the same group. The grouping may be based at least on frequencies associated with the BWPs, which may implicitly group the BWPs based on the different channel conditions. As shown in FIG. 15, a BWP switching between BWP1 and BWP2 or between BWP3 and BWP4 may be the BWP adaptation. The BWP adaptation may occur after or in response to an active DL BWP switching. The BWP adaptation may occur after or in response to a default DL BWP switching. The BWP adaptation may occur after or in response to an active UL BWP switching. The BWP adaptation may occur after or in response to a default UL BWP switching. The BWP adaptation may occur after or in response to a pair of DL/UL BWPs switching, such as an active DL/UL BWP pair and/or a default DL/UL BWP pair.

BWP jumping may occur if a frequency range of the first BWP is overlapped with a frequency range of the second BWP in part smaller than a third value. The third value may be predefined. A base station may inform of the third value to the wireless device via an RRC message. The first and third value may be the same. The BWP jumping may occur if the first BWP and the second BWP have different center frequencies. The BWP jumping may occur if a common search space (CSS) of the first BWP is overlapped with a CSS of the second BWP in part smaller than a fourth value. The fourth value may be predefined. A base station may inform of the fourth value to the wireless device via an RRC message. The second vale and the fourth value may be the same. A base station may transmit one or more RRC messages indicating one or more groups of BWPs. The grouping may be based at least on frequencies associated with the BWPs, which may implicitly group the BWPs based on the different channel conditions. The BWP jumping may occur if the BWP switching occurs between BWPs across the different groups. As shown in FIG. 15, a BWP switching between BWP1 and BWP3 or between BWP1 and BWP4 may be the BWP jumping. The BWP jumping may occur after or in response to an active DL BWP switching. The BWP jumping may occur after or in response to a default DL BWP switching. The BWP jumping may occur after or in response to an active UL BWP switching. The BWP jumping may occur after or in response to a default UL BWP switching. The BWP jumping may occur after or in response to a pair of DL/UL BWPs switching, such as an active DL/UL BWP pair and/or a default DL/UL BWP pair.

A power control process may be associated with one or more BWPs. A BWP switching within the same power control process may be the BWP adaption. A BWP switching across different power control processes may be the BWP jumping. A wireless device may reset a CL-CP in response at least to a type of BWP switching. The type of BWP switching may be a BWP adaption or a BWP jumping.

A BWP switching within a BWP adaption may be associated with the same numerology. The BWP switching within a BWP adaption may be associated with one or more beams (or BPLs) having similar channel statistics, such as in terms of propagation loss and/or interference level. The wireless device may not reset the CL-CP after or in response to the BWP switching within the BWP adaptation. If the estimated PL and/or interference level may be similar between two BWPs within the BWP adaptation, it may be beneficial for the wireless device to shorten the convergence speed of the closed loop transmit power if the CL-CP is not reset or is reused. If the wireless device reset the CL-CP for the BWP adaptation, it may cause an overhead to transmit one or more TPC commands to adjust an UL transmit power from an initial value.

A BWP switching with a BWP jumping may be associated with different numerologies and/or different beams (or BPLs). A BWP may be associated with a numerology. Different numerologies may be defined in different frequencies. A first BWP may be defined below 6 GHz to support a first numerology, and a second BWP may be associated with millimeter wave (such as defined above 6 GHz) to support a second numerology. Since the propagation loss and interference level may depend on a frequency, the first BWP and the second BWP may have different channel statistics. A CL-CP, that has been adjusted in the first BWP may not be applied to the second BWP (or vice versa) due to the different channel statistics between the first and the second BWPs. A wireless device may reset a CL-CP if a type of BWP switching is a BWP jumping.

A wireless device may reset a CL-CP after or in response to TRP switching. A TRP may support one or more numerologies which may assigned in different frequencies. If the wireless device reset the CL-CP after or in response to TRP switching, the wireless device may not reset the CL-CP after or in response to a numerology change, which may cause a channel statistics change. A TRP may support one numerology in a wideband that may have different channel statistics across the frequency. A wireless device may be configured with one or more BWPs within the wideband supported by the TRP. The one or more BWPs may have different channel statistics. If the wireless device reset the CL-CP after or in response to TRP switching, the wireless device may not reset the CL-CP after or in response to a BWP change, which may cause a channel statistics change, within the wideband of the TRP.

Figure 16:
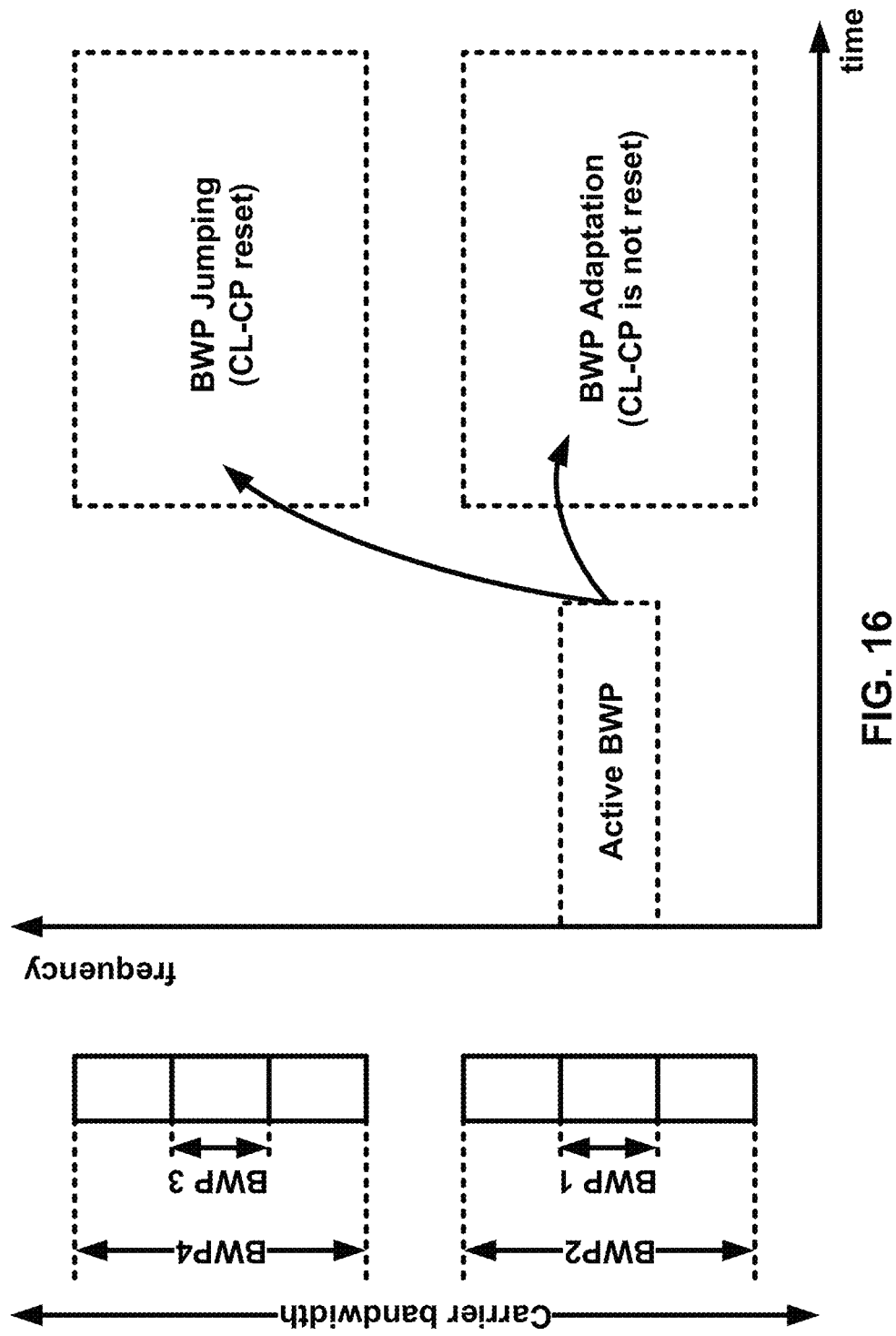
FIG. 16 shows an example for resetting a closed loop control parameter.

FIG. 16 shows an example of BWP switching associated with a BWP adaption and a BWP jumping. A base station may transmit, to a wireless device, a DCI for BWP switching, for example, if BWP1 is an active BWP. Depending on the type of BWP switching, the wireless device may or may not reset the CL-CP used in BWP1. If the DCI indicates BWP switching to BWP2, such as wider band with overlapping on a same numerology, the wireless device may take over (e.g. inherit/reuse) the CL-CP in a new BWP. For example, if the DCI indicates BWP switching to BWP3 or BWP4, such as different numerologies and/or frequency having different channel characteristics, the wireless device may reset the CL-CP in a new BWP.

A CL-CP reset, for example, after or in response to BWP switching, may be applied to a default BWP switching. The default BWP may be reconfigured and/or switched via a RRC message, MAC-CE, and/or a DCI. A wireless device may or may not reset the CL-CP depending on if a type of default BWP switching is the BWP adaptation or the BWP jumping. If the default BWP switching is the BWP jumping, the wireless device may reset the CL-CP. If the default BWP switching is the BWP adaption, the wireless device may not reset the CL-CP. For BWP adaption of the default BWP switching, resetting the CL-CP may be independent of an active BWP switching. For BWP adaption of the default BWP switching, a wireless device may reset the CL-CP based on or in response to changing a numerology, a TRP, and/or a beam (BPL).

Figure 17:
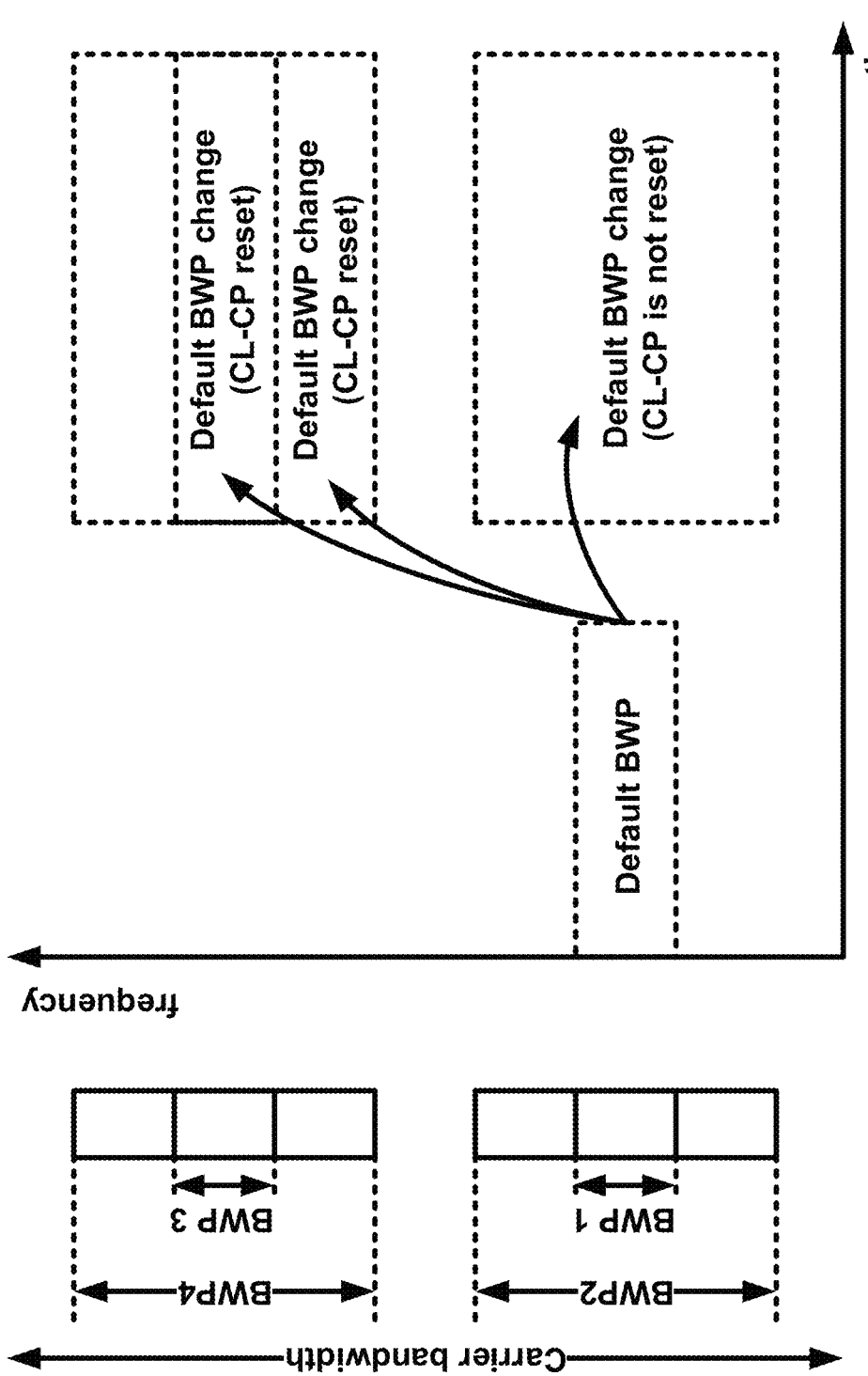
FIG. 17 shows example diagrams illustrating resetting a closed loop control parameter.

FIG. 17 shows an example of default BWP switching associated with a BWP adaption and a BWP jumping. A base station may transmit to a wireless device a DCI for the default BWP switching for example if a BWP1 is a default BWP. Depending on the type of BWP switching, the wireless device may or may not reset the CL-CP used in BWP1. If the DCI indicates a default BWP switching to BWP2, such as a wider band with overlapping on a same numerology, the wireless device may take over (inherit/reuse) the CL-CP in a new default BWP. If the DCI indicates a default BWP switching to BWP3 or BWP4, such as different numerologies and/or frequency having different channel characteristics, the wireless device may reset the CL-CP in a new default BWP.

A base station may configure the wireless device to reset the CL-CP to an initial value (such as 0) or the base station may explicitly transmit an indicator via a DCI, MAC-CE, and/or RRC message to a wireless device to reset the CL-CP to an initial value, such as the initial value may be 0. The base station may transmit an explicit reset command for example if a base station detects a DL/UL mismatch.

A wireless device may receive a downlink control information (DCI) indicating a bandwidth part (BWP) switching of an active BWP from a first BWP to a second BWP for the cell. The wireless device may determine a first transmission power for transmission of at least one uplink information/signal/transport block (TB) via the second BWP. The first transmission power comprises at least one closed loop power control parameter that may be reset depending at least on whether the BWP switching is a BWP adaptation. The wireless device may transmit, to the base station, the uplink signal based on the first transmission power. The at least one closed loop power control parameter may be inherited from the first BWP to the second BWP if the BWP switching is the BWP adaption, otherwise may be reset. The BWP adaption may occur if a first bandwidth of the first BWP and a second bandwidth of the second BWP are overlapped larger than a first value. The BWP adaption may occur if a first common search space (CSS) of the first BWP and a second CSS of the second BWP are the same. The BWP adaption may occur if a first center frequency of the first BWP and a second center frequency of the second BWP are the same. The BWP adaption may occur if a first numerology associated with the first BWP is the same to a second numerology associated with second BWP. The first transmission power may be for a PUSCH, PUCCH or SRS transmission. The BWP switching may be for a PUSCH, PUCCH or SRS transmission. The BWP switching may be for a PDSCH or PDCCH transmission.

A wireless device may receive, from a base station, at least one RRC message comprising one or more parameters indicating at least one of following: one or more bandwidth parts (BWPs) for a cell, a first indicator indicating one of the one or more BWPs for the cell as a default BWP, or an indicator indicating whether an accumulation is enabled. The wireless device may receive a downlink control information (DCI) or RRC message indicating a bandwidth part (BWP) switching of a default BWP from a first BWP to a second BWP for the cell. The wireless device may determine a first transmission power for transmission of at least one uplink information/signal/transport block (TB) via the second BWP. The first transmission power comprises at least one closed loop power control parameter may be reset depending at least on whether the BWP switching is a BWP adaptation. The wireless device may transmit, to the base station, the uplink signal based on the first transmission power. The at least one closed loop power control parameter may be inherited from the first BWP to the second BWP if the BWP switching is the BWP adaption, otherwise may be reset. The BWP adaption may occur if a first bandwidth of the first BWP and a second bandwidth of the second BWP are overlapped larger than a first value. The BWP adaption may occur if a first common search space (CSS) of the first BWP is same to a second CSS of the second BWP are the same. The BWP adaption may occur if a first center frequency of the first BWP is same to a second center frequency of the second BWP are the same. The BWP adaption may occur if a first numerology associated with the first BWP is the same to a second numerology associated with second BWP. The first transmission power may be for a PUSCH, PUCCH or SRS transmission. The BWP switching may be for a PUSCH, PUCCH or SRS transmission. The BWP switching may be for a PDSCH or PDCCH transmission. The at least one RRC message may further comprise a second indicator indicating one of the one or more BWPs for the cell as an initial active BWP. The initial active BWP may be the default BWP if the first indicator is absent in the at least one RRC message.

Figure 21:
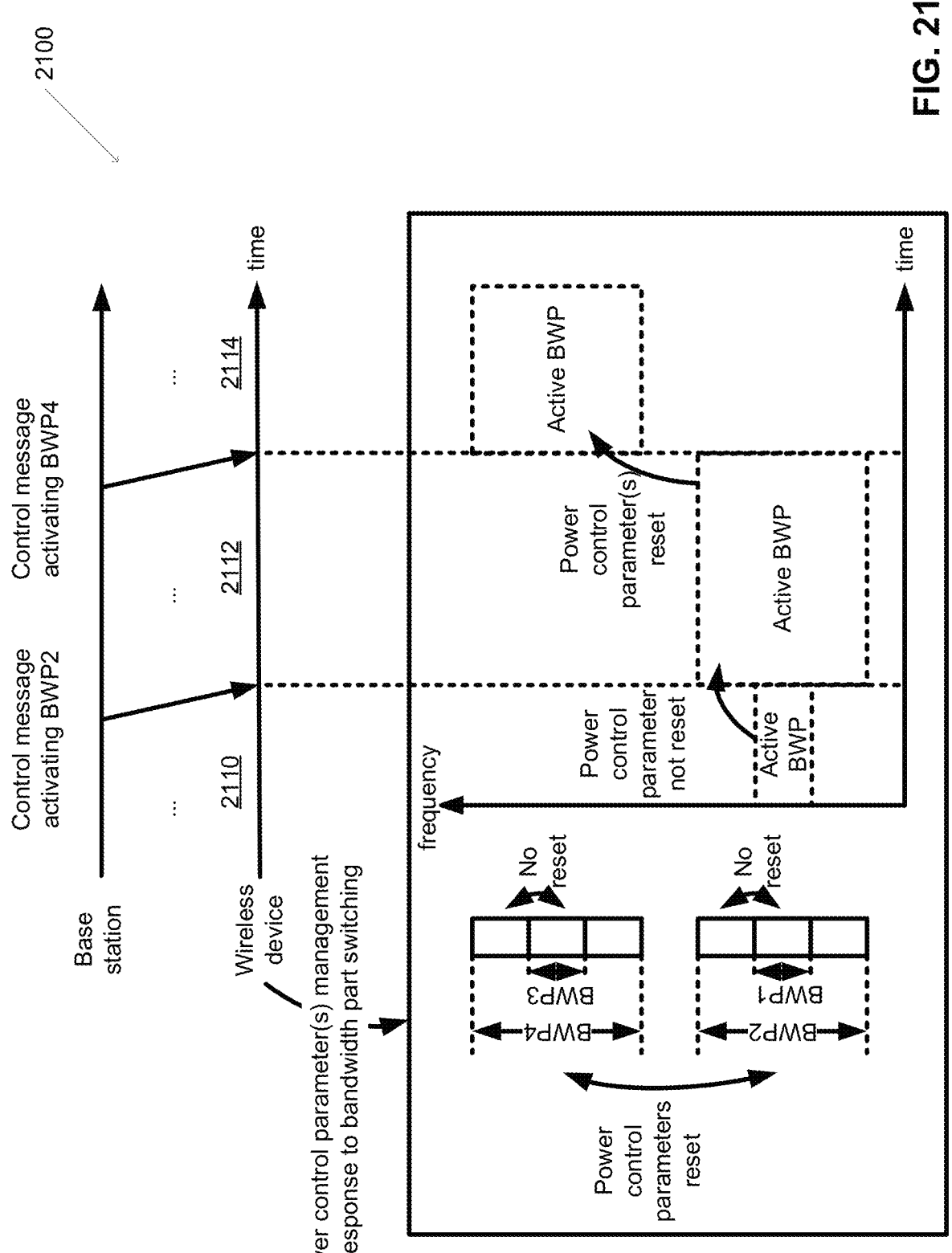
FIG. 21 shows examples for activating bandwidth parts.

FIG. 21 shows an example of a wireless device switching from an active BWP to a second BWP. In example 2100, power control parameters may not be reset, for example, if an active BWP is switched between BWP1 and BWP 2 and switched between BWP3 and BWP4. Power control parameters may be reset, for example, if an active BWP is switched between a first BWP and a second BWP, wherein the first BWP may be BWP1 or BWP2, and the second BWP may be BWP3 or BWP4. A determination whether to reset power control parameters, for example, if BWP switching occurs, may depend on whether a new active BWP is configured with a different numerology from a current numerology configured on a current active BWP, whether a new active BWP is overlapped with a current active BWP at least in part in frequency domain, and/or whether a new active BWP is configured with a different center frequency from one configured on a current active BWP. At time 2110, a wireless device is configured with BWP1 as an active BWP. A base station may transmit a control message activating BWP2 to the wireless device and, at time 2112, the wireless device may be configured with BWP2 as an active BWP based on the control message. The wireless device may not reset its power control parameters, for example, if switching an active BWP from BWP1 to BWP2. The base station may transmit a control message activating BWP4 to the wireless device and, at time 2114, the wireless device may be associated with BWP4. The wireless device may reset its power control parameters, for example, based on or in response to BWP switching from BWP2 and BWP4.

Figure 22:
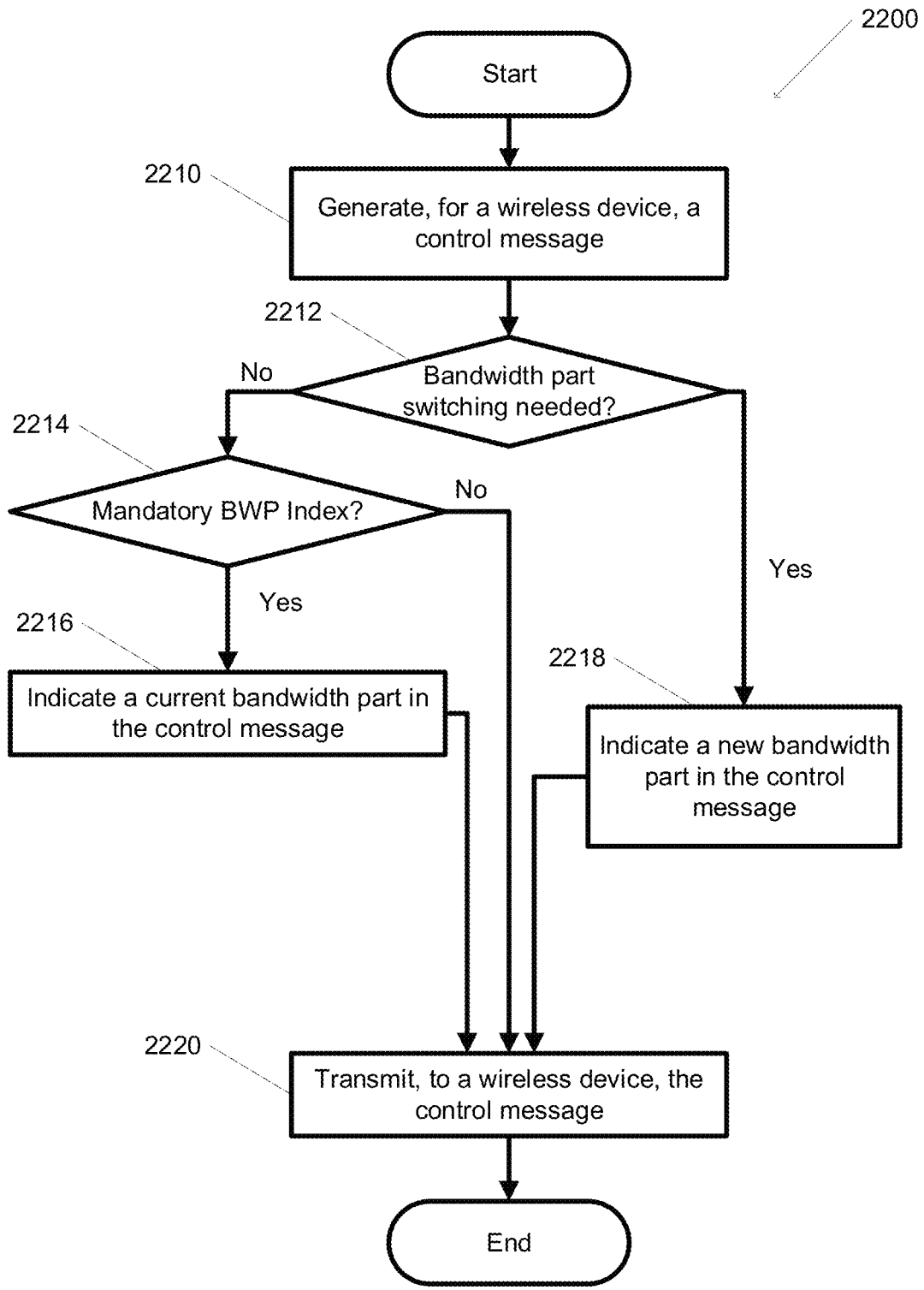
FIG. 22 shows an example for generating control messages.

FIG. 22 shows an example for generating control messages. Example 2200 includes generating (2210), for a wireless device, a control message. If bandwidth part switching is needed (2212), a new bandwidth part may be indicated (2218) in the control message. If bandwidth part switching is not needed (2212) and if a bandwidth part index field is mandatory (2214) in the control message, a current bandwidth part can be indicated (2216) in the control message. If bandwidth part switching is not needed (2212) and if a bandwidth part index field is not mandatory (2214) in the control message, a current bandwidth part need not be indicated in the control message. The control message may be transmitted (2220) to the wireless device.

Figure 23:
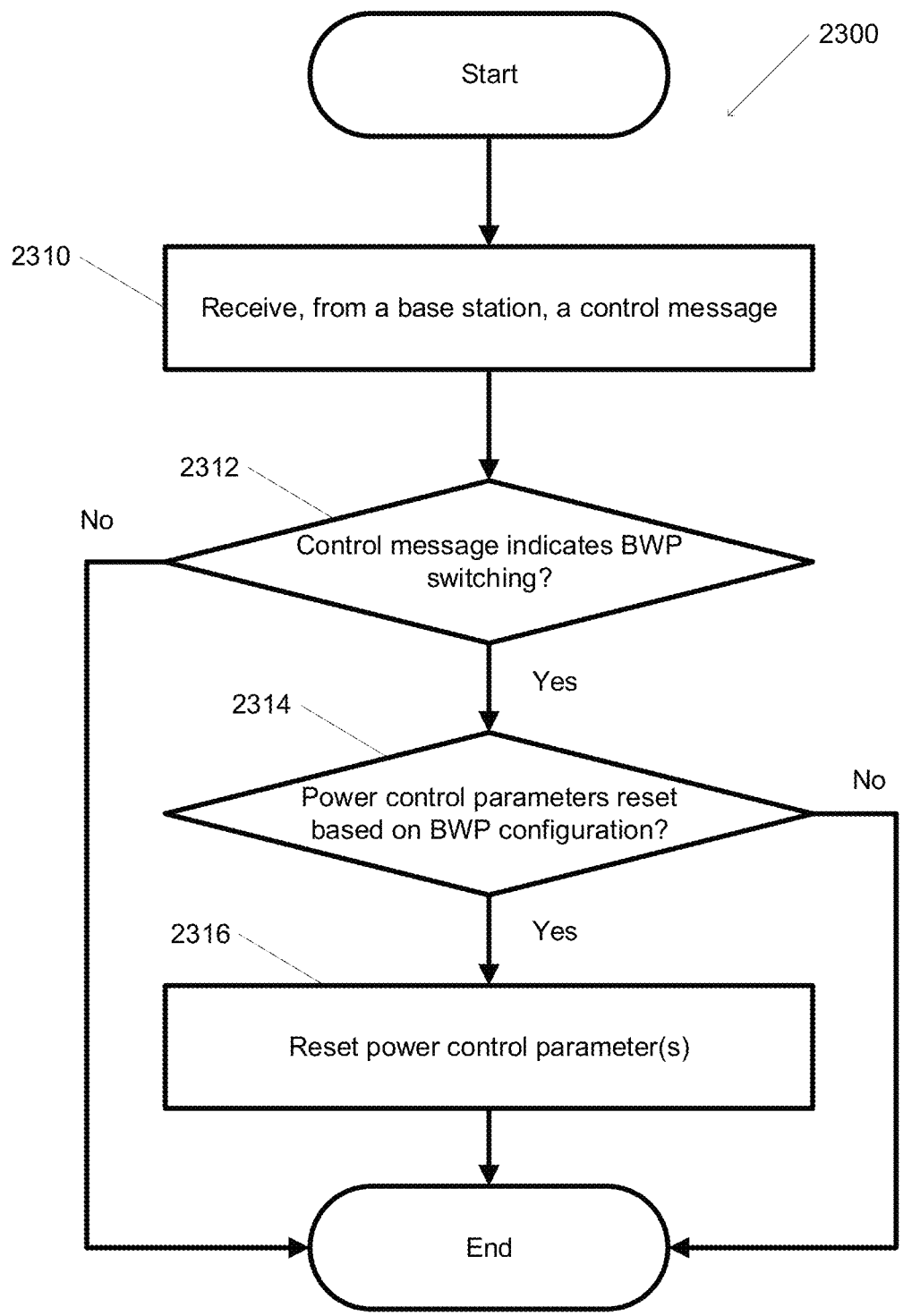
FIG. 23 shows an example for bandwidth part switching.

FIG. 23 shows an example for bandwidth part switching. Example 2300 includes receiving (2310), from a base station, a control message. If the control message indicates (2312) bandwidth part switching, it may be determined if power control parameters may be reset (2314). The determination may be by a wireless device and based on the bandwidth part configuration. If the power control parameters need to be reset (2314), the power control parameters may be reset (2316). The power control parameters may be reset by the wireless device.

Example 1. A method comprising: receiving, by a wireless device from a base station, one or more radio resource control (RRC) messages comprising: one or more parameters associated with one or more bandwidth parts (BWPs) for a cell; and an indication of whether an accumulation is enabled; receiving downlink control information (DCI) indicating a BWP switching of an active BWP from a first BWP to a second BWP for the cell; determining a first transmission power for a transmission, via a resource of the second BWP, of at least one uplink transport block, wherein the first transmission power comprises at least one closed loop power control parameter that is reset based on the BWP switching being a BWP adaptation; and transmitting, via the resource of the second BWP and based on the first transmission power, the at least one uplink transport block.

Example 2. The method of example 1, wherein the at least one close loop power control parameter is applied from the first BWP to the second BWP.

Example 3. The method of example 1, wherein the BWP adaption comprises a first bandwidth of the first BWP overlapping with a second bandwidth of the second.

Example 4. The method of example 1, wherein the BWP adaption occurs at least if a first common search space (CSS) of the first BWP and a second CSS of the second BWP are the same.

Example 5. The method of example 1, wherein the BWP adaption occurs at least if a first center frequency of the first BWP and a second center frequency of the second BWP are the same.

Example 6. The method of example 1, wherein the BWP adaption occurs at least if a first numerology associated with the first BWP is the same to a second numerology associated with second BWP.

Example 7. The method of example 1, wherein the first transmission power is for a physical uplink shared channel (PUSCH), physical uplink control channel (PUCCH), or sounding reference signal (SRS) transmission.

Example 8. The method of example 1, wherein the DCI comprises an uplink grant for the transmission of the at least one uplink transport block.

Example 9. The method of example 1, wherein the DCI comprises a downlink assignment.

Example 10. A method comprising: receiving, by a wireless device from a base station, one or more radio resource control (RRC) messages comprising: one or more parameters associated with one or more bandwidth parts (BWPs) for a cell; a first indicator indicating one of the one or more BWPs for the cell as a default BWP; and a second indicator indicating whether an accumulation is enabled; receiving a control message indicating a BWP switching of a default BWP from a first BWP to a second BWP for the cell; determining a first transmission power for a transmission, via a resource of the second BWP, of at least one uplink transport block, wherein the first transmission power comprises at least one closed loop power control parameter that is reset based on whether the BWP switching is a BWP adaptation; and transmitting, via the resource of the second BWP and based on the first transmission power, the at least one uplink transport block.

Example 11. The method of example 10, wherein the at least one closed loop power control parameter is applied from the first BWP to the second BWP.

Example 12. The method of example 10, wherein the BWP adaption comprises a first bandwidth of the first BWP overlapping with a second bandwidth of the second BWP.

Example 13. The method of example 10, wherein the BWP adaption occurs at least if a first common search space (CSS) of the first BWP is the same as a second CSS of the second BWP.

Example 14. The method of example 10, wherein the BWP adaption occurs at least if a first center frequency of the first BWP is the same as a second center frequency of the second BWP.

Example 15. The method of example 10, wherein the BWP adaption occurs at least if a first numerology associated with the first BWP is the same to a second numerology associated with the second BWP.

Example 16. The method of example 10, wherein the first transmission power is for a physical uplink shared channel (PUSCH), physical uplink control channel (PUCCH), or sounding reference signal (SRS) transmission.

Example 17. The method of example 10, wherein the control message comprises downlink control information.

Example 18. The method of example 10, wherein the control message comprises an uplink grant for a transmission of the at least one uplink transport block.

Example 19. The method of example 10, wherein the control message is a medium access control (MAC) control element.

Example 20. A method comprising: receiving, by a wireless device from a base station, one or more radio resource control (RRC) messages comprising: one or more parameters associated with one or more bandwidth parts (BWPs) for a cell; a first indicator indicating one of the one or more BWPs for the cell as a default BWP; and a second indicator indicating whether an accumulation is enabled; receiving an RRC message indicating a BWP switching of a default BWP from a first BWP, having a first center frequency, to a second BWP, having a second center frequency, for the cell; determining a first transmission power for a transmission via a resource of the second BWP of at least one uplink transport block, wherein the first transmission power comprises at least one closed loop power control parameter based on the first center frequency being the same as the second center frequency; and transmitting, via the resource of the second BWP and based on the first transmission power, the at least one uplink transport block.

Figure 24:
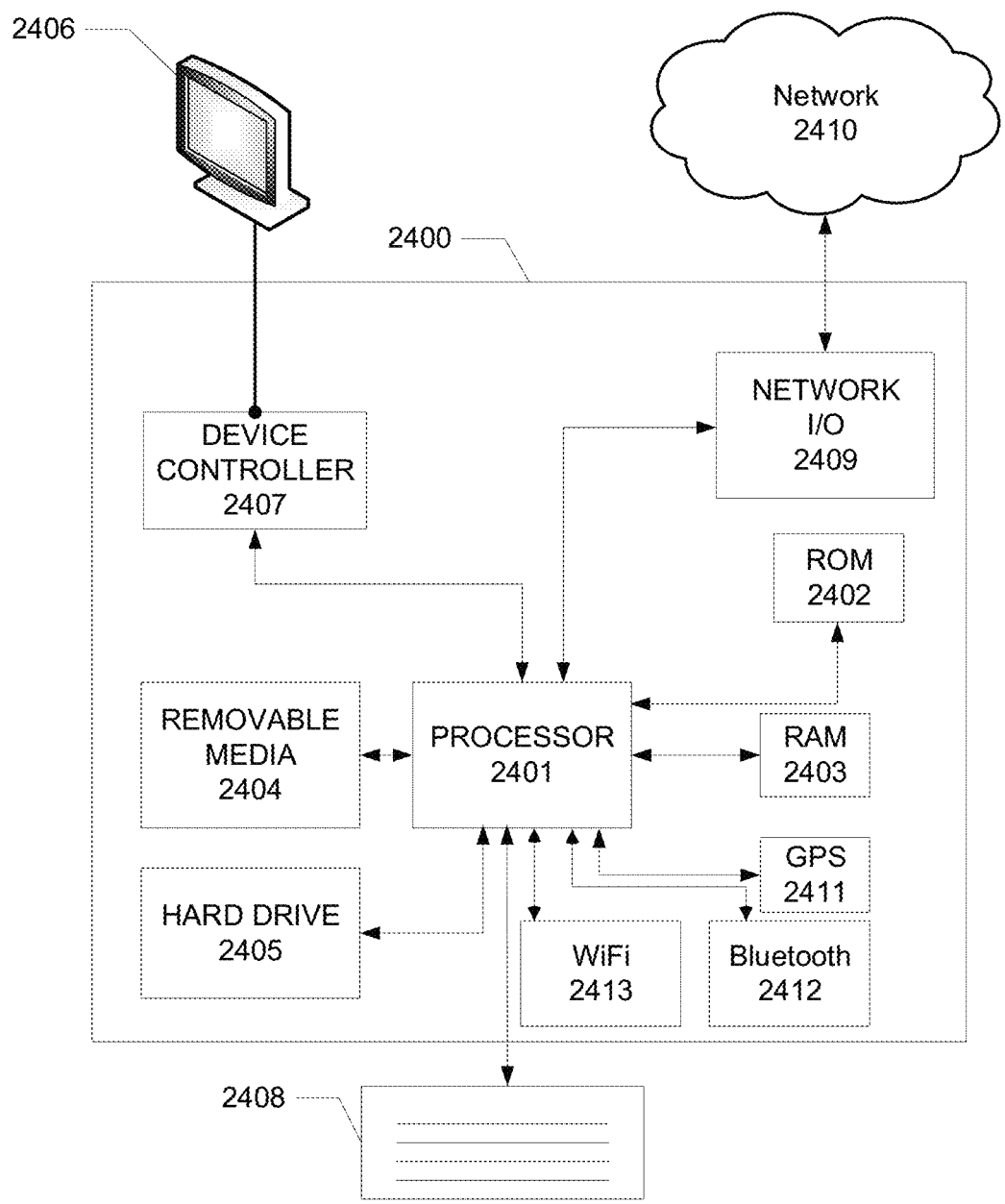
FIG. 24 shows example elements of a computing device that may be used to implement any of the various devices described herein.

FIG. 24 shows general hardware elements that may be used to implement any of the various computing devices discussed herein, including, e.g., the base station 401, the wireless device 406, or any other base station, wireless device, or computing device described herein. The computing device 2400 may include one or more processors 2401, which may execute instructions stored in the random access memory (RAM) 2403, the removable media 2404 (such as a Universal Serial Bus (USB) drive, compact disk (CD) or digital versatile disk (DVD), or floppy disk drive), or any other desired storage medium. Instructions may also be stored in an attached (or internal) hard drive 2405. The computing device 2400 may also include a security processor (not shown), which may execute instructions of one or more computer programs to monitor the processes executing on the processor 2401 and any process that requests access to any hardware and/or software components of the computing device 2400 (e.g., ROM 2402, RAM 2403, the removable media 2404, the hard drive 2405, the device controller 2407, a network interface 2409, a GPS 2411, a Bluetooth interface 2412, a WiFi interface 2413, etc.). The computing device 2400 may include one or more output devices, such as the display 2406 (e.g., a screen, a display device, a monitor, a television, etc.), and may include one or more output device controllers 2407, such as a video processor. There may also be one or more user input devices 2408, such as a remote control, keyboard, mouse, touch screen, microphone, etc. The computing device 2400 may also include one or more network interfaces, such as a network interface 2409, which may be a wired interface, a wireless interface, or a combination of the two. The network interface 2409 may provide an interface for the computing device 2400 to communicate with a network 2410 (e.g., a RAN, or any other network). The network interface 2409 may include a modem (e.g., a cable modem), and the external network 2410 may include communication links, an external network, an in-home network, a provider's wireless, coaxial, fiber, or hybrid fiber/coaxial distribution system (e.g., a DOCSIS network), or any other desired network.

Additionally, the computing device 2400 may include a location-detecting device, such as a global positioning system (GPS) microprocessor 2411, which may be configured to receive and process global positioning signals and determine, with possible assistance from an external server and antenna, a geographic position of the computing device 2400.

The example in FIG. 24 may be a hardware configuration, although the components shown may be implemented as software as well. Modifications may be made to add, remove, combine, divide, etc. components of the computing device 2400 as desired. Additionally, the components may be implemented using basic computing devices and components, and the same components (e.g., processor 2401, ROM storage 2402, display 2406, etc.) may be used to implement any of the other computing devices and components described herein. For example, the various components described herein may be implemented using computing devices having components such as a processor executing computer-executable instructions stored on a computer-readable medium, as shown in FIG. 24. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, abase station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
switching, by a wireless device, from a first frequency range for a cell to a second frequency range for the cell; and
sending, via the second frequency range and using a transmission power based on a power control parameter, at least one uplink signal, wherein a value of the power control parameter is maintained based on the second frequency range overlapping with the first frequency range.

2. The method of claim 1, wherein the switching is based on a first common search space (CSS) of the first frequency range being the same as a second CSS of the second frequency range.

3. The method of claim 1, further comprising receiving a message indicating the switching from the first frequency range to the second frequency range.

4. The method of claim 1, wherein the switching is based on an expiration of a timer associated with the first frequency range.

5. The method of claim 1, wherein the transmission power for sending the at least one uplink signal is based on applying a value of the power control parameter from the first frequency range to the second frequency range.

6. The method of claim 1, wherein the transmission power is for at least one of: a physical uplink shared channel (PUSCH); a physical uplink control channel (PUCCH); or a sounding reference signal (SRS) transmission.

7. The method of claim 1, wherein the at least one uplink signal comprises one or more transport blocks.

8. The method of claim 1, further comprising:
determining, by the wireless device, that the second frequency range overlaps with the first frequency range.

9. The method of claim 1, further comprising:
measuring, by the wireless device, one or more reference signals associated with the second frequency range to determine a pathloss estimate, wherein the transmission power is further based on the pathloss estimate.

10. A method comprising:
switching, by a wireless device, from a first frequency range for a cell to a second frequency range for the cell; and
sending, via the second frequency range and using a transmission power based on a power control parameter, at least one uplink signal, wherein a value of the power control parameter was reset, prior to the sending the at least one uplink signal, based on the second frequency range not overlapping with the first frequency range.

11. The method of claim 10, wherein the switching is based on a first common search space (CSS) of the first frequency range being the same as a second CSS of the second frequency range.

12. The method of claim 10, further comprising receiving a message indicating the switching from the first frequency range to the second frequency range.

13. The method of claim 10, wherein the switching is based on an expiration of a timer associated with the first frequency range.

14. The method of claim 10, wherein the transmission power is for at least one of: a physical uplink shared channel (PUSCH); a physical uplink control channel (PUCCH); or a sounding reference signal (SRS) transmission.

15. The method of claim 10, wherein the at least one uplink signal comprises one or more transport blocks.

16. The method of claim 10, further comprising:
determining, by the wireless device, that the second frequency range does not overlap with the first frequency range.

17. The method of claim 10, further comprising:
measuring, by the wireless device, one or more reference signals associated with the second frequency range to determine a pathloss estimate, wherein the transmission power is further based on the pathloss estimate.

18. A wireless device comprising:
one or more processors; and
memory storing instructions that, when executed by the one or more processors, cause the wireless device to:
switch from a first frequency range for a cell to a second frequency range for the cell; and
send, via the second frequency range and using a transmission power based on a power control parameter, at least one uplink signal, wherein a value of the power control parameter is maintained based on the second frequency range overlapping with the first frequency range.

19. The wireless device of claim 18, wherein the instructions, when executed by the one or more processors, cause the wireless device to switch based on a first common search space (CSS) of the first frequency range being the same as a second CSS of the second frequency range.

20. The wireless device of claim 18, wherein the instructions, when executed by the one or more processors, cause the wireless device to receive a message indicating switching from the first frequency range to the second frequency range.

21. The wireless device of claim 18, wherein the instructions, when executed by the one or more processors, cause the wireless device to switch based on an expiration of a timer associated with the first frequency range.

22. The wireless device of claim 18, wherein the transmission power for sending the at least one uplink signal is based on applying a value of the power control parameter from the first frequency range to the second frequency range.

23. The wireless device of claim 18, wherein the transmission power is for at least one of: a physical uplink shared channel (PUSCH); a physical uplink control channel (PUCCH); or a sounding reference signal (SRS) transmission.

24. The wireless device of claim 18, wherein the at least one uplink signal comprises one or more transport blocks.

25. The wireless device of claim 18, wherein the instructions, when executed by the one or more processors, cause the wireless device to determine that the second frequency range overlaps with the first frequency range.

26. The wireless device of claim 18, wherein the instructions, when executed by the one or more processors, cause the wireless device to measure one or more reference signals associated with the second frequency range to determine a pathloss estimate, wherein the transmission power is further based on the pathloss estimate.

27. A wireless device comprising:
one or more processors; and
memory storing instructions that, when executed by the one or more processors, cause the wireless device to:
switch from a first frequency range for a cell to a second frequency range for the cell; and
send, via the second frequency range and using a transmission power based on a power control parameter, at least one uplink signal, wherein a value of the power control parameter was reset, prior to the sending the at least one uplink signal, based on the second frequency range not overlapping with the first frequency range.

28. The wireless device of claim 27, wherein the instructions, when executed by the one or more processors, cause the wireless device to switch based on a first common search space (CSS) of the first frequency range being the same as a second CSS of the second frequency range.

29. The wireless device of claim 27, wherein the instructions, when executed by the one or more processors, cause the wireless device to receive a message indicating switching from the first frequency range to the second frequency range.

30. The wireless device of claim 27, wherein the instructions, when executed by the one or more processors, cause the wireless device to switch based on an expiration of a timer associated with the first frequency range.

31. The wireless device of claim 27, wherein the transmission power is for at least one of: a physical uplink shared channel (PUSCH); a physical uplink control channel (PUCCH); or a sounding reference signal (SRS) transmission.

32. The wireless device of claim 27, wherein the at least one uplink signal comprises one or more transport blocks.

33. The wireless device of claim 27, wherein the instructions, when executed by the one or more processors, cause the wireless device to determine that the second frequency range does not overlap with the first frequency range.

34. The wireless device of claim 27, wherein the instructions, when executed by the one or more processors, cause the wireless device to measure one or more reference signals associated with the second frequency range to determine a pathloss estimate, wherein the transmission power is further based on the pathloss estimate.

35. A non-transitory computer-readable medium storing instructions that, when executed, configure a wireless device to:
switch from a first frequency range for a cell to a second frequency range for the cell; and
send, via the second frequency range and using a transmission power based on a power control parameter, at least one uplink signal, wherein a value of the power control parameter is maintained based on the second frequency range overlapping with the first frequency range.

36. The non-transitory computer-readable medium of claim 35, wherein the instructions, when executed, configure the wireless device to measure one or more reference signals associated with the second frequency range to determine a pathloss estimate, wherein the transmission power is further based on the pathloss estimate.

37. A non-transitory computer-readable medium storing instructions that, when executed, configure a wireless device to:
switch from a first frequency range for a cell to a second frequency range for the cell; and
send, via the second frequency range and using a transmission power based on a power control parameter, at least one uplink signal, wherein a value of the power control parameter was reset, prior to the sending the at least one uplink signal, based on the second frequency range not overlapping with the first frequency range.

38. The non-transitory computer-readable medium of claim 37, wherein the instructions, when executed, configure the wireless device to measure one or more reference signals associated with the second frequency range to determine a pathloss estimate, wherein the transmission power is further based on the pathloss estimate.

39. A system comprising:
a wireless device; and
a base station,
wherein the wireless device is configured to:
switch from a first frequency range for a cell to a second frequency range for the cell; and
send, via the second frequency range and using a transmission power based on a power control parameter, at least one uplink signal, wherein a value of the power control parameter is maintained based on the second frequency range overlapping with the first frequency range; and
wherein the base station is configured to:
receive the at least one uplink signal.

40. The system of claim 39, wherein the base station is configured to send a message indicating switching from the first frequency range to the second frequency range.

41. The system of claim 39, wherein the wireless device is configured to measure one or more reference signals associated with the second frequency range to determine a pathloss estimate, wherein the transmission power is further based on the pathloss estimate.

42. A system comprising:
a wireless device; and
a base station,
wherein the wireless device is configured to:
switch from a first frequency range for a cell to a second frequency range for the cell; and
send, via the second frequency range and using a transmission power based on a power control parameter, at least one uplink signal, wherein a value of the power control parameter was reset, prior to the sending the at least one uplink signal, based on the second frequency range not overlapping with the first frequency range; and
wherein the base station is configured to:
receive the at least one uplink signal.

43. The system of claim 42, wherein the wireless device is configured to measure one or more reference signals associated with the second frequency range to determine a pathloss estimate, wherein the transmission power is further based on the pathloss estimate.

44. The system of claim 42, wherein the base station is configured to send a message indicating switching from the first frequency range to the second frequency range.

* * * * *